US008768987B2

(12) United States Patent
Kobayashi et al.

(10) Patent No.: US 8,768,987 B2

(45) Date of Patent: Jul. 1, 2014

(54) REPRODUCING APPARATUS, REPRODUCING METHOD, PROGRAM, PROGRAM STORAGE MEDIUM, DATA DELIVERY SYSTEM, DATA STRUCTURE, AND MANUFACTURING METHOD OF RECORDING MEDIUM

(75) Inventors: Yoshiyuki Kobayashi, Tokyo (JP); Kouichi Uchimura, Kanagawa (JP); Kazuo Yamamoto, Chiba (JP); Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/905,818

(22) Filed: Oct. 15, 2010

(65) Prior Publication Data

US 2011/0035423 A1 Feb. 10, 2011

Related U.S. Application Data

(63) Continuation of application No. 11/587,094, filed as application No. PCT/JP2006/305395 on Mar. 17, 2006, now abandoned.

(30) Foreign Application Priority Data

| | | |
|---|---|---|
| Mar. 18, 2005 | (JP) | 2005-080600 |
| Apr. 11, 2005 | (JP) | 2005-113266 |
| Jun. 3, 2005 | (JP) | 2005-164010 |
| Jul. 15, 2005 | (JP) | 2005-206998 |

(51) Int. Cl.
*G06F 17/30* (2006.01)

(52) U.S. Cl.
USPC .......... 707/831

(58) Field of Classification Search
None
See application file for complete search history.

(56) References Cited

U.S. PATENT DOCUMENTS 5,202,983 A 4/1993 Orita et al.
5,745,752 A 4/1998 Hurvig et al.

(Continued)

FOREIGN PATENT DOCUMENTS

EP 1513152 3/2005
EP 1551027 7/2005

(Continued)

OTHER PUBLICATIONS

JPO Office Action, issued Jan. 26, 2007; Patent Application No. 2006-527213 (English Translation and Verification of Translation).

(Continued)

*Primary Examiner* — Rehana Perveen
*Assistant Examiner* — Hung Havan
(74) *Attorney, Agent, or Firm* — Oblon, Spivak, McClelland, Maier & Neustadt, L.L.P.

(57) ABSTRACT

The present invention relates to a reproducing apparatus, a reproducing method, a program, a program storage medium, a data delivery system, a data structure, and a manufacturing method of a recording medium for easily handling a content file recorded on a disk and an update file recorded on a local storage. Downloaded data can be handled with a file having a path name and a file name on the local storage being different from a file having a path name and a file name on a virtual file system based on a path name specified by an src_file_name field of and a path name specified by a dst_file_name field of a manifest ( ) section. The present invention is applicable to reproducing apparatuses.

15 Claims, 54 Drawing Sheets

(56) References Cited

U.S. PATENT DOCUMENTS

| | | | | |
|---|---|---|---|---|
| 6,185,574 | B1 * | 2/2001 | Howard et al. | 1/1 |
| 6,438,315 | B1 * | 8/2002 | Suzuki et al. | 386/248 |
| 6,580,870 | B1 * | 6/2003 | Kanazawa et al. | 386/240 |
| 2003/0215224 | A1 | 11/2003 | Yoo et al. | |
| 2005/0105894 | A1 * | 5/2005 | Jung et al. | 386/96 |
| 2006/0098940 | A1 * | 5/2006 | Seo et al. | 386/46 |
| 2006/0193608 | A1 * | 8/2006 | Kim | 386/126 |
| 2007/0220021 | A1 | 9/2007 | Kato et al. | |
| 2008/0291206 | A1 | 11/2008 | Uchimura et al. | |

FOREIGN PATENT DOCUMENTS

| | | | |
|---|---|---|---|
| JP | 08-055127 | | 2/1996 |
| JP | 2002-311967 | | 10/2002 |
| JP | 2003-140662 | | 5/2003 |
| JP | 2003 096176 | | 11/2003 |
| JP | 2005-526342 | | 9/2005 |
| WO | WO 2004/025651 | | 3/2004 |
| WO | WO 2004/030356 | A1 | 4/2004 |
| WO | WO 2006/031048 | | 3/2006 |
| WO | WO 2006/051037 | | 5/2006 |
| WO | WO 2006/051037 | A1 | 5/2006 |
| WO | WO 2006/073252 | A2 | 7/2006 |

OTHER PUBLICATIONS

European Search Report issued Apr. 14, 2010 in European Application No. 06729384.

"Application Definition Blu-ray Disc Format BD-J Baseline Application and Logical Model Definition for BD-ROM" Internet Citation, Mar. 1, 2005, pp. 1-45, http://www.blurayjukebox.com/pdfs/bdj_gem_application_definition_0503.

Extended Search Report issued Jul. 10, 2012 in European Application No. 12162426.6.

Extended Search Report issued Jul. 19, 2012 in European Application No. 12162434.0.

European Office Action mailed on Mar. 12, 2013, issued for EP Application No. 12 162 426.6 (English).

* cited by examiner

SERVER
3
2
REPRODUCING APPARATUS
1
INTERNET INTERFACE
25
LOCAL STORAGE (HDD)
24
MEMORY
23
OPTICAL DISK DRIVE
22
11
REMOVABLE MEDIUM
28
DRIVE
27
CONTROLLER
21
OPERATION INPUT UNIT
29
DECODER
26
DISPLAY DEVICE
AVout OPTICAL DISK DIRECTORY MANAGER
35
11
DATA ACQUISITION UNIT
33
MENU SCREEN DISPLAY CONTROLLER
31
LOCAL STORAGE DIRECTORY MANAGER
34
24
FILE SYSTEM MERGE PROCESSOR
36
PLAYBACK CONTROLLER
37
OPERATIONAL INPUT ACQUISITION UNIT
32
29

APPLICATION PROGRAM
VIRTUAL DISK
VIRTUAL FILE SYSTEM
METADATA LIST
FILE SYSTEM
11
FILE #1
METADATA LIST
FILE SYSTEM
LOCAL STORAGE
24
FILE #2

FIG. 10

| DATA STRUCTURE | NUMBER OF BITS | BIT STRING REPRESENTATION |
|---|---|---|
| Manifest() | | |
| { | | |
| manifest_id | 8 | uimsbf |
| author_id | 8 | uimsbf |
| disc_id | 8 | uimsbf |
| version | 8 | uimsbf |
| display name | 8*128 | bslbf |
| source | 8*1024 | bslbf |
| operation_type | 8 | uimsbf |
| permission | 8 | uimsbf |
| src_file_name | 8*1024 | bslbf |
| dst_file_name | 8*1024 | bslbf |
| } | | |

FIG. 11

| VALUE | MEANING |
|---|---|
| 0x01 | SUBSTITUTE PlayList |
| 0x02 | EXTRACT AND ADD SubPath ELEMENT |
| 0x03 | EXTRACT AND ADD SubPlayItem ELEMENT |
| 0x04 | EXTRACT AND ADD SubClip_entry ELEMENT |

| VALUE | MEANING |
|---|---|
| 0x00 | ATTRIBUTE INVISIBLE (TO USER) |
| 0x01 | ATTRIBUTE VISIBLE (TO USER) |
| 0x02 | OVERWRITE INHIBIT ATTRIBUTE |

FIG. 17

| DATA STRUCTURE | NUMBER OF BITS | BIT STRING REPRESENTATION |
|---|---|---|
| File_package() | | |
| { | | |
| Package_header() | | |
| { | | |
| compression_type | 8 | uimsbf |
| encryption_type | 8 | uimsbf |
| } | | |
| Package_Body() | | |
| { | | |
| file_count | 16 | uimsbf |
| for(i=0;i<file count;i++) | | |
| { | | |
| Manifest() | | |
| { | | |
| manifest_id | 8 | uimsbf |
| author_id | 8 | uimsbf |
| disc_id | 8 | uimsbf |
| version | 8 | uimsbf |
| source | 8*128 | bslbf |
| operation_type | 8 | uimsbf |
| display_name | 8*128 | bslbf |
| permission | 8 | uimsbf |
| src_file_name | 8*1024 | bslbf |
| dst_file_name | 8*1024 | bslbf |
| } | | |
| File() | | |
| { | | |
| file_size | 32 | uimsbf |
| for(j=0;j<file_size;j++) | | |
| { | | |
| file_data | 8 | bslbf |
| } | | |
| } | | |
| } | | |
| } | | |
| } | | |

CONTENT ON OPTICAL DISK
PlayList#1
MainPath#1
PlayItem#1
SubPath#1
Clip AV STREAM #1
CAPTION TEXT STREAM #1
DISTRIBUTION CONTENT PACKAGE
PlayList#2
MainPath#2
PlayItem#1
PlayItem#2
SubPath#1
Clip AV STREAM #2
AFTER UPDATING
PlayList#2
MainPath#2
PlayItem#1
PlayItem#2
SubPath#1
Clip AV STREAM #1
Clip AV STREAM #2
CAPTION TEXT STREAM #1

CONTENT ON OPTICAL DISK
PlayList#1
SubPath#1
SubPlayItem#1
clip#1
Clip AV STREAM #1
CAPTION TEXT STREAM #1
DISTRIBUTION CONTENT PACKAGE
PlayList#1
SubPath#1
SubPlayItem#1
clip#2
CAPTION TEXT STREAM #2
AFTER UPDATING
PlayList#1
SubPath#1
SubPlayItem#1
clip#1
clip#2
Clip AV STREAM #1
CAPTION TEXT STREAM #1
CAPTION TEXT STREAM #2

BEFORE UPDATING
PlayList
PlayItem
SubPlayItem
Main Path
Sub Path
AFTER UPDATING
PlayList
PlayItem
SubPlayItem
Main Path
Sub Path
Clip AV STREAM #1
CAPTION TEXT STREAM #1
CAPTION TEXT STREAM #2

FIG. 30

| | |
|---|---|
| | Disc #1 – FRENCH CAPTION |
| ○ | Disc #1 – BONUS TRACK |
| | Disc #1 – JAPANESE ADDITIONAL CAPTION |

DELETE

FIG. 37

| Syntax | No. of bits | Mnemonic |
|---|---|---|
| index bdmv{ | | |
| type_indicator | 8*4 | bslbf |
| version_number | 8*4 | bslbf |
| Indexes_start_address | 32 | uimsbf |
| reserved_for_future_use | 224 | bslbf |
| AppInfoBDMV() | | |
| for(i=0;i<N1;i++){ | | |
| padding_word | 16 | bslbf |
| } | | |
| Indexes() | | |
| for(i=0;i<N2;i++){ | | |
| padding_word | 16 | bslbf |
| } | | |
| } | | |

FIG. 38

| Syntax | No. of bits | Mnemonic |
|---|---|---|
| indexes() { | | |
| length | 32 | uimsbf |
| FirstPlayback() { | | |
| reserved_for_future_use | 32 | bslbf |
| FirstPlayback_mobj_id_ref | 16 | uimsbf |
| } | | |
| TopMenu() { | | |
| reserved_for_future_use | 32 | bslbf |
| TopMenu_mobj_id_ref | 16 | uimsbf |
| } | | |
| number_of_Titles | 16 | uimsbf |
| for(title_id=0;<br>title_id<number_of_Titles;<br>title_id++{ | | |
| Title[title_id]() { | | |
| Title_playback_type[title_id] | 1 | uimsbf |
| Title_access_type[title_id] | 2 | uimsbf |
| reserved_for_future_use | 29 | bslbf |
| Title_mobj_id_ref[title_id] | 16 | uimsbf |
| } | | |
| } | | |
| } | | |

SERVER
3
2
REPRODUCING APPARATUS
301
INTERNET INTERFACE
25
LOCAL STORAGE (HDD)
24
MEMORY
23
OPTICAL DISK DRIVE
22
11
DECRYPTION PROCESSOR
311
REMOVABLE MEDIUM
28
DRIVE
27
CONTROLLER
21
OPERATION INPUT UNIT
29
DECODER
26
AVout
DISPLAY DEVICE

FIG. 47

| | |
|---|---|
| MANIFEST FILE #1 | JAPANESE |
| MANIFEST FILE #2 | ENGLISH |
| MANIFEST FILE #3 | FRENCH |
| MANIFEST FILE #4 | JAPANESE AND ENGLISH |
| MANIFEST FILE #5 | JAPANESE AND FRENCH |
| MANIFEST FILE #6 | ENGLISH AND FRENCH |
| MANIFEST FILE #7 | JAPANESE, ENGLISH, AND GERMAN |
| MANIFEST FILE #8 | JAPANESE, ENGLISH, FRENCH, AND GERMAN |
| ... | ... |

FIG. 48

| CURRENT MANIFEST FILES | CORRESPONDING UPDATE FILES |
|---|---|
| MANIFEST FILE #1 | 4, 5, 7, 8 |
| MANIFEST FILE #2 | 4, 6, 7, 8 |
| MANIFEST FILE #3 | 5, 6, 8 |
| MANIFEST FILE #4 | 7, 8 |
| MANIFEST FILE #5 | 8 |
| MANIFEST FILE #6 | 8 |
| MANIFEST FILE #7 | 8 |
| MANIFEST FILE #8 | ... |
| ... | ... |

APPLICATION PROGRAM
VIRTUAL DISK
VIRTUAL FILE SYSTEM
METADATA LIST
METADATA LIST
FILE SYSTEM
FILE SYSTEM
SECOND AREA
FIRST AREA
LOCAL STORAGE
24
FILE #1
FILE #2
. . .
. . .

REPRODUCING APPARATUS, REPRODUCING METHOD, PROGRAM, PROGRAM STORAGE MEDIUM, DATA DELIVERY SYSTEM, DATA STRUCTURE, AND MANUFACTURING METHOD OF RECORDING MEDIUM

CROSS REFERENCE TO RELATED APPLICATIONS

This application is a Continuation of and is based upon and claims the benefit of priority under 35 U.S.C. §120 for U.S. Ser. No. 11/587,094, filed Oct. 20, 2006, which is a National Stage of PCT/JP06/305395, filed Mar. 17, 2006.

TECHNICAL FIELD

The present invention relates to a reproducing apparatus, a reproducing method, a program, a program storage medium, a data delivery system, a data structure, and a manufacturing method of a recording medium. More specifically, the present invention relates to a reproducing apparatus, a reproducing method, a program, a program storage medium, a data delivery system, a data structure, and a manufacturing method of a recording medium for appropriately downloading an update file of a content already recorded on a recording medium.

BACKGROUND ART

DVD (digital versatile disk) video format is one of playback only standards of digital versatile disks (DVDs). In the DVD video format, content data such as video and audio is multiplexed with data of a variety of sub-pictures including caption, and is recorded in a program stream on a disk. Navigation data is also recorded on the disk to reproduce interactively the stream.

In interactive reproduction, data is reproduced at a desired position or in a desired order. In the interactive reproduction, users can use a variety of functions of DVD. The available functions include a multi-angle function in which videos captured at various angles are reproduced, a multi-language function in which data is reproduced in a desired language selected from a plurality of languages, a parental control function in which a particular scene, such as a scene of violence, is prevented from being reproduced.

A program stream can be produced by multiplexing a plurality of audio streams and a plurality of caption data streams. If data of different languages is thus recorded for one video content, such as a movie, on a single disk, a user can select voice and caption of a desirable language at the beginning of or during video reproduction.

Patent Document 1 discloses a system that allows a user to easily download a content as a video work, including sound effects, moving image, and still image. Patent Document 2 discloses a technique that allows a portion of entire music data to be replaced with another data.

[Patent Document 1] Japanese Unexamined Patent Application Publication No. 2003-140662

[Patent Document 2] Japanese Unexamined Patent Application Publication No. 2002-311967

DISCLOSURE OF INVENTION

Problems to be Solved by the Invention

The user can naturally reproduce only contents recorded on a disk loaded on a player.

For example, if a disk having a movie content with English caption only is purchased, the user can display the English caption pre-recorded on the disk. To view the same movie content with another desired language different from the pre-recorded language, the user needs to purchase a different disk with caption information of the other desired language.

To sell disks of a movie content in countries of different languages, a seller of the disks need to prepare disks with different caption information, or a plurality of types of disks, such as disks of English language, disks of Japanese language, and the like.

For example, when a bonus track is added, or when caption and voice are partially modified, instead of the modification of an entire content, a disk with the bonus track added thereon, and a disk with the caption and voice partially modified must be newly prepared for re-distribution.

Preparing such disks takes time, possibly resulting in the loss of large business chance.

The present invention has been developed in view of the above-described problem and it is an object of the present invention to allow an update file of a content recorded on a disk to be downloaded, or to be distributed in a removable recording medium to easily handle a content file recorded on the disk and the update file.

Means for Solving the Problems

In accordance with a first aspect of the present invention, a reproducing apparatus for acquiring a first data group and a second data group, and reproducing an AV stream using the acquired first and second data groups, includes detecting means for detecting a file system of the first data group, and virtual file system generating means for generating a virtual file system containing at least a portion of each of the first data group and the second data group, based on the file system of the first data group detected by the detecting means, and attribute information containing first information indicating a recording position of the second data group and second information indicating a path in the virtual file system of the second data group.

A directory structure of the virtual file system may include at least a portion of a directory structure in the file system of the first data group detected by the detecting means.

The virtual file system may include a directory containing a play list file managing reproduction of the AV stream, a directory containing a clip information file managing the AV stream, and a directory storing the AV steam.

The second data group may be stored on one of a semiconductor memory and a magnetic disk, and the first information may indicate a path in a file system in the one of the semiconductor memory and the magnetic disk.

The reproducing apparatus may further include reproduction control means for controlling reproduction of the AV stream by controlling reading of the first data group and the second data group based on the virtual file system generated by the virtual file system generating means.

The reproducing apparatus may further include storage means for storing the acquired second data group, and management means for managing the file system of the second data group in the storage means, wherein the reproduction control means controls the reproduction by reading the second data group stored on the storage means based on the first information and the second information contained in the attribute information, the virtual file system, and the file system of the second data group managed by the management means.

The reproducing apparatus may further include storage means for storing the acquired second data group, wherein the second data group is stored on the storage means, and also on another device connected to the reproducing apparatus via a network or a recording medium loaded on the reproducing apparatus, wherein the first information indicates a path of the second data group in the file system of the storage means, and wherein the reproduction control means further controls acquisition of data to be read out of the second data group stored on the other device or the recording medium if the data to be read out of the second data group is not present in the path indicated by the first information of the storage means.

The first data group may be stored on one of an optical disk, a semiconductor memory, and a magnetic disk.

The reproducing apparatus may further include acquisition means for acquiring the second data group from outside the reproducing apparatus, storage means for storing the second data group acquired by the acquisition means, and reading means for reading the first data group from a predetermined recording medium loaded on the reproducing apparatus, wherein the reading means acquires the first data group by reading the first data group from the predetermined recording medium loaded on the reproducing apparatus or by reading the first data group from the storage means, the storage means having stored, in an area different from the area where the second data group has been stored, the first data group read by the reading means from the predetermined recording medium.

The reproducing apparatus may further include first acquisition means for acquiring the first data group, and second acquisition means for acquiring a third data group as an update file of the second data group, wherein the second acquisition means acquires the third data group in a state that the first acquisition means has acquired the first data group acquired, and wherein the virtual file system generating means generates the virtual file system containing at least a portion of each of the first data group and the third data group, based on the file system of the first data group detected by the detecting means, and attribute information containing third information indicating a recording position of the third data group and fourth information indicating a path in the virtual file system of the third data group.

The reproducing apparatus may further include first acquisition means for acquiring the first data group, and second acquisition means for acquiring a third data group as an update file of the second data group, wherein the second acquisition means acquires the third data group in a state that the first acquisition means has not yet acquired the first data group, and wherein the virtual file system generating means generates the virtual file system containing at least a portion of each of the first data group and the third data group, based on the file system of the first data group detected by the detecting means, and attribute information containing third information indicating a recording position of the third data group and fourth information indicating a path in the virtual file system of the third data group.

The reproducing apparatus may further include storage means for storing a third data group as an update file of the second data group, and storage control means for controlling storage of the third data group onto the storage means, wherein one of the first data group and the third data group contains third information indicating a combination of the second data group and the third data group, the combination of the second data group and the third data group being capable of reproducing all data contained in the second data group and the third data group when the third data group is stored on the storage means, and wherein the storage control means determines, based on the third information, what data of the second data group cannot be reproduced due to the controlling of the storage of the third data group onto the storage means.

The reproducing apparatus may further include notification means for outputting a notification to a user, wherein when the storage control means determines that predetermined data contained in the second data group cannot be reproduced due to the controlling of the storage of the third data group onto the storage means, the notification means issues a warning message to the user.

Each of the second data group and the third data group may contain first control information for controlling a variety of stream data and reproduction of the stream data, wherein when the storage control means determines that at least a portion of the stream data contained in the second data group cannot be reproduced due to the controlling of the storage of the third data group onto the storage means, the storage control means generates second control information capable of reproducing all stream data contained in the second data group and the third data group, and controls the storage of the second control information onto the storage means.

The first control information and the second control information may contain the first information and the second information.

The reproducing may further include notification means for outputting a notification to a user, wherein each of the second data group and the third data group contains reproduction control information for controlling a variety of stream data and reproduction of the stream data, wherein when the storage control means determines that at least a portion of the stream data contained in the second data group cannot be reproduced due to the controlling of the storage of the third data group onto the storage means, the storage control means acquires identification information uniquely identifying the reproduction control information contained in the second data group, and the notification means notifies the user of the identification information.

The reproducing apparatus may include storage means for storing the second data group, data storage management means for managing storage or deletion of the second data group on the storage means, and operation input acquisition means for acquiring an operation input from a user, wherein the data storage management means deletes at least a portion of data contained in the second data group stored on the storage means, in response to an operation input by the user and acquired by the operation input means, and wherein the virtual file system generating means re-generates the virtual file system based on the attribute information when the data storage management means deletes at least the portion of the data contained in the second data group.

The reproducing apparatus may further include communication means for exchanging information with a predetermined information processing apparatus via a network, and information display control means for controlling display of information assisting the user in operation, wherein when the operation input acquisition means acquires a command to delete data contained in the second data group stored on the storage means, the data storage management means transmits, to the predetermined information processing apparatus via the communication means, information indicating a state of the virtual file system generated by the virtual file system generating means, the communication means receives, from the predetermined information processing apparatus, information indicating a list of deletable data out of data contained in the second data group stored on the storage means, the information display control means controls display of the information indicating the list of deletable data received via the communication means, and the data storage management means deletes at least a portion of the data contained in the second data group stored on the storage means, based on the operation input of the user who references the list of the deletable data displayed under the control of the information display control means, the operation input acquired by the operation input acquisition means.

The reproducing apparatus may further include communication means for exchanging information with a predetermined information processing apparatus via a network, wherein the virtual file system generating means determines whether a malfunction is likely to occur as a result of deletion of data in the virtual file system after at least the portion of the data contained in the second data group stored on the storage means is deleted, and if it is determined that the malfunction is likely to occur as a result of data deletion, extracts data required to correct the malfunction, and requests the predetermined information processing apparatus via the communication means to transmit data required to correct the malfunction, and the communication means receives the data required to correct the malfunction from the predetermined information processing apparatus, and the data storage management means controls storage of the data, required to correct the malfunction and received via the communication means, onto the storage means.

In accordance with the first aspect of the present invention, a reproducing method of a reproducing apparatus for reproducing an AV stream using a first data group and a second data group, includes steps of detecting a file system of the first data group, acquiring attribute information containing first information indicating a recording position of the second data group and second information indicating a path in a virtual file system of the second data group, and generating the virtual file system containing at least a portion of each of the first data group and the second data group, based on the detected file system of the first data group and the acquired attribute information.

The reproducing method may further include steps of acquiring a third data group as an update file of the second data group, acquiring, from one of the first data group and the third data group, third information indicating a combination of the second data group and the third data group, the combination of the second data group and the third data group being capable of reproducing all data contained in the second data group and the third data group when the third data group is stored on a predetermined storage section, and determining, based on the third information, whether any of data contained in the second data group cannot be reproduced when the third data group is stored onto the storage section.

In accordance with the first aspect of the present invention, a program for causing a computer to reproduce an AV stream using a first data group and a second data group, includes steps of detecting a file system of the first data group, acquiring attribute information containing first information indicating a recording position of the second data group and second information indicating a path in a virtual file system of the second data group, and generating the virtual file system containing at least a portion of each of the first data group and the second data group, based on the detected file system of the first data group and the acquired attribute information.

In accordance with the first aspect of the present invention, the file system of the first data group is detected to reproduce the AV stream using the first data group and the second data group. The virtual file system containing at least a portion of each of the first data group and the second data group is generated based on the detected file system of the first data group and the attribute information containing the first information indicating the recording position of the second data group and the second information indicating the path in the virtual file system of the second data group.

In accordance with a second aspect of the present invention, a data structure of third data to be supplied to a reproducing apparatus so that first data and second data supplied to the reproducing apparatus are reproduced with the first and second data associated with each other, includes first information indicating a path in a file system of a recording section storing the first data in the reproducing apparatus, and second information indicating a path of the first data in a virtual file system of the reproducing apparatus, the virtual file system including at least a portion of each of the first data and the second data.

In accordance with the second aspect of the present invention, a manufacturing method of a recording medium, the recording medium storing third data to be supplied to a reproducing apparatus so that first data and second data supplied to the reproducing apparatus are reproduced with the first and second data associated with each other, includes steps of generating data having a data structure including first information indicating a path in a file system of a recording section storing the first data in the reproducing apparatus, second information indicating a path of the first data in a virtual file system of the reproducing apparatus, the virtual file system including at least a portion of each of the first data and the second data, and recording the generated data onto the recording medium.

In accordance with the second aspect of the present invention, the data having the data structure containing the first information and the second information is provided so that the first data and the second data supplied to the reproducing apparatus are reproduced with the first and second data associated with each other. The first information indicates the path in the file system of the recording section storing the first data in the reproducing apparatus, and the second information indicates the path of the first data in a virtual file system of the reproducing apparatus, the virtual file system including at least a portion of each of the first data and the second data.

In accordance with a third aspect of the present invention, a reproducing apparatus for reproducing an AV stream using a first data group and a second data group, includes first acquisition means for acquiring the first data group, second acquisition means for acquiring the second data group that is to be reproduced along with the first data group, storage means for storing the second data group acquired by the second acquisition means, extracting means for extracting, from the second data group stored on the storage means, first information indicating a path in the second data group in a file system of the storage means and second information indicating a path in a virtual file system of the second data group, detecting means for detecting a file system of the first data group, virtual file system generating means for generating the virtual file system containing at least a portion of each of the first data group and the second data group, based on the file system of the first data group detected by the detecting means, and the first information and the second information extracted by the extracting means, and reproducing means for reproducing the AV stream by reading the acquired first data group and second data group based on the virtual file system.

In accordance with the third aspect of the present invention, a reproducing method of a reproducing apparatus for reproducing an AV stream using a first data group and a second data group, includes steps of acquiring the second data group along with the first data group, storing the acquired second data group onto a storage section, extracting, from the second data group stored on the storage section, first information indicating a path in the second data group in a file system of the storage section and second information indicating a path in a virtual file system of the second data group, detecting a file system of the first data group, generating the virtual file system containing at least a portion of each of the first data group and the second data group, based on the detected file system of the first data group and the extracted first information and second information, and reproducing the AV stream by reading the first data group and the second data group based on the virtual file system.

In accordance with the third aspect of the present invention, a program for causing a computer to reproduce an AV stream using a first data group and a second data group, includes steps of acquiring the second data group along with the first data group, storing the acquired second data group onto a storage section, extracting, from the second data group stored on the storage section, first information indicating a path in the second data group in a file system of the storage section and second information indicating a path in a virtual file system of the second data group, detecting a file system of the first data group, generating the virtual file system containing at least a portion of each of the first data group and the second data group, based on the detected file system of the first data group and the extracted first information and second information, and reproducing the AV stream by reading the first data group and the second data group based on the virtual file system.

In accordance with the third aspect of the present invention, the second data group to be reproduced along with the first data group is acquired to reproduce the AV stream using the first data group and the second data group. The acquired second data group is stored. The first information and the second information are extracted from the second data group. The first information indicates the path in the second data group in the file system of the storage section and the second information indicates the path in the virtual file system of the second data group. The file system of the first data group is detected. The virtual file system containing at least a portion of each of the first data group and the second data group is generated based on the detected file system of the first data group and the extracted first information and second information. The AV stream is then reproduced by reading the first data group and the second data group based on the virtual file system.

In accordance with a fourth aspect of the present invention, a data delivery system includes a reproducing apparatus for reproducing an AV stream based on information recorded on a removable recording medium, and a data delivery apparatus for delivering data to the reproducing apparatus. The reproducing apparatus includes detecting means for detecting a file system of a first data group recorded on the recording medium, data acquisition means for acquiring a second data group delivered from the data delivery apparatus, first storage means for storing the second data group acquired by the data acquisition means, and virtual file system generating means for generating a virtual file system containing at least a portion of each of the first data group and the second data group, based on a file system of the first data group detected by the detecting means, and attribute information containing first information indicating a path in a file system of the second data group on the storage means and second information indicating a path in the virtual file system of the second data group. The data deliver apparatus includes second storage means for storing a plurality of second data groups, schedule management means for managing a delivery schedule of the second data group to the reproducing apparatus, and selecting means for selecting any of the plurality second data groups deliverable to the reproducing apparatus from among the plurality second data groups stored on the second storage means, based on the schedule managed by the schedule management means.

In accordance with the fourth aspect of the present invention, in the reproducing apparatus, the file system of the first data group recorded on the recording medium is detected, the second data group delivered from the data delivery apparatus is acquired, the acquired second data group is stored, and the virtual file system containing at least a portion of each of the first data group and the second data group is generated based on the file system of the first data group detected by the detecting means, and the attribute information containing the first information indicating the path in the file system of the second data group on the storage means and the second information indicating the path in the virtual file system of the second data group. In the data delivery apparatus, the plurality of second data groups are stored, the delivery schedule of the second data group to the reproducing apparatus is managed, and any of the plurality second data groups deliverable to the reproducing apparatus from among the plurality second data groups stored on the second storage means is selected based on the schedule managed by the schedule management means.

Advantages

Since the virtual file system is generated in accordance with one aspect of the present invention, the AV stream is reproduced using the first data group and the second data group based on the virtual file system.

In accordance with another aspect of the invention, information required to perform reproduction with the first data group and the second data group supplied to the reproducing apparatus being associated with each other is provided.

In accordance with yet another aspect of the invention, the virtual file system is created and data group contained in the virtual file system is delivered according to a predetermined schedule.

BRIEF DESCRIPTION OF THE DRAWINGS

FIG. 10 illustrates syntax of a manifest file.

FIG. 11 illustrates a value specifiable for operation_type.

FIG. 17 illustrates a definition of a content delivery file format of a content distributed by a content author.

FIG. 30 illustrates a list of deletable files displayed to a user.

FIG. 37 illustrates a syntax of an index file (index.bdmv).

FIG. 38 illustrates a syntax of indexes ( ).

FIG. 47 illustrates the relationship between a manifest file and a language of a referenceable caption.

FIG. 48 illustrates a mapping table of manifest files.

REFERENCE NUMERALS

1 reproducing apparatus, 11 optical disk, 21 controller, 22 optical disk drive, 23 memory, 24 local storage, 26 decoder, 31 menu screen display controller, 32 operation input acquisition unit, 33 data acquisition unit, 34 local storage directory manager 34, 35 optical disk directory manager, 66 file system merge processor, 37 playback controller, 252 download file determiner, 253 schedule manager, 301 reproducing apparatus, 311 decryption processor

BEST MODE FOR CARRYING OUT THE INVENTION

The embodiments of the present invention are described below with reference to the drawings.

Figure 1:
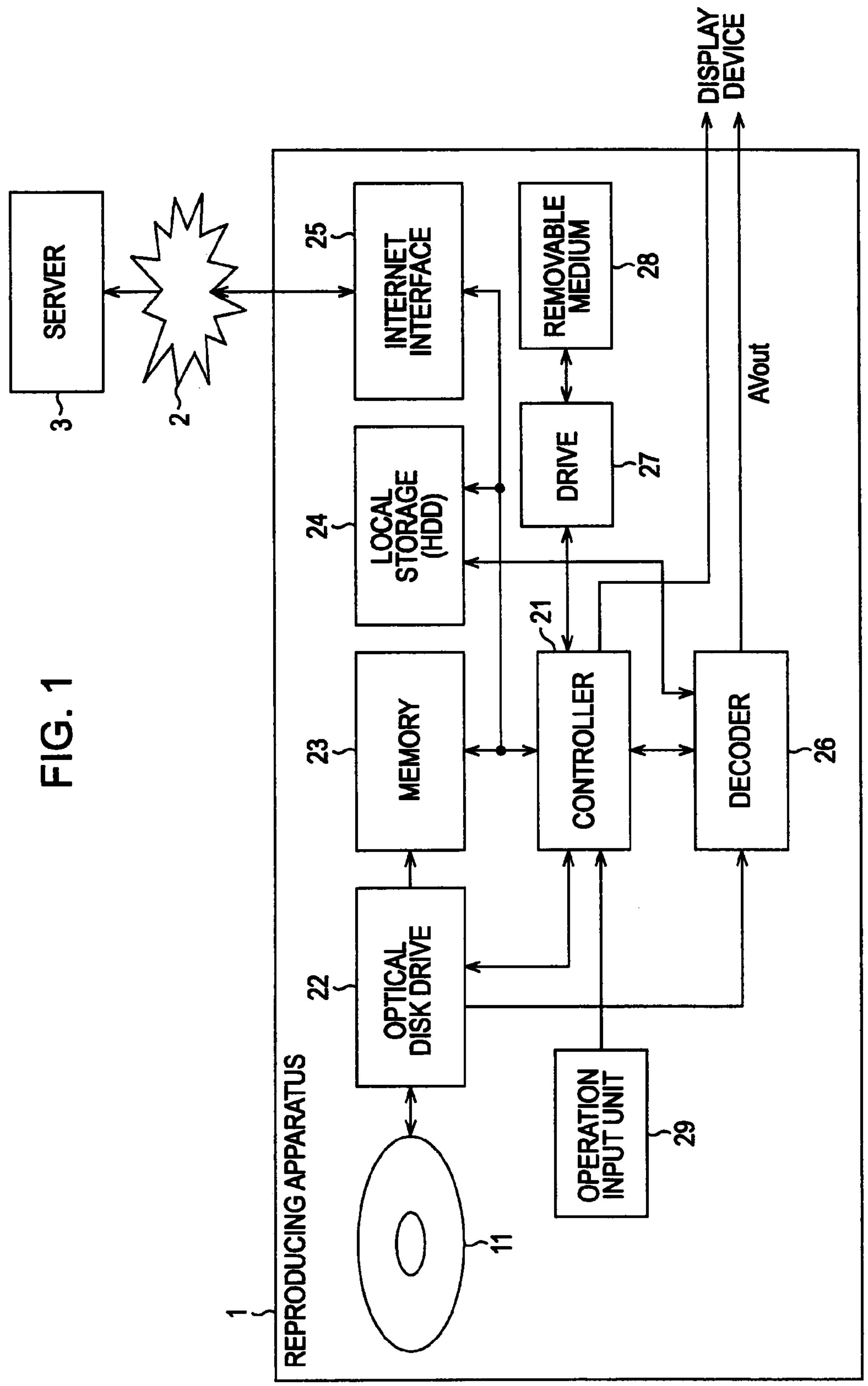
FIG. 1 is a block diagram illustrating a reproducing apparatus in accordance with a first embodiment of the present invention.

FIG. 1 is a block diagram illustrating the reproducing apparatus 1 in accordance with a first embodiment of the present invention.

A controller 21 executes a prepared control program. The controller 21 also reads a navigation program (to be discussed later) recorded on an optical disk 11 by controlling a optical disk drive 22, and expands the navigation program on a memory 23 to execute the navigation program. The controller 21 thus generally controls the reproducing apparatus 1. When the optical disk 11 is loaded, the controller 21 causes a predetermined menu screen to be displayed on an external display device.

Under the control of the controller 21, the optical disk drive 22 reads data from the optical disk 11, and outputs the read data to one of the controller 21, the memory 23, and a decoder 26. If information read from the optical disk 11 by the optical disk drive 22 is one of a navigation program and PlayList, the read information is supplied to one of the controller 21 and the memory 23. If the information read from the optical disk 11 by the optical disk drive 22 is one of an AV stream and text data, the read information is output to the decoder 26.

Figure 2:
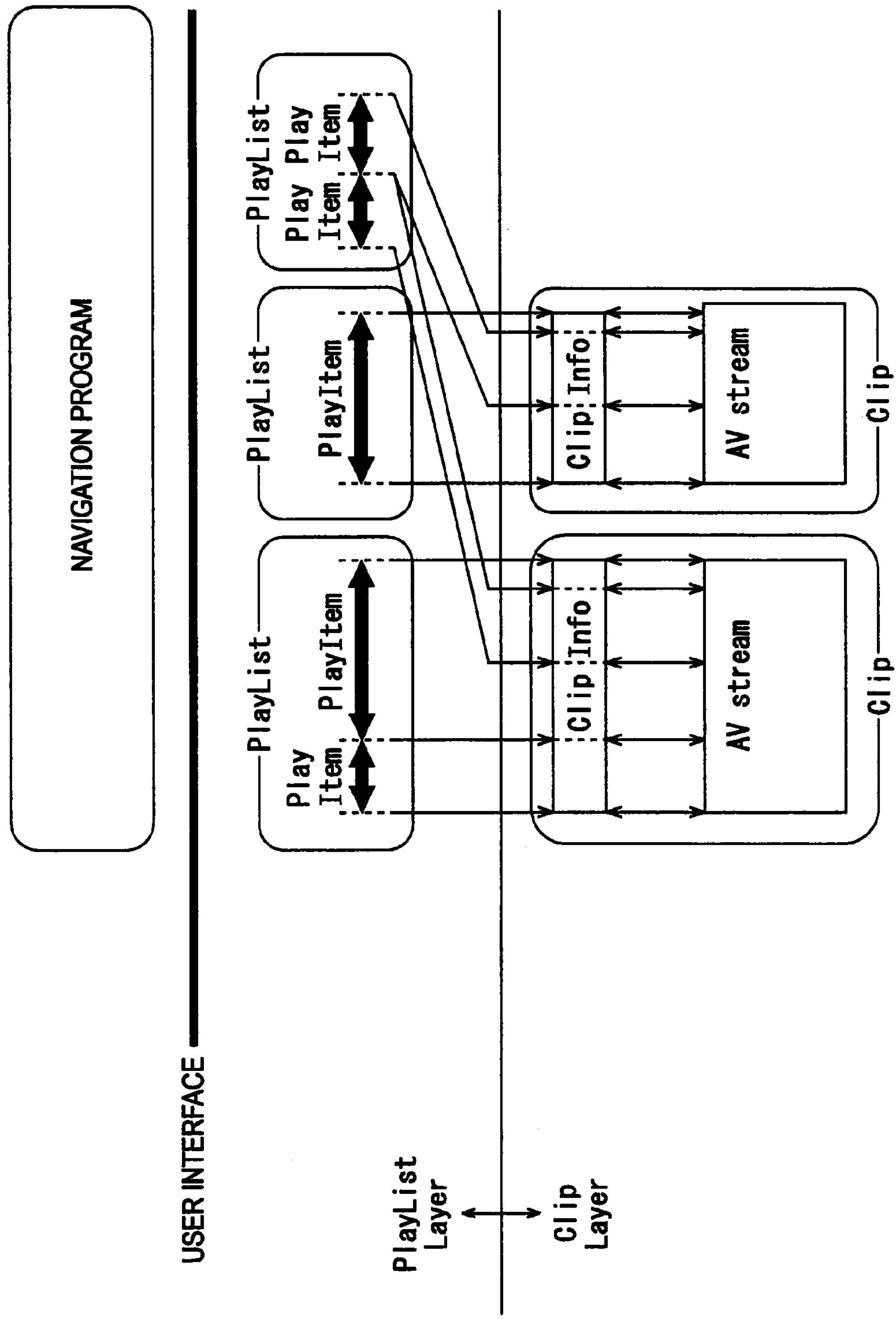
FIG. 2 illustrates an application format on a recording medium to be loaded on the reproducing apparatus of the first embodiment of the present invention.

FIG. 2 illustrates an application format of the optical disk 11 loaded on the reproducing apparatus 1 of the present invention. The recording medium is the optical disk 11 herein. Alternatively, the recording medium can be a magnetic disk, a semiconductor memory or the like.

The application format contains two layers of PlayList and Clip for managing an AV (audio-visual) stream. A pair of one AV stream or text data and clip information accompanying the AV stream or the text data is handled as one object and referred to as a clip. A data file of the AV stream is referred to as an AV stream file. A data file of the clip information is referred to as a clip information file.

Files used by computers are generally handled as byte strings. A content of an AV stream file is expanded along time axis, and an access point of the clip is typically specified by a timestamp in PlayList.

When the access point in the clip is specified by a timestamp in the PlayList, the clip information file is used to find, from the timestamp, address information at which decoding of the AV stream file is to be started.

The PlayList is a set of information indicating a reproduction period of the AV stream. Information indicating one reproduction period in the AV stream is referred to as PlayItem. PlayItem is represented by a pair of an IN point (reproduction start point) and an OUT point (reproduction end point) of the reproduction period along time axis. PlayList is composed at least one PlayItem as shown in FIG. 2.

As shown in FIG. 2, a first PlayList shown on the leftmost portion is composed of two PlayItems. The two PlayItems reference a first portion and a second portion of the AV stream contained in a first clip on the leftmost portion. A second PlayList from the left is composed of a single PlayItem. The PlayItem references the entire second clip shown on the right side. A third PlayList shown on a third position from the left is composed of two PlayItems. The two PlayItems reference a predetermined portion of the AV stream contained in the first clip and a predetermined portion of the AV stream contained in the second clip shown on the right side.

Navigation program is a program for causing the controller 21 to control the order of reproduction of PlayList and interactive reproduction of the PlayList. The navigation program has also a function to display a menus screen on which a user enters a command to execute reproduction. The navigation program is described in programming language such as Java (registered trademark), and recorded on a recording medium such as the optical disk 11. The controller 21 now executes the navigation program. If the first PlayItem contained in the first PlayList shown on the leftmost portion of FIG. 2 is specified as information indicating a reproduction position, the first portion of the AV stream contained in the first clip shown on the leftmost portion, referenced by the first PlayItem, is reproduced.

Figure 3:
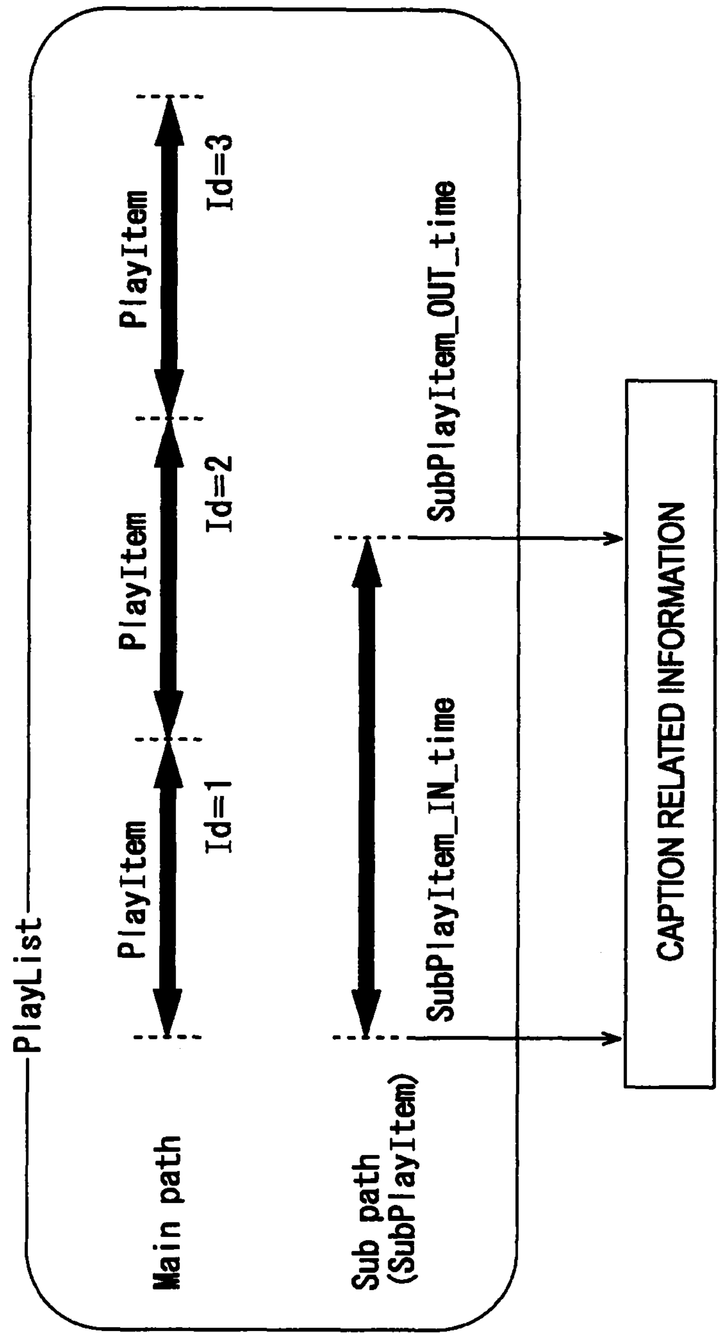
FIG. 3 illustrates another example of the application format on the recording medium to be loaded on the reproducing apparatus.

In addition to a main path specified by the PlayItem, sub path information specified by a sub play item of FIG. 3 can be contained in the PlayList of FIG. 2. With the SubPlayItem defined, a separate data stream not multiplexed with a clip (such as an MPEG 2 transport stream) specified by PlayItem can be reproduced in synchronization with the AV stream.

Caption-related information including a caption text file and a font file required for rendering and SubPlayItem specifying a reproduction period of the caption-related information are prepared in association with a clip AV stream of the main path specified by PlayItem. The clip AV stream is reproduced while a caption corresponding to data described in the caption text file is displayed on a display device in a display font based on the font data written in the font file. For example, dubbed-in voice data of a different language and SubPlayItem corresponding to the dubbed-in voice data are prepared in association with the clip AV stream of the main path specified by PlayItem. The clip AV stream is thus reproduced while the dubbed-in voice data of the different language is reproduced and output at the same time.

The SubPlayItem and the corresponding data (clip) may be recorded on the optical disk 11 or may be downloaded from the server 3 via the network 2 as additional data (update data) or may be acquired in a removable medium (such as a removable medium 28 to be discussed later). A method of downloading the additional data from the server 3 will be described in detail later with reference to FIG. 4.

Returning to FIG. 1, the apparatus is further described.

The memory 23 stores data the controller 21 requires to execute a variety of processes. A local storage 24 is an HDD (hard disk drive), for example. The local storage 24 may be a semiconductor memory instead of the HDD. The local storage 24 composed of the semiconductor memory may be removably mounted on the reproducing apparatus 1.

An Internet interface 25 is connected to the network 2 in a wired fashion or a wireless fashion. Under the control of the controller 21, the Internet interface 25 communicates with the server 3 via the network 2, and supplies data downloaded from the server 3 to the local storage 24. The server 3 downloads a content that updates the data discussed with reference to FIG. 2 and recorded on the optical disk 11 loaded on the reproducing apparatus 1. The local storage 24 records the content downloaded from the server 3 via the network 2.

The decoder 26 decodes the AV stream or text data, supplied from one of the optical disk drive 22 and the local storage 24, and outputs the resulting video signal and audio signal to the external display device. In response to the decoded signals from the decoder 26, the display device outputs the content of the optical disk 11 (i.e., displaying a video and outputting an audio).

The operation input unit 29 includes an input device including buttons, keys, touchpanel, jogdial, and the like, and a receiver receiving an infrared signal transmitted from a predetermined remote commander. The operation input unit 29 receives an operation input from a user, and supplies the operation input to the controller 21.

The controller 21 is connected to the drive 27, as necessary. A removable medium 28 is loaded on the drive 27. The removable medium 28 may include one of a magnetic disk (including a floppy disk), an optical disk (such as compact disk read-only memory (CD-ROM), or DVD), a magneto-optical disk such as Mini-Disk (MD (registered trademark)), and a semiconductor memory.

Data recorded on the optical disk 11 loaded on the reproducing apparatus 1 and data stored on the local storage 24 are reproduced as described below.

The reproducing apparatus 1 includes the local storage 24 such as HDD (Hard Disk Drive). The reproducing apparatus 1, connected to the network 2 in a wired fashion or a wireless fashion, stores on the local storage 24 the content downloaded from the server 3 via the network 2. The server 3 downloads the data that updates the content, such as a movie, recorded on the optical disk 11 loaded on the reproducing apparatus 1.

When the operation input unit 29 is commanded to reproduce the content recorded on the optical disk 11 with the downloaded content recorded on the local storage 24, the controller 21 associates the content recorded on the optical disk 11 with the content recorded on the local storage 24, and performs a reproduction process of the content.

The content on the optical disk 11 and the content on the local storage 24 are reproduced in association with each other as described with reference to FIG. 4.

For example, the optical disk 11 of FIG. 1 may be a medium sold in package, and record a movie content. Only an English caption text file, for example, may be recorded on the optical disk 11 as a caption data file that can be displayed superimposed on the video of the movie content.

Figure 4:
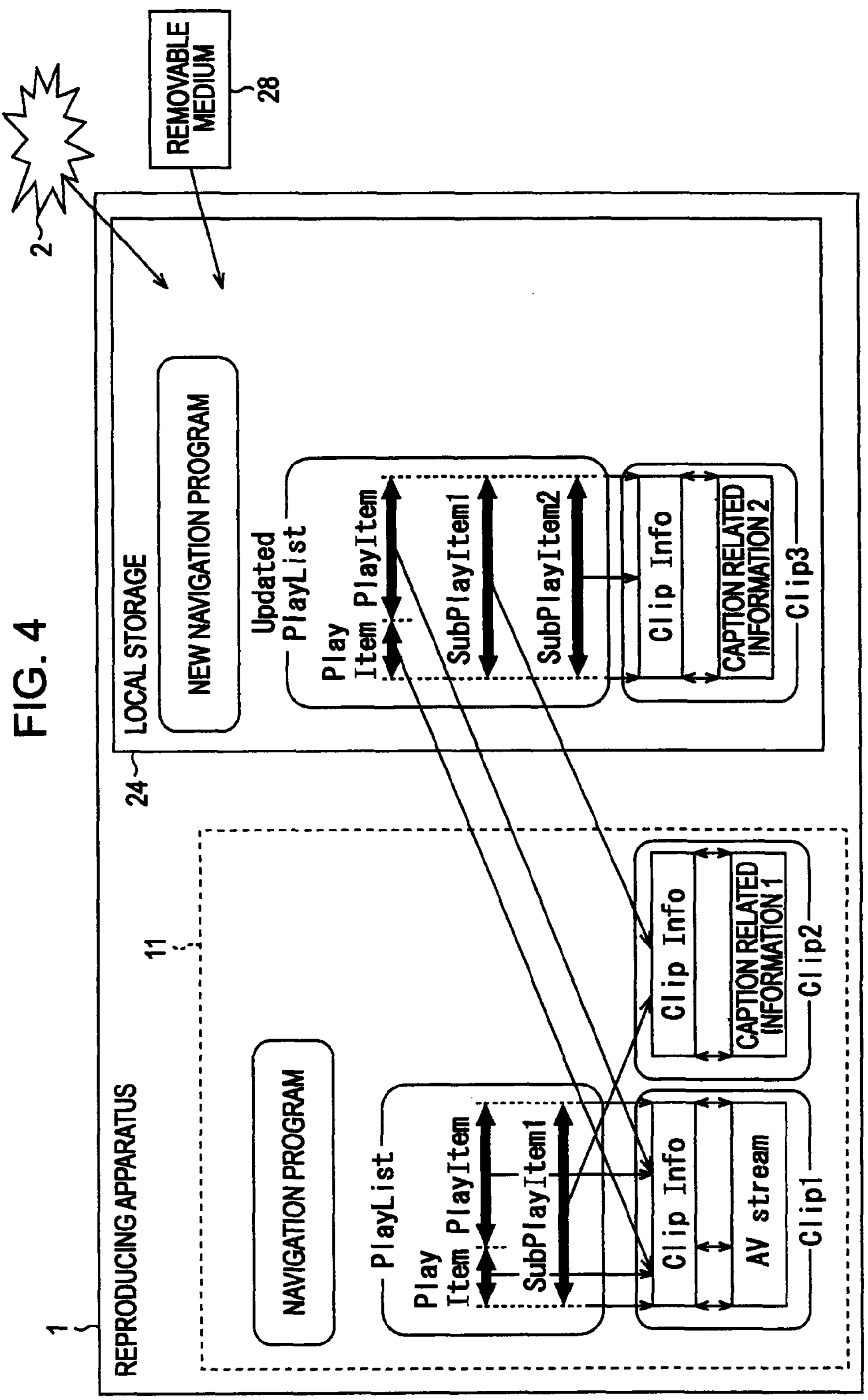
FIG. 4 illustrates a status of the reproducing apparatus on which a file has been downloaded.

The AV stream of clip 1 recorded on the optical disk 11 and referenced by the PlayItem of the PlayList, as shown in FIG. 4, is a stream for displaying the video of the movie content and reproducing the corresponding audio. Caption-related information 1 of Clip 2 referenced by the SubPlayItem of the PlayList is a caption text file for displaying an English caption to be superimposed on the video.

A user, for example, might want to view the movie content recorded on the optical disk 11 with a caption of a language different from English. The optical disk 11 has no recorded caption of the language different from English. In this condition, the user cannot view the movie with the caption data of the language different from English.

The user then downloads a caption text file of the desired language of the movie recorded on the optical disk 11 from the server 3 via the network 2 (or retrieves the caption text file from the removable medium 28). The caption text file of Arabic, for example, might be downloaded (or copied from the removable medium 28 to the local storage 24).

When the user issues an instruction to download the caption text file of Arabic corresponding to the PlayList prerecorded on the optical disk 11, the reproducing apparatus 1 accesses the server 3 and then downloads a file prepared on the server 3 for updating the content recorded on the optical disk 11.

With reference to FIG. 4, there are shown clip 3 composed of an Arabic caption text file (caption-related information 2) and a clip information file attached thereto, a PlayList file (updated PlayList file) enabled to control reproduction and displaying of caption data of clip 3 in addition to the video clip and the audio clip (AV stream data), and the English caption text file pre-recorded on the optical disk 11, and a new navigation program file updated from the navigation program file stored on the optical disk 11. These pieces of information are downloaded and stored on the local storage 24.

The updated PlayList includes SubPlayItem 1 and SubPlayItem 2, each representing a sub path, in addition to PlayItem representing a main path. The PlayItem of the updated PlayList is used to reference clip 1 containing the AV stream recorded on the optical disk 11. SubPlayItem 1 is used to reference clip 2 containing caption-related information 1 recorded on the optical disk 11. SubPlayItem 2 is used to reference clip 3, downloaded from the server 3 together with the updated PlayList, containing caption-related information 2 as the Arabic caption text file.

The new navigation program file of FIG. 4 specifies one of SubPlayItem 1 and SubPlayItem 2 together with PlayItem of the updated PlayList as a reproduction period. A desired video is associated with audio data. With this arrangement, the user can display one of the English caption defined by the English caption text file pre-recorded on the optical disk 11 and the Arabic caption defined by the Arabic caption text file not pre-recoded on the optical disk 11, whichever is desired.

When downloading from the server 3 (copying from the removable medium 28) is performed, the reproducing apparatus 1 can reproduce and display any of clip 2 as the English caption text file and clip 3 as the Arabic caption text file not pre-recoded on the optical disk 11. More specifically, the user selects a desired language from caption languages displayable on a menu screen presented on the display device. The user can thus view the movie on any of English caption and Arabic caption.

Figure 5:
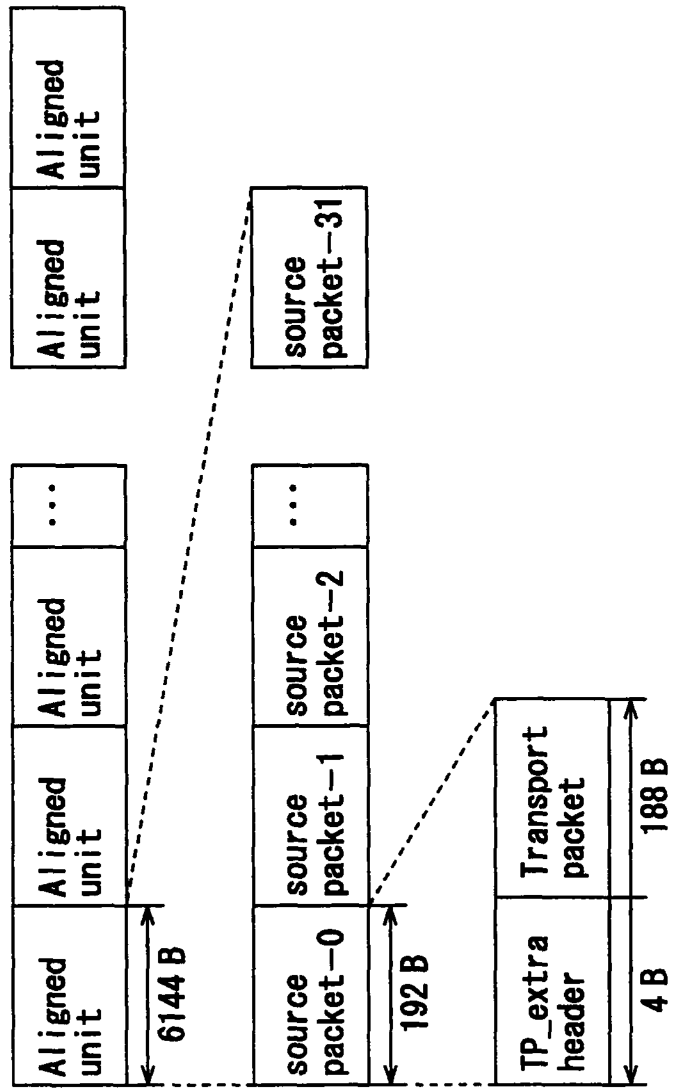
FIG. 5 illustrates an AV stream.

The AV stream recorded on the optical disk 11 includes a moving picture experts group (MPEG) 2 transport stream as shown in FIG. 5. Each MPEG 2 transport stream contains an integer number of aligned units. The aligned unit has a size of 6144 bytes (2048×3 bytes), and starts with a first byte of a source packet. The source packet is 192 bytes long. One source packet contains TP_extra_header and a transport packet. TP_extra_header is 4 bytes long, and the transport packet is 188 bytes long. One aligned unit is composed of 32 source packets. Data of a video stream or an audio stream is packetized into MPEG 2 PES (packetized elementary stream), and a PES packet is packetized into transport packets.

Figure 6:
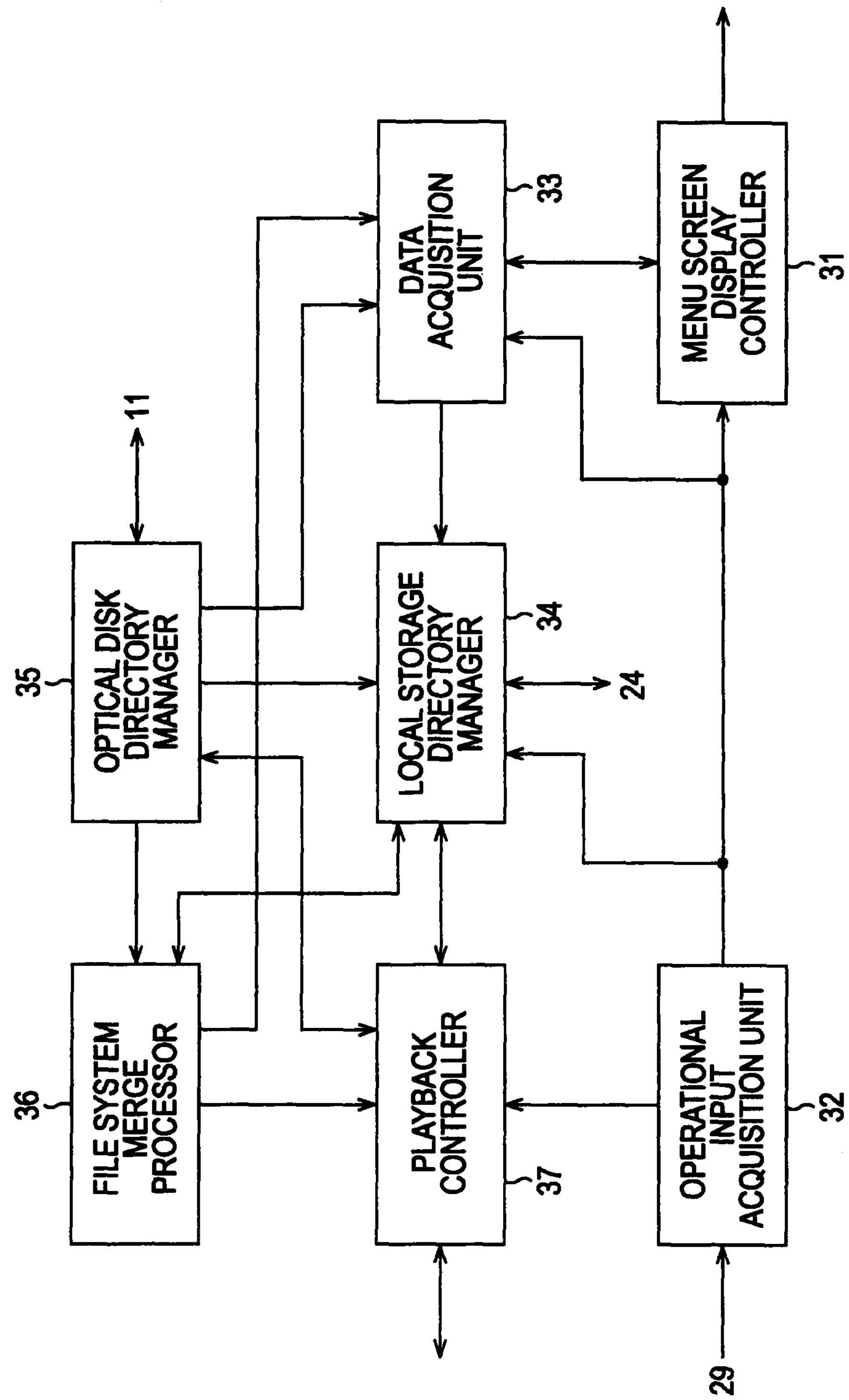
FIG. 6 is a block diagram illustrating a function of a controller of FIG. 1.

FIG. 6 is a functional block diagram illustrating the controller 21 of FIG. 1.

The functions of FIG. 6 are executed when the controller 21 performs a prepared control program or when the controller 21 performs a navigation program recorded on the optical disk 11.

A menu screen display controller 31 causes the external display device to display a menu screen. The menu screen shows buttons operated for the user to select the audio of the content recorded on the optical disk 11, the language of the caption, the angle of the video, and buttons operated for the user to select an update file to be downloaded, and a file to be deleted.

An operation input acquisition unit 32 acquires a signal indicating a operation input entered by the user via the operation input unit 29, and outputs the signal indicating the user operation input to any corresponding one of the menu screen display controller 31, a data acquisition unit 33, a local storage directory manager 34, and a reproduction controller 37.

The data acquisition unit 33 controls communications performed on the Internet interface 25 of FIG. 1 and information exchange with the removable medium 28 on the drive 27. For example, the data acquisition unit 33 downloads the update file indicated by the user from the server 3, and outputs the acquired file to the local storage directory manager 34. Upon receiving information indicating a required file from the file system merge processor 36 to be discussed later, the data acquisition unit 33 acquires the required file from the server 3 through downloading, and outputs the acquired file to the local storage directory manager 34.

The local storage directory manager 34 manages directories on the local storage 24, controls writing of data onto the local storage 24, reading of data from the local storage 24 and deleting of data from the local storage 24. The PlayList, read from the local storage 24 under the control of the local storage directory manager 34, is output to the memory 23. The audio data and the video data of the AV stream, and text data of the caption text file, read from the local storage 24, are output to the decoder 26. When the file system merge processor 36 merges a file system on the optical disk 11 with a file system on the local storage 24, the local storage directory manager 34 outputs information relating to the file system on the local storage 24 to the file system merge processor 36.

The optical disk directory manager 35 manages directories of the optical disk 11, and controls reading of data from the optical disk 11. The optical disk 11 has author_id and disc_id as identification information set thereon. The identification information author_id and disc_id read from the optical disk 11 under the control of the optical disk directory manager 35 are supplied to the data acquisition unit 33 and the local storage directory manager 34. The PlayList, read from the optical disk 11 under the control of the optical disk directory manager 35, is output to the memory 23. The audio data and the video data of the AV stream and the text data of the caption text file, read from the optical disk 11, are output to the decoder 26. When the file system merge processor 36 merges the file system on the optical disk 11 with the file system on the local storage 24, the optical disk directory manager 35 outputs information relating to the file system on the optical disk 11 to the file system merge processor 36. The identification information author_id and disc_id will be described later.

The file system merge processor 36 merges the file system on the optical disk 11 supplied from the optical disk directory manager 35 and the file system on the local storage 24 supplied from the local storage directory manager 34, thereby creating a single virtual file system. The file system merge processor 36 outputs the created virtual file system to the reproduction controller 37.

In a process to be discussed later, the file system merge processor 36 determines whether a deletion of several files recorded on the local storage 24 can cause a malfunction in a link structure of files in the virtual file system (in the link structure, data is linked to reproduce the clip in accordance with the PlayList based on an application format of the optical disk 11 as discussed with reference to FIGS. 2 through 4). If the file system merge processor 36 determines that a malfunction can take place in the link structure of the files in the virtual file system, a file required to correct the malfunction is extracted. Information regarding the required file is supplied to the data acquisition unit 33. The required file can be downloaded as necessary.

When several files are deleted from the local storage 24, a file that cannot be reproduced in accordance with any PlayList in the virtual file system (i.e., cannot be specified by any of PlayLists) occurs. In the process to be discussed later, the file system merge processor 36 commands the local storage directory manager 34 to delete such an unnecessary file.

Whether or not to delete the unnecessary file caused in response to the deletion of files may be set by the user.

The reproduction controller 37 executes the navigation program specified by the virtual file system supplied from the file system merge processor 36, and controls reproduction of content. More specifically, the reproduction controller 37 references the PlayList supplied to and stored on the memory 23, and controls the local storage directory manager 34 and the optical disk directory manager 35 to read the audio data and the video data of the AV stream and, as necessary, the text data of the caption text file from the optical disk 11 and the local storage 24 based on the virtual file system. The reproduction controller 37 controls the decoder 26 of FIG. 1 to decode (reproduce) the audio data and the video data of the AV stream and, as necessary, the text data of the caption text file stored on one of the optical disk 11 and the local storage 24.

The file system merge processor 36 merges the file system on the optical disk 11 with the file system for managing a data group that is downloaded from the server 3 and recorded on the local storage 24. The merging operation is performed when the optical disk 11 is loaded on the reproducing apparatus 1, when the reproduction of a content recorded on the reproducing apparatus 1 is requested, when inputting or outputting of any data recorded on one of the optical disk 11 and the local storage 24 is requested, or when the user issues a command to perform the merging operation.

Figure 7:
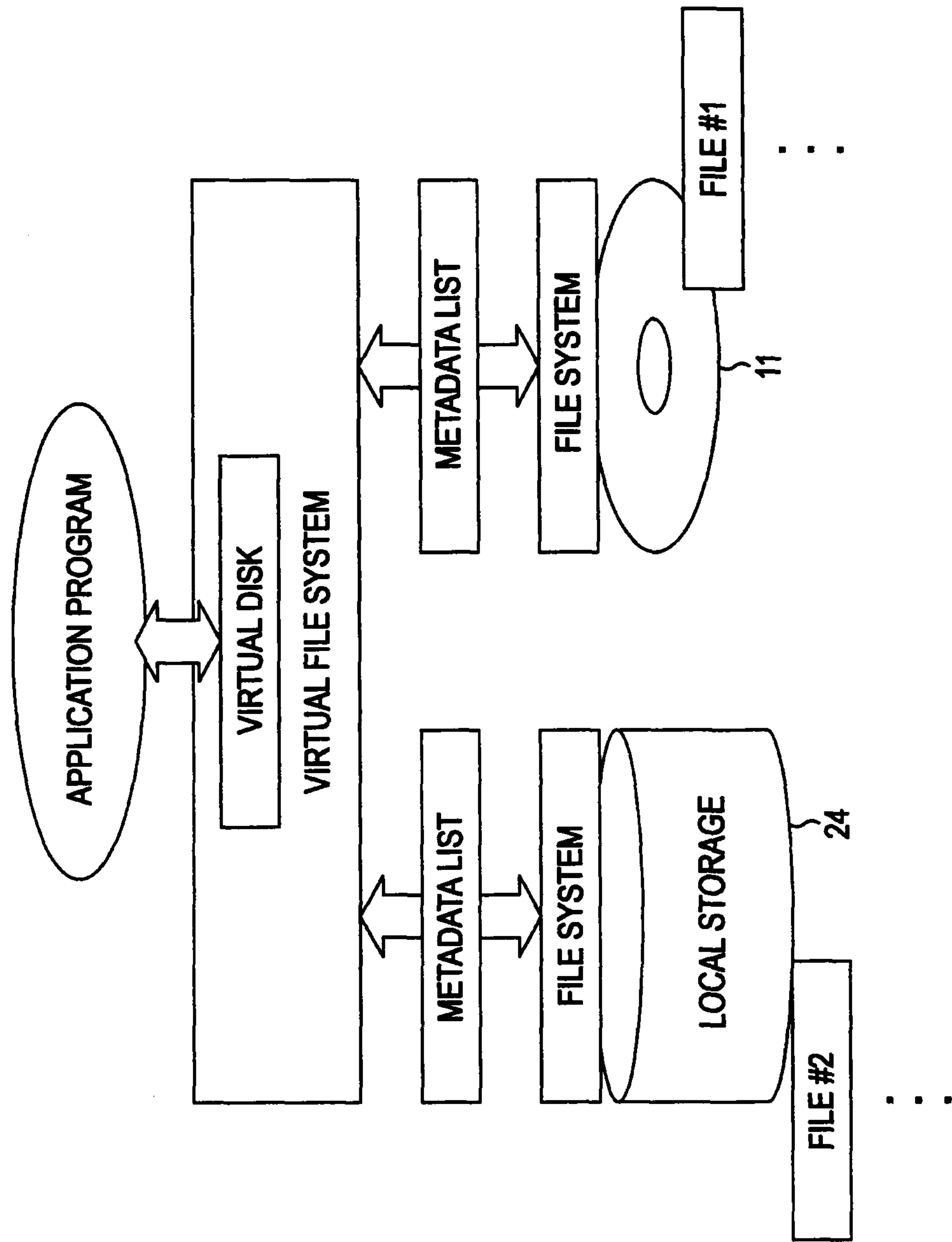
FIG. 7 illustrates a virtual file system.

A virtual file system is defined as an upper layer of a native file system of the system of the reproducing apparatus 1 (i.e., the file system of the data actually recorded on one of the optical disk 11 and the local storage 24). More specifically, as shown in FIG. 7, an application program and a user handling the application program can recognize only the virtual file system as an upper layer. The application program causes the local storage 24 to record new data by downloading the new data from the server 3, and reproduces the data actually stored on one of the optical disk 11 and the local storage 24. The virtual file system abstracts the native file system, thereby hiding a native structure such as a physical device and an operating system in the reproducing apparatus 1.

The main functions of the virtual file system include mounting a file/directory on a physical device (such as the optical disk 11 or the local storage 24) to create a file system of a virtual disk recognized by the user, and supplying a file access application programming interface (API) to the created virtual disk.

Figure 8:
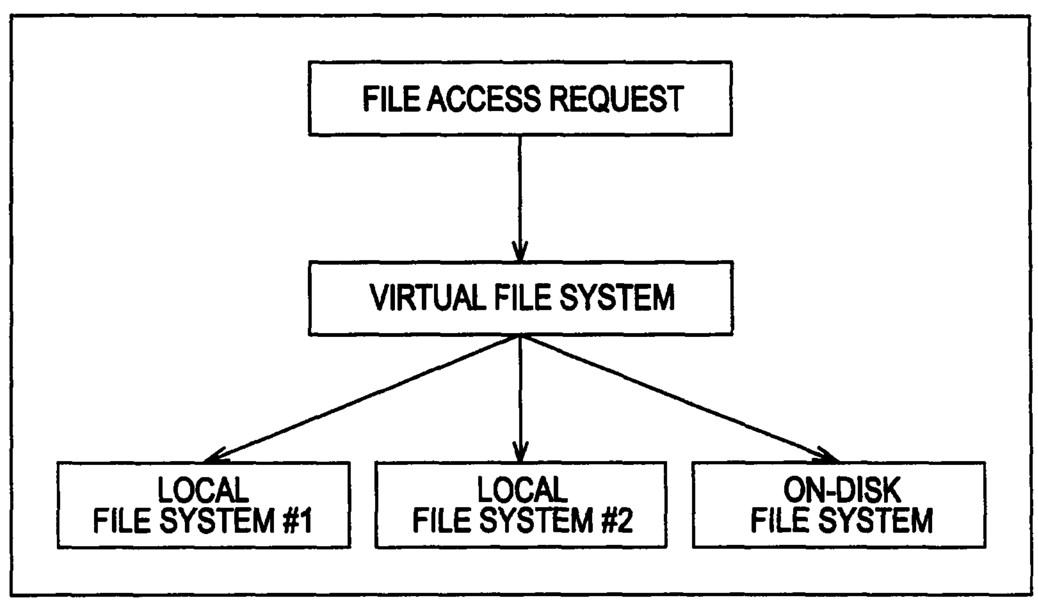
FIG. 8 illustrates the virtual file system.

When the user enters an operation input requesting an access to any file recorded on one of the optical disk 11 and the local storage 24, the application program of FIG. 8 can recognize only the virtual file system. A local file system #1, and a local file system #2 recorded on one of the optical disk 11 and the local storage 24 and the structure of the file system of the optical disk 11 are hidden from the application program and the user handling the application program, and can be accessed via the virtual file system.

To perform a file access request of FIG. 8, the application program of the reproducing apparatus 1 calls an API (Application Programming Interface) for file input and output provided by the virtual file system, and then accesses the data stored on one of the optical disk 11 and the local storage 24 without being aware of the physical structure of the disk drive and the software structure of the file system. More specifically, the API of the virtual file system calls, in practice, API of the native file system within the reproducing apparatus 1.

The virtual file system provides a variety of types of APIs. For example, the virtual file system provides an open API ( ) for opening a specified file, a close ( ) API for closing a specified file, a seek ( ) API for setting a reading position or writing position of a specified file, a stat ( ) API for acquiring status of specified file, a read ( ) API for reading a specified file, a write ( ) API for writing a specified file, etc. The application program executed by the reproduction controller 37 manipulates the files stored on one of the optical disk 11 and the local storage 24 using these APIs.

Figure 9:
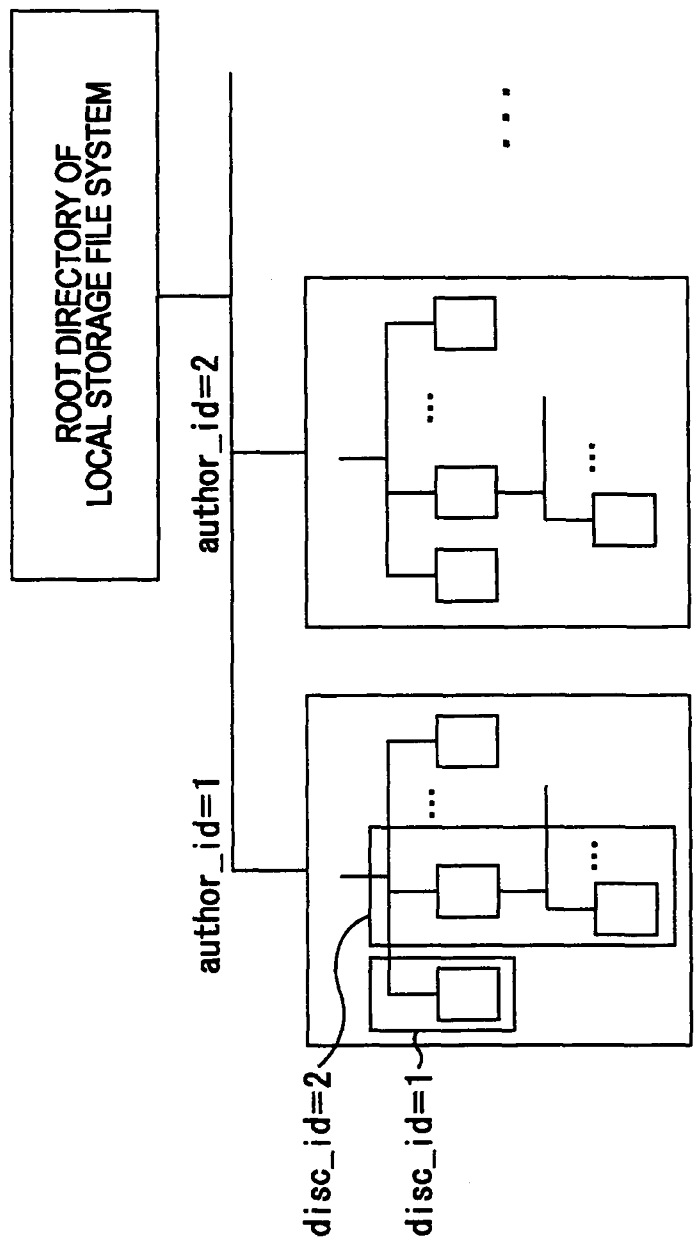
FIG. 9 illustrates a directory structure of a local storage.

The virtual file system has a function of dividing and managing a disk area of the local storage 24. As shown in FIG. 9, the disk area of the local storage 24 has a directory structure in which the disk area is divided into divisions for suppliers of contents (content authors) on a per supplier basis. Directories disc_id immediately under author_id are flexibly configured in a file/directory structure by a content author. A description of metadata (manifest data to be discussed later) contained in the downloaded data defines where to place data on the local storage 24, i.e., defines the file/directory structure of the downloaded file.

In the file/directory structure of the local storage 24, author_id dividing the directory is an identifier uniquely identifying an entity managing the metadata (manifest data to be discussed later) contained in the downloaded data. More specifically, the author_id identifier uniquely identifies an entity including a content producer, a motion picture company, or a group including a plurality of content producers and motion picture companies. An identifier disc_id uniquely identifies the optical disk 11 provided by the content producer identified by the author_id identifier. These identifiers are contained in the metadata of the downloaded data. The metadata (manifest data) and the author_id and disc_id identifiers will be described later.

The file/directory structure of the virtual disk accessible by the application is compatible with the file/directory structure of the optical disk 11. More specifically, the data file structure under the author_id and disc_id identifiers is merged with the data file structure of the optical disk 11. The virtual file system of the virtual disk having file/directory structure compatible with the file/directory structure of the optical disk 11 is thus configured.

The virtual file system also has a function of managing manifest files to be discussed later in addition to the directory and file management function. The purpose of the virtual file system of defining fields of the metadata to a file model of a native file system is three fold, i.e., to display a name representing a content rather than displaying a path or a name of a file of the local storage 24, to prevent double updating of the same file in a download process, and to define a path name in the virtual file system, namely, a path name during reproduction of the optical disk 11.

The virtual file system provides two functions in metadata management, namely, operation of a manifest file and operation of metadata. The manifest file is metadata representing a variety of attributes of the downloaded files. Manifest ( ) may be stored in a corresponding file or may be merged with one file with a manifest_id identifier (to be discussed later with reference to FIG. 10) of a manifest ( ) section used as a key for identification. In either case, the file is referred to as a manifest file. The reproducing apparatus 1 storing the file downloaded to the local storage 24 must also store a manifest file. The manifest file may be described in mark-up language text such as XML.

FIG. 10 illustrates a syntax of the manifest file.

The manifest_id identifier is an identifier of the manifest ( ) section.

A author_id field specifies an entity managing the manifest file. More specifically, the author_id field specifies an identifier uniquely identifies a content producer, a motion picture company, or a group including a plurality of content producers and motion picture companies. The identifier is determined by referencing the author_id field of a content distribution file to be discussed later with reference to FIG. 17. The application program or the user can freely set any value to this field.

A disc_id field is used to specify an identifier uniquely identifying the optical disk 11 to the content producer identified by the author_id identifier. The identifier is determined by referencing the disc_id field of the content distribution file to be discussed later with reference to FIG. 17. The application program or the user can freely set any value to this field.

A version field is used by a content author to manage history. History number is within an integer range from 1 to 255, and the larger the number, the newer the content is. The identifier is determined by referencing the version field of the content distribution file to be discussed with reference to FIG. 17. Neither the application program nor the user can set freely a value to this field.

In a display_name field, a name easily recognizable to the user is defined here. More specifically, a character string such as "Japanese caption of title XXX", which could be difficult to imagine from a file name alone, is set in the display_name field. The character string is coded in accordance with ISO/IEC 10646-1.

In a source field, information indicating a source of a file is described. The value in this field is coded in accordance with ISO/IEC 646. In the case of network downloading, a URL of a download source is described.

An operation_type field is an 8-bit long field in which the content author specifies a file updating method. FIG. 11 lists values specifiable to the operation_type field.

If 0x01 is described in the 8-bit operation_type field, the file updating method in an archive is substitution (replacement) of PlayList. More specifically, an update file with 0x01 written in the 8-bit operation_type field is downloaded. In the virtual file system produced in a merging operation based on the update file, the PlayList downloaded and recorded on the local storage 24 is referenced as is, and the PlayList of the optical disk 11 is not referenced at all.

Figure 18:
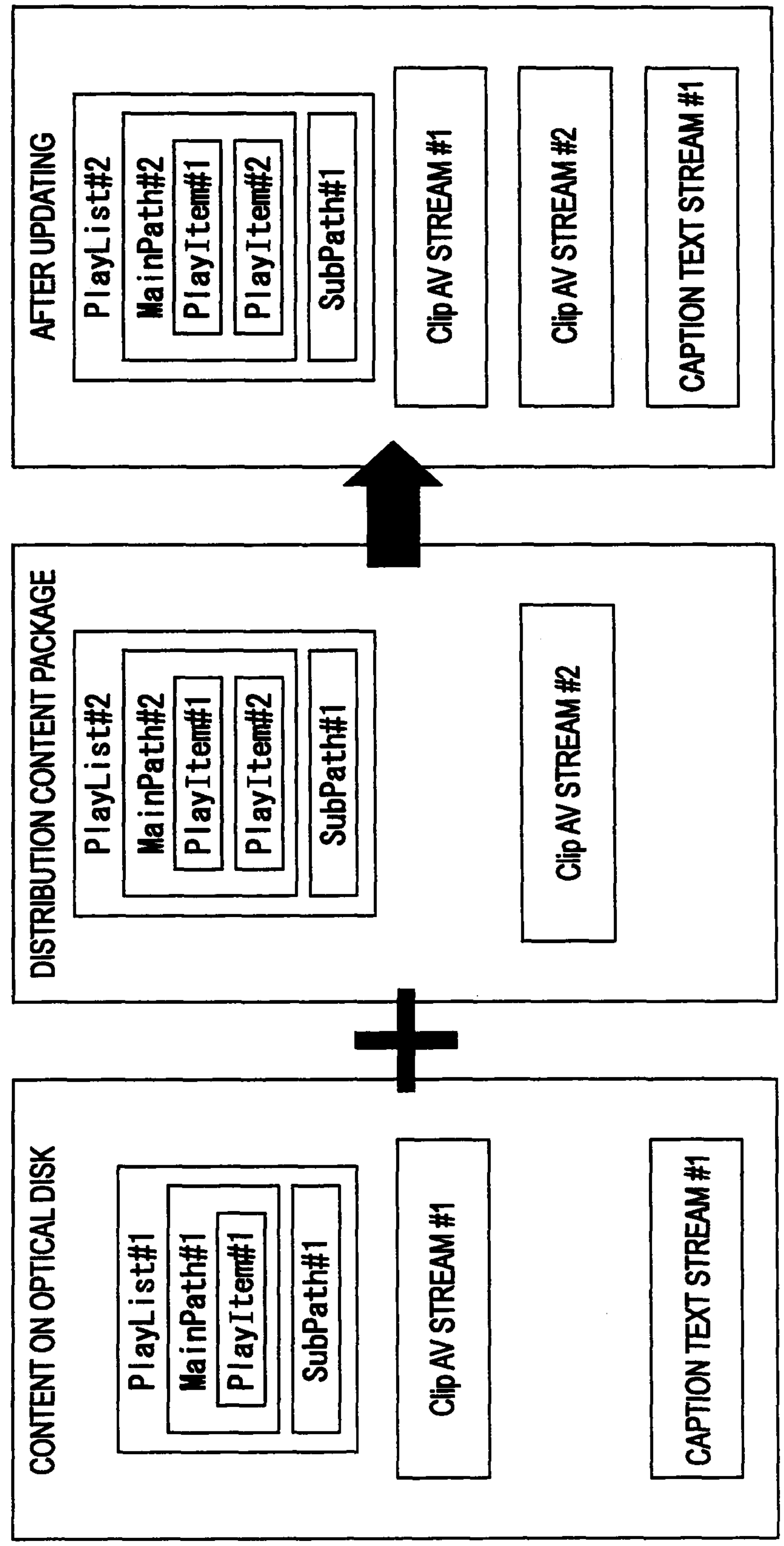
FIG. 18 illustrates a content recorded on an optical disk loaded on the reproducing apparatus with MainPath added to the content.

The file updating method performed with 0x01 described in the 8-bit operation_type field will be described in detail later with reference to FIGS. 18 and 19.

If 0x02 is described in the 8-bit operation_type field, a SubPath element is extracted from the downloaded file, and the file systems are merged for updating so that the extracted SubPath element is added to a SubPath element recorded on the optical disk 11.

Figure 20:
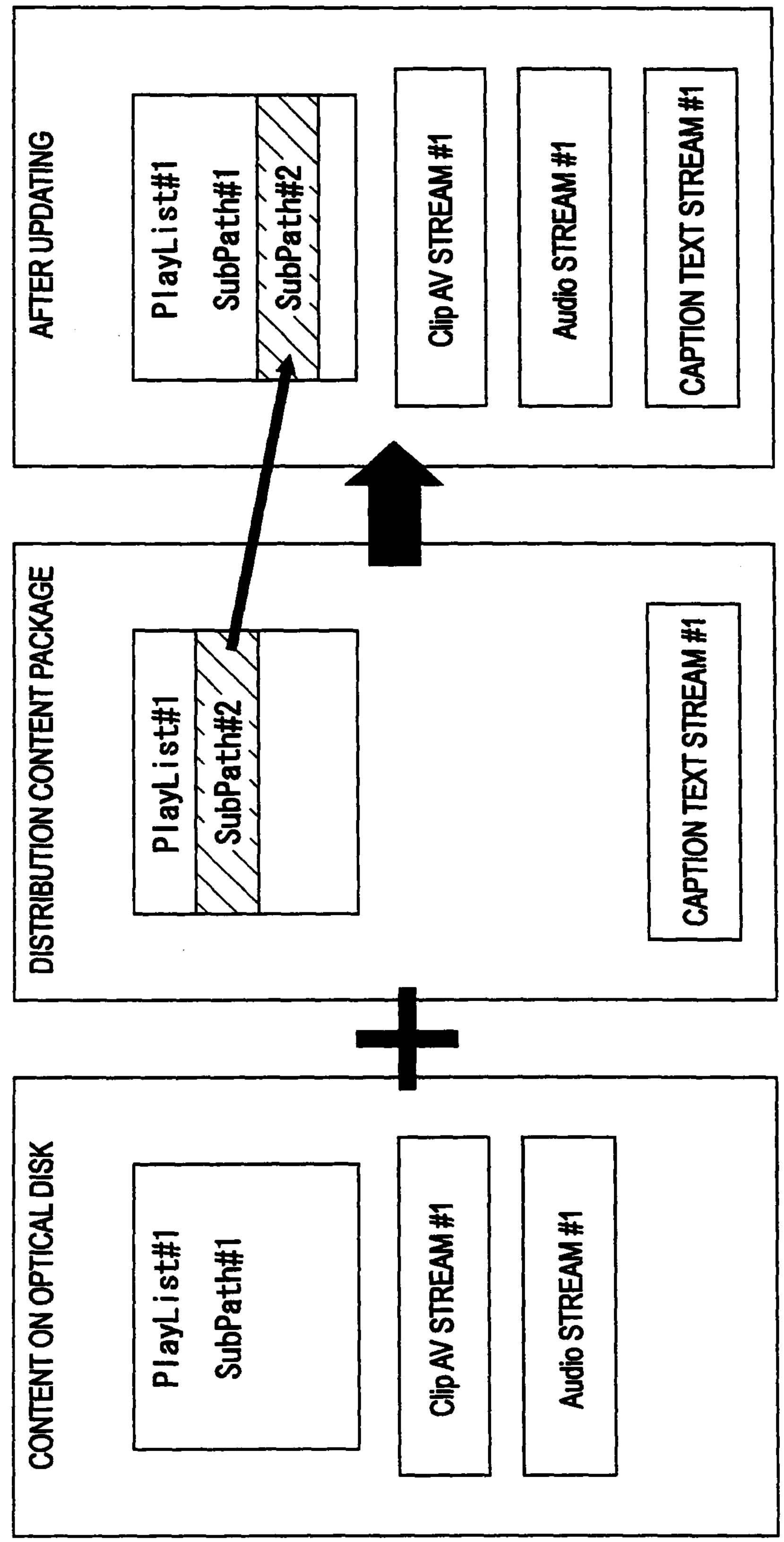
FIG. 20 illustrates the content recorded on the optical disk on the reproducing apparatus with SubPath added to the content.

The file updating method performed with 0x02 described in the 8-bit operation_type field will be described in detail later with reference to FIGS. 20 and 21.

If 0x03 is described in the 8-bit operation_type field, a SubPlayItem element is extracted from the downloaded file and the file systems are merged for updating so that the extracted SubPlayItem element is added to a SubPlayItem element recorded on the optical disk 11.

The file updating method performed with 0x03 described in the 8-bit operation_type field will be described in detail later with reference to FIGS. 22 through 25.

If 0x04 is described in the 8-bit operation_type field, a SubClip_entry element is extracted from the downloaded file and the file systems are merged for updating so that the extracted SubClip_entry element is added to a SubClip_entry element recorded on the optical disk 11.

Figure 26:
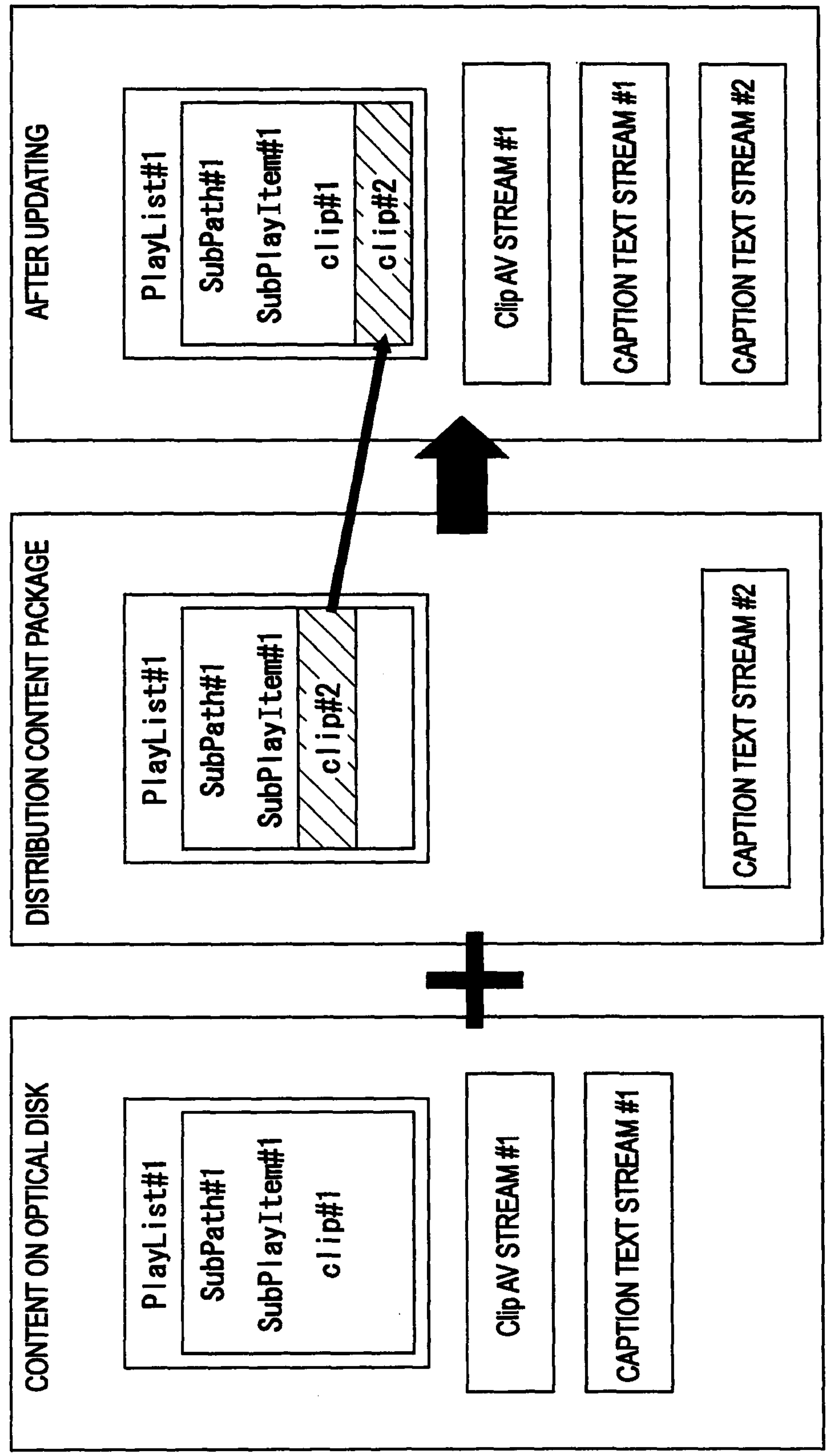
FIG. 26 illustrates the content recorded on the optical disk on the reproducing apparatus with Clip added to the content.

The file updating method performed with 0x04 described in the 8-bit operation_type field will be described in detail later with reference to FIGS. 26 and 27.

A permission field is used for the content author to specify whether to set approval information as a visible attribute or an invisible attribute.

Figures 12, 13:
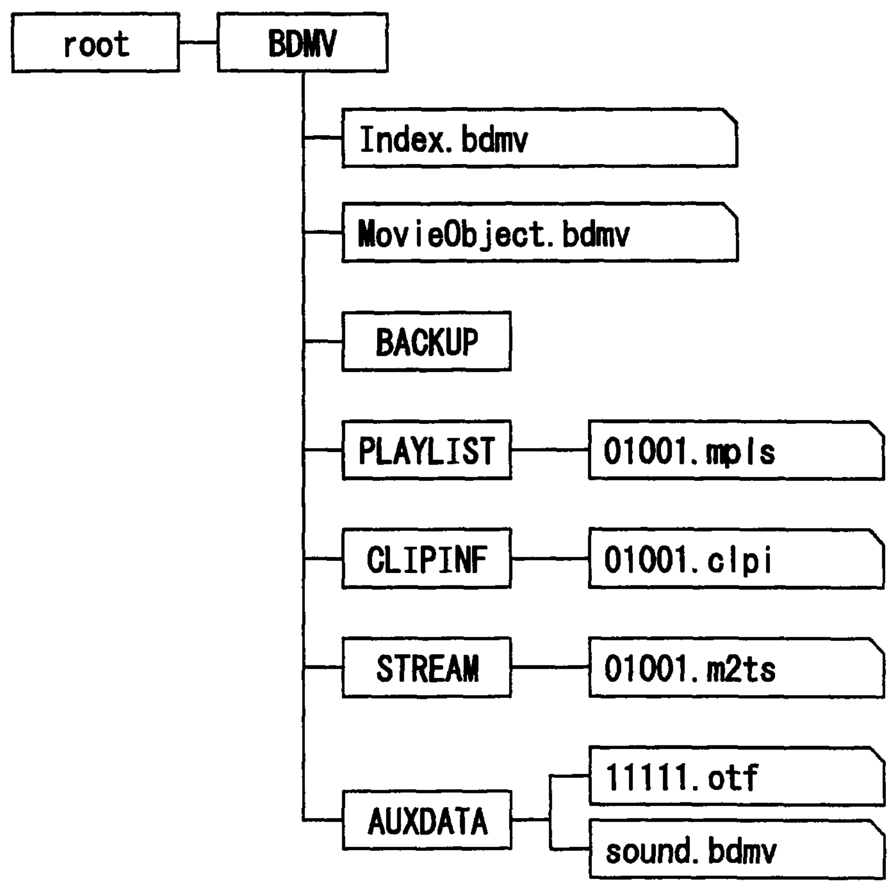
FIG. 12 illustrates a value specifiable for permission contained in manifest ( ).
FIG. 13 illustrates a file system of an optical disk.

FIG. 12 lists values specifiable for the permission field contained in the manifest ( ) of FIG. 10.

If 0x00 is described in the 8-bit permission field, the attribute of a file accompanied by this metadata is invisible to the user. If 0x01 is described in the 8-bit permission field, the attribute of a file accompanied by this metadata is visible to the user. If 0x02 is described in the 8-bit permission field, the attribute of a file accompanied by this metadata is overwrite inhibited.

A src_file_name field contains information that uniquely identifies where the corresponding file is recorded in the directory structure of the file system of the local storage 24. More specifically, this field specifies a "path name" representing a path identifying a file with a file location in the hierarchical layer structure of the file system of the local storage 24. Names of the file and directory representing the path name are coded in accordance with ISO/IEC 646 Standards.

A dst_file_name field contains information that uniquely identifies where the corresponding file is recorded in the directory structure at a bind destination in a virtual disk of the file actually recorded on the local storage 24. More specifically, this field specifies a "path name" representing a path identifying a file with a file location in the hierarchical layer structure of the virtual file system. Names of the file and directory representing the path name are coded in accordance with ISO/IEC 646 Standards.

The src_file_name and the dst_file_name fields can have the same file name.

An operational procedure of the metadata is described below.

The virtual file system defines API for reading the content of the manifest ( ) file without disclosing the file name, the file location, or the physical structure of the manifest ( ) file to the application program or the user.

More specifically, the application program or a resident program to be executed by the reproducing apparatus 1 can indirectly access the manifest ( ) file by calling the following APIs:

getProperty argument 1:

character string type data absolute path name of a file to be operated using metadata argument 2:

character string type data element name of metadata to be read return value:

character string type data metadata corresponding to an element specified by argument function:

reading metadata from manifest ( ) file

In practice, detailed definition of API, such as type information, needs to be modified depending on programming language specifications of software execution environment of the reproducing apparatus 1.

FIG. 13 illustrates the file system of the optical disk 11. As shown in FIG. 13, the file system of the optical disk 11 has a directory structure.

A directory named "BDMV" is arranged under the root directory of the optical disk 11. Under the directory "BDMV", a file named "Index.bdmv" and a file named "MoveObject.bdmv" are stored. Hereinafter, these files are referred to as an Index file and a MoveObject file, respectively, as appropriate. Each file is referred to as a designation of a file name followed by "file", and each directory is referred to as a directory name followed by "directory".

The Index file contains information relating to a menu for the reproduction of the optical disk 11. The reproducing apparatus 1 causes a display device to display a reproduction menu screen based on the Index file. The reproduction menu screen shows items for reproducing all contents on the optical disk 11, reproducing a particular chapter only, reproducing repeatedly a particular chapter, and displaying an initial menu. MovieObject that is executed with any item selected is set in the Index file. When a user selects one item from the reproduction menu screen, the reproducing apparatus 1 executes a MoveObject command set in the Index file.

The MovieObject file includes MovieObject. MovieObject includes a command controlling the reproduction of the PlayList recorded on the optical disk 11. The reproducing apparatus 1 selects and executes one of MovieObjects recorded on the reproducing apparatus 1, thereby reproducing the content recorded on the optical disk 11.

Arranged further under the BDMV directory are a directory named "BACKUP" (BACKUP directory), a directory named "PLAYLIST" (PLAYLIST directory), a directory named "CLIPINF" (CLIPINF directory), a directory named "STREAM" (STREAM directory), and a directory named "AUXDATA" (AUXDATA directory).

The BACKUP directory stores files and data to back up files and data recorded on the optical disk 11.

The PLAYLIST directory stores a PlayList file. Each PlayList file name is composed of a file name of a five digit number with an extension .mpls attached thereto as shown in FIG. 13.

The CLIPINF directory stores a clip information file. Each clip information file is composed of a file name of a five digit number with an extension .clpi attached thereto as shown in FIG. 13.

The STREAM directory stores a clip AV stream file and a substream file. Each stream file has a file name of a five digit number with an extension .m2ts attached thereto as shown in FIG. 13.

The AUXDATA directory stores files of data not contained in but referenced from the clip AV stream file and the substream file and data used separately from the clip AV stream and the substream file. As shown in FIG. 13, the AUXDATA directory stores a caption font file named "11111.otf" and an effect sound file named "sound.bdmv."

The optical disk 11 stores the author_id and disc_id identifiers in the form of secure electronic data that cannot be rewritten by the user, or in the form of physical pits. The author_id identifier identifies a content author (also referred to as title author) of a content manufacturer of the optical disk 11, such as a production company or a distributing agency of a movie. The disc_id identifier identifies the type of the optical disk 11 manufactured by the title author identified by the author_id identifier.

Figure 14:
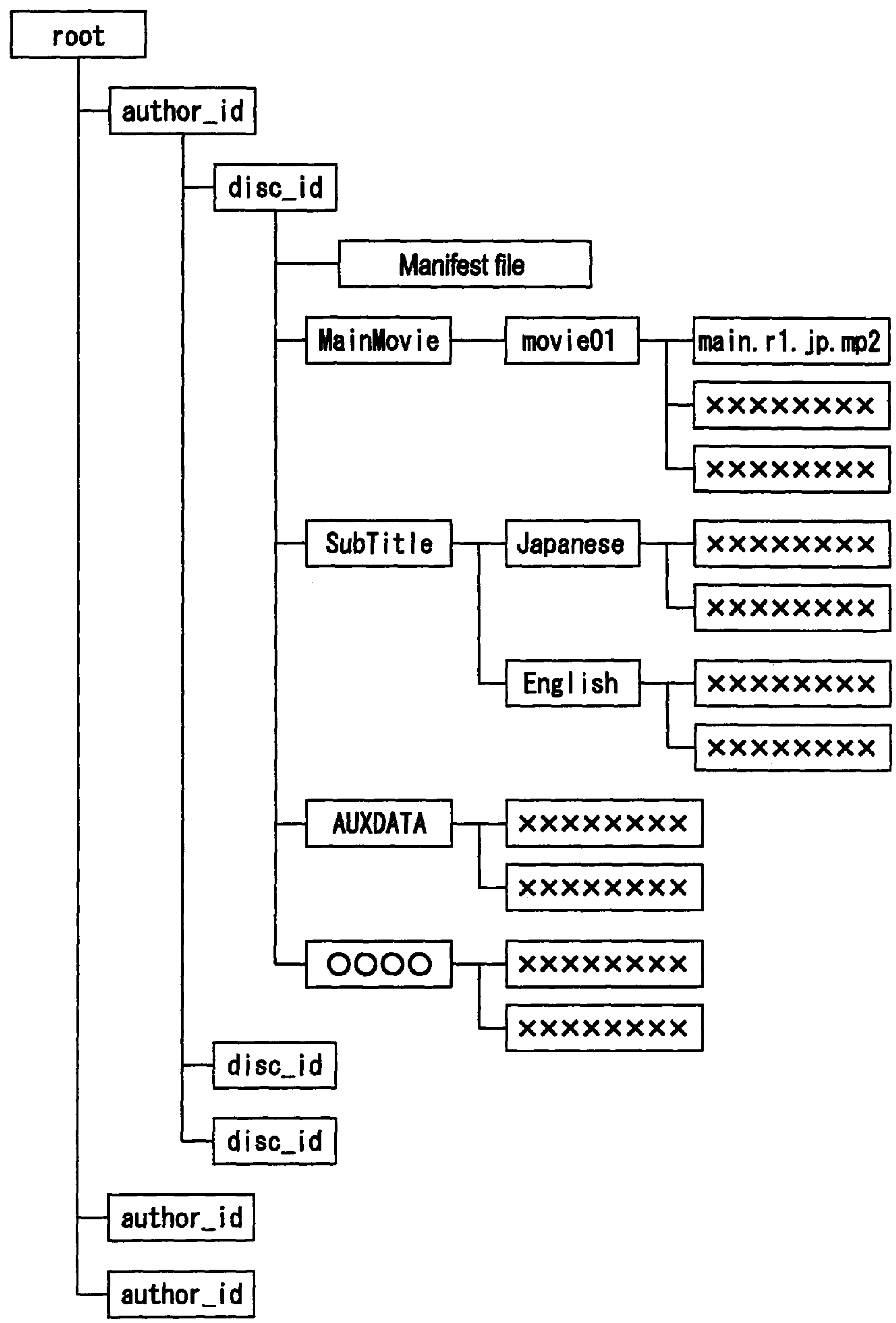
FIG. 14 illustrates a file system of a local storage 24.

FIG. 14 illustrates the file system of the local storage 24. As shown in FIG. 14, the file system of the local storage 24 has also a directory structure.

At least one directory named "author_id" is arranged under the root directory of the local storage 24. At least one directory named "disc_id" is arranged under the author_id directory. The disc_id directory includes a set of manifest ( ) sections or a manifest file composed of one manifest ( ) section. The structure of the other directories and files is freely set by the content author. The other directories and files may have the same file/directory structure as the one of the optical disk 11 discussed with reference to FIG. 13, or may have the one as discussed with reference to FIG. 14, which is quite different from the file/directory structure discussed with reference to FIG. 13.

As shown in FIG. 14, the "disc_id" directory includes, in addition to the manifest file, a plurality of directories including a "MainMovie" directory, a "SubTitle" directory, and an "AUXDATA" directory. Those directories may further contain folders and files.

The file/directory structure of the local storage 24 of FIG. 14 is invisible to the application program executed by the reproducing apparatus 1 or the user.

Figure 15:
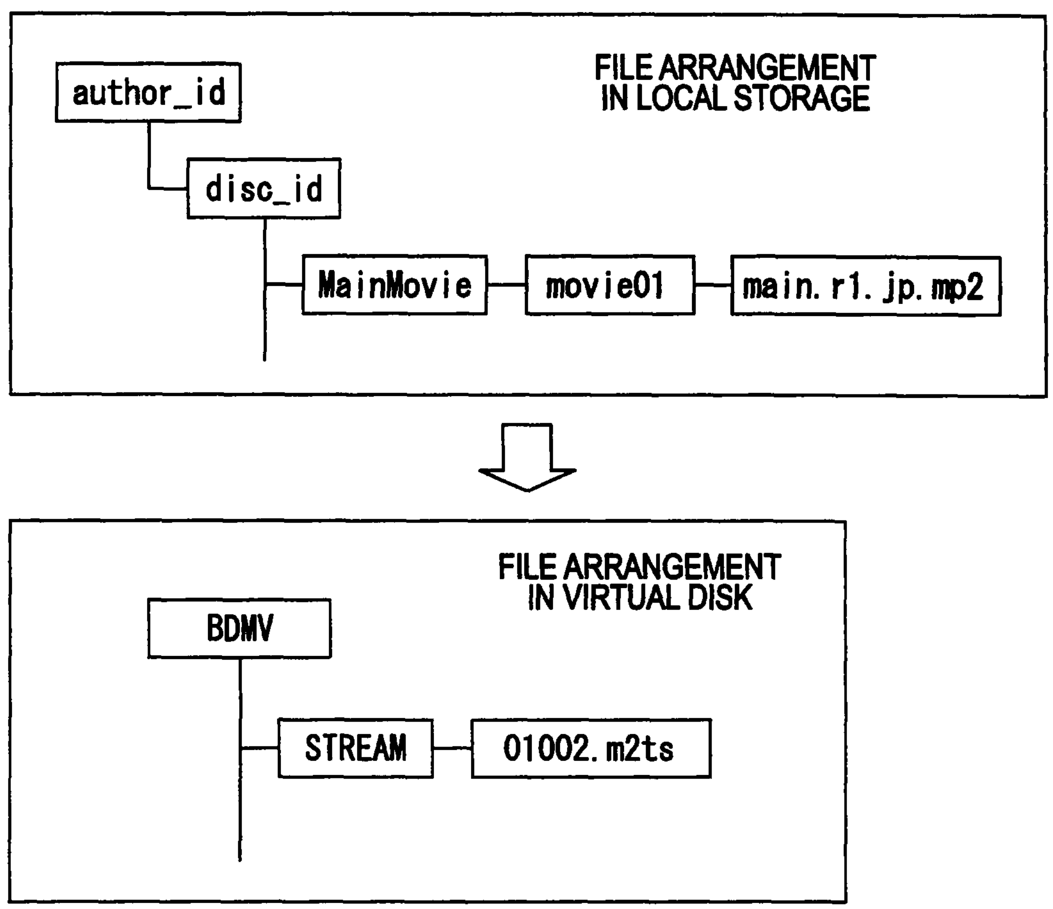
FIG. 15 illustrates the specifying of a path name.

For example, in the manifest ( ) section of FIG. 10, "/MainMovie/movie01/main.r1.jp.mp2" as the path name thereof might be specified in the src_file_name field, and "/STREAM/01002/m2ts" as the path name thereof might be specified in the dst_file_name field. As shown in FIG. 15, the downloaded data is recorded in a file name of main.r1.jp.mp2 in a movie01 directory within the MainMovie directory under the author_id and disc_id identifiers in the local storage 24. In the virtual file system of the virtual disk, the downloaded data is handled as a file named "01002.m2ts in the STREAM directory.

In this way, the content author can specify the path name of the local storage 24 in the src_file_name field, and the path name in the virtual file system of the virtual disk in the dst_file_name field of the manifest ( ) section of the downloaded package. If the path name adapted to the virtual file system in the virtual disk is set in the dst_file_name field, the content author can freely set a file/directory structure under disc_id of the data actually recorded on the local storage 24 and newly add directories and files under areas identified by the disc_id identifier in the reproducing apparatus 1.

If the dst_file_name field in the manifest ( ) section remains blank at the downloading of an actual file, that file cannot be referenced from the application program being executed by the reproducing apparatus 1 (in other words, the application program being executed by the reproducing apparatus 1 and the user cannot recognize the presence of that file). The actual file is stored on the local storage 24, and the actual file is correctly recognized in the file system of the local storage 24. With the dst_file_name field left blank, the file is considered as being absent from the virtual file system. That file is thus hidden from the application program of the reproducing apparatus 1 and the user.

This feature is taken advantage of. An actual file is downloaded with the dst_file_name field blanked in the manifest ( ) section. Later in the future, a manifest ( ) section having the same manifest_id and a predetermined path name written in the dst_file_name field is downloaded again to overwrite the manifest ( ) section. The application program to be executed by the reproducing apparatus 1 thus operates in the same way as the actual file is downloaded at the same timing as the downloading of the new manifest ( ) section.

For example, a plurality of bonus tracks was downloaded at a time, or delivered in a predetermined recording medium, and later, only the manifest ( ) section containing the dst_file_name field is downloaded for overwriting periodically so that the application program recognizes different bonus tracks. In this arrangement, the user enjoys services in which different bonus tracks are added from time to time without the need for downloading frequently a vast amount of data.

In the synchronization (binding) between the actual file system of the optical disk 11 and the local storage 24 and the file system of the virtual disk, regardless of whether it is a so-called static binding system or a dynamic binding system, a new API for updating the virtual file system (for example, a update ( )) may be defined. When that API is called in response to a user operation or explicitly by the application program, the virtual file system is updated.

In the static binding, the actual file systems in the optical disk 11 and the local storage 24 are referenced at the moment the optical disk 11 is loaded on the reproducing apparatus 1 or at the timing of the switching of reproduction title in order to map the file/directory structure in the virtual file system. In the dynamic binding, required files are searched for at the moment a file input and output request is issued.

The file/directory structure of the virtual disk preferably matches the file/directory structure of the optical disk 11. The file/directory structure of the optical disk 11 is formulated by standards and typically cannot be modified. Preferably, the structure of actual directories and files in the local storage 24 is freely set by the content author. If the file/directory structure of the virtual disk is set based on the fixed file/directory structure of the optical disk 11, a reproduction process is performed in compliance with standards such as the application format of the optical disk 11 while maintaining the freedom of data distributed by the content author at the same time.

Figure 16:
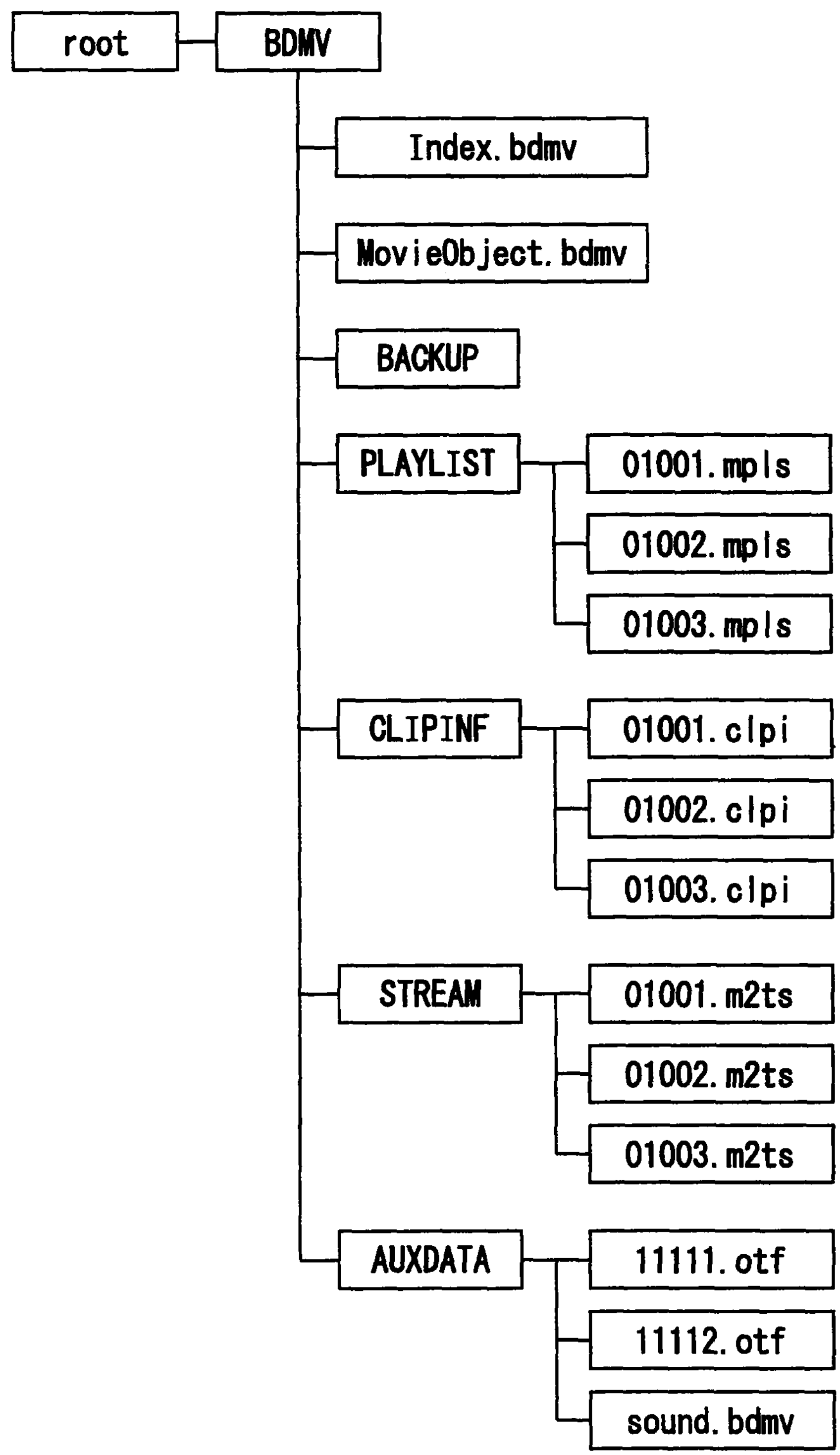
FIG. 16 illustrates a file/directory structure in a virtual disk.

FIG. 16 illustrates the file/directory structure of the virtual disk.

A directory named “BDMV” is arranged under the root directory in the file/directory structure of the virtual disk of FIG. 16. Under that directory, there are arranged a file named “Index.bdmv” and a file named “MovieObject.bdmv”.

The Index file contains information relating to a menu for reproducing a content that is stored on the optical disk 11 and the local storage 24 and handled by the application program as the one being recorded on the virtual disk. The reproducing apparatus 1 causes the display device to display the reproduction menu screen in accordance with the Index file. The reproduction menu screen may show items for reproducing all contents on the optical disk 11, reproducing a particular chapter only, reproducing repeatedly a particular chapter, and displaying an initial menu. MovieObject that is executed with any item selected is set in the Index file. When a user selects one item from the reproduction menu screen, the reproducing apparatus 1 executes a MoveObject command set in the Index file.

The Index file will be described in detail later with reference to FIGS. 37 and 38.

The MovieObject file includes MovieObject. MovieObject includes a command controlling the reproduction of PlayList that is handled as being recorded on the virtual disk. The reproducing apparatus 1 selects and executes one of MovieObjects that are handled as being recorded on the virtual disk, thereby reproducing the content that is handled as being recorded on the virtual disk.

Arranged under the BDMV directory are a directory named “BACKUP” (BACKUP directory), a directory named “PLAYLIST” (PLAYLIST directory), a directory named “CLIPINF” (CLIPINF directory), a directory named “STREAM” (STREAM directory), and a directory named “AUXDATA” (AUXDATA directory).

The BACKUP directory stores files and data to back up files and data to be handled as being recorded on the virtual disk.

The PLAYLIST directory stores a PlayList file. Each PlayList file name is composed of a file name of a five digit number with an extension.mpls attached thereto in the same way as in the optical disk 11.

The CLIPINF directory stores a clip information file. Each clip information file is composed of a file name of a five digit number with an extension.clpi attached thereto in the same way as in the optical disk 11.

The STREAM directory stores a clip AV stream file and a substream file. Each stream file has a file name of a five digit number with an extension .m2ts attached thereto in the same way as in the optical disk 11.

The AUXDATA directory stores files of data, not contained in the clip AV stream file and the substream file handled as being recoded on the virtual disk, but referenced from the clip AV stream file and the substream file, and files of data used separately from the clip AV stream file and the substream file.

Information indicating a file on the menu screen displayed to the user has a name typically specified in a display_name field. The file/directory structure of the virtual disk discussed with reference to FIG. 16 is not hidden in nature from the application program and the user. Depending on the application program executed by the reproducing apparatus 1, the file/directory structure of the virtual disk may be displayed to the user.

The definition of the content distribution file format the content author uses to distribute the content is described with reference to FIG. 17. The file format for content distribution may be individually determined on a per content file unit basis. Alternatively, the file format may be an archive type containing metadata (manifest ( )) as shown in FIG. 17.

A package_header ( ) section and a package_body ( ) section in archive may take text expression of mark-up language such as XML.

When the content author distributes contents on a per file unit basis, metadata (manifest ( )) is handled as an independent binary file or text file. In other words, an appropriate state needs to be described in the manifest ( ) associated with a content distributed on a per file unit basis in view of a directory structure expected subsequent to file addition.

A compression type field is used to specify a compression method of data within the package_body ( ). If zero is specified in this field, data within the package_body is non-compressive type.

An encryption_type field is used to specify a scramble (encryption) method of data within the package_body ( ). If zero is specified in this field, the data within the package_body ( ) is non-scrambled type (clear text).

As for the order of scrambling and compression of the data in the package_body, a compression process is performed first, followed by a scrambling process.

A file_count field is used to specify the total number of files to be archived.

A manifest_id field is used to specify an identifier of the manifest ( ) section.

After archive data is downloaded, the manifest ( ) section may be stored on a per file unit basis (on a per archive data unit basis) on the local storage 24. Alternatively, the manifest ( ) section may be merged with a file with the manifest_id identifier of a manifest ( ) section used as a key for identification.

An author_id field is a field in which the content author specifies an identifier uniquely identifying a content producer.

A disc_id field is a field in which the content author specifies an identifier uniquely identifying the optical disk 11 of a particular content producer. This archive is update data for the optical disk 11 specified by the disc_id identifier.

A version field is a field the content author uses to manage history. History number is represented by a number from 1 to 255, and the larger the number, the newer the content is.

In a source field, a source URL of a file associated with the manifest ( ) is described. The value in this field is coded in accordance with ISO/IEC 10646-1.

An operation_type field is a field in which the content author specifies a content updating procedure. The value specifiable for the operation_type field remains unchanged from the value discussed with reference to FIG. 11.

In a display_name field, a name easily recognizable to the user is defined here. More specifically, a character string such as "Japanese caption of title XXX", which could be difficult to imagine from a file name alone, is set in the display_name field. The character string is coded in accordance with ISO/IEC 10646-1.

A permission field is used for the content author to specify whether to set approval information as a visible attribute or an invisible attribute. The values specifiable for the permission field remain unchanged from the values discussed with reference to FIG. 12.

An src_file_name field is used to specify a path name of a file to be recorded on the local storage 24 as previously discussed with reference to FIG. 15. The file/directory name is encoded in accordance with ISO/IEC 646 standards.

A dst_file_name field is used to specify a path name of a file at a binding destination in the virtual disk (virtual file system) as previously discussed with reference to FIG. 15. The file/directory name is encoded in accordance with ISO/IEC 646 Standards.

The src_file_name and dst_file_name fields may take the same name.

A file_size field is used to specify the file size of a file prior to compression by byte.

A file_data field is used to specify file data as a byte sequence.

The data of FIG. 17 having the described content distribution file format is downloaded, and the reproducing apparatus 1 merges the downloaded data with the data recorded on the loaded optical disk 11 to construct a virtual file system in the virtual disk. The user who reproduces a content recorded on the optical disk 11 using the reproducing apparatus 1 feels that the optical disk 11 is updated with bonus tracks and sounds or captions of different language sounds added to the contents recorded on the optical disk 11.

If the contents having the above-described format are updated, new data files are downloaded for binding in the virtual file system discussed with reference to FIG. 16. For example, at least one of an Index file (Index.bdmv), a MovieObject file (MovieObjects.bdmv), a PlayList file (***.mpls), a ClipInformation file (*.clpi), and a STREAM file and AUXDATA file (*.m2ts, *.bdmv, and *.otf) is added or updated. The various types of additions defined by above-referenced operation_type, such as the addition of MainPath and SubPath, are executed so that the above-described files are downloaded and reproduced in association with the contents recorded on the optical disk 11**.

In a first example, MainPath is added to the content recorded on the optical disk 11 loaded on the reproducing apparatus 1.

For example, 0x01 is described in the 8-bit operation_type field. As shown in FIG. 18, a PlayList #1 file containing MainPath #1 and SubPath #1, a clip AV stream #1 file, and a caption text stream #1 file are recorded on the optical disk 11. A content package downloaded from the server 3 contains a PlayList #2 file containing MainPath #2, containing PlayItem #1 and PlayItem #2, and SubPath #1, and a clip AV stream #2 file for a bonus track or the like. Under this condition, the PlayList #2 file is extracted from the content package, and the file system is updated so that the extracted PlayList #2 file is substituted for the original PlayList #1 read from the optical disk 11.

Figure 19:
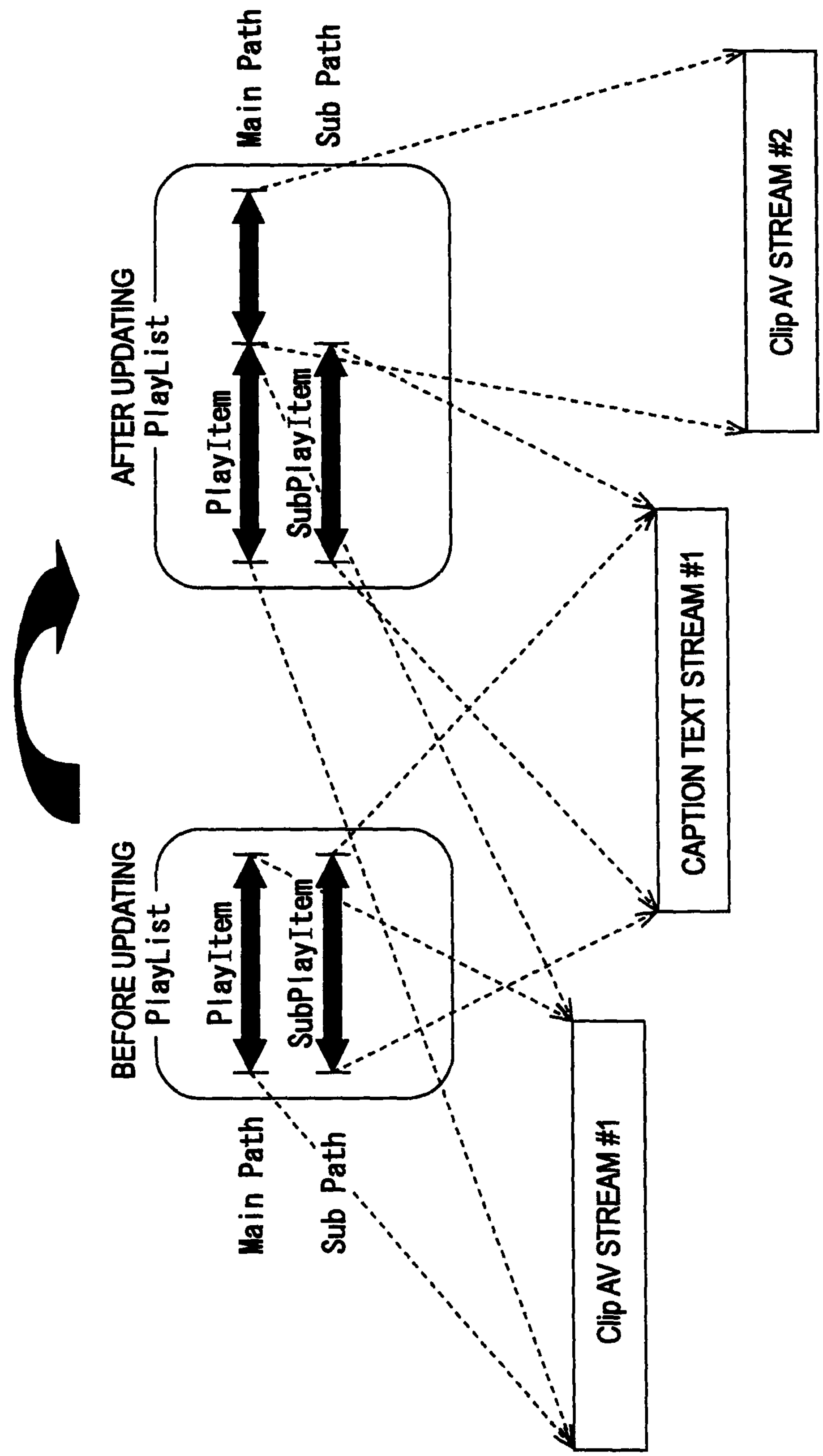
FIG. 19 illustrates the content recorded on the optical disk on the reproducing apparatus with MainPath added to the content.

As shown in FIG. 19, before updating MainPath composed of PlayItem and SubPath composed of SubPlayItem, namely, in the PlayList #1 of the optical disk 11, the clip AV stream #1 to be referenced by PlayItem, and the caption text stream #1, to be referenced by SubPlayItem and to be reproduced in synchronization with the clip AV stream are reproduced. After updating of the contents recorded on the optical disk 11 (in other words, after the file systems are merged and updated), the clip AV stream #2 corresponding to the bonus tracks is reproduced subsequent to the clip AV stream #1 in PlayList #2.

When PlayItem is added as discussed above with reference to FIGS. 18 and 19, the user can enjoy the contents recorded on the optical disk 11 loaded on the reproducing apparatus 1 with the bonus track added thereon.

In a second example, SubPath is added onto the contents recorded on the optical disk 11 loaded on the reproducing apparatus 1.

For example, 0x02 is described in the 8-bit operation_type field. As shown in FIG. 20, a PlayList #1 file containing SubPath #1 containing SubPath #1, the clip AV stream #1 file, and audio stream #1 file corresponding to sound of a second language are recorded on the optical disk 11 (although MainPath is also recorded on the optical disk 11, MainPath is mentioned only if updating is closely related to MainPath). A content package downloaded from the server 3 contains a PlayList #1 file containing SubPath #2, and a caption text stream #1 file. Under this condition, SubPath #2 is extracted from the PlayList #1 file, and the file systems are merged with the extracted SubPath #2 added to the original PlayList #1 read from the optical disk 11.

Figure 21:
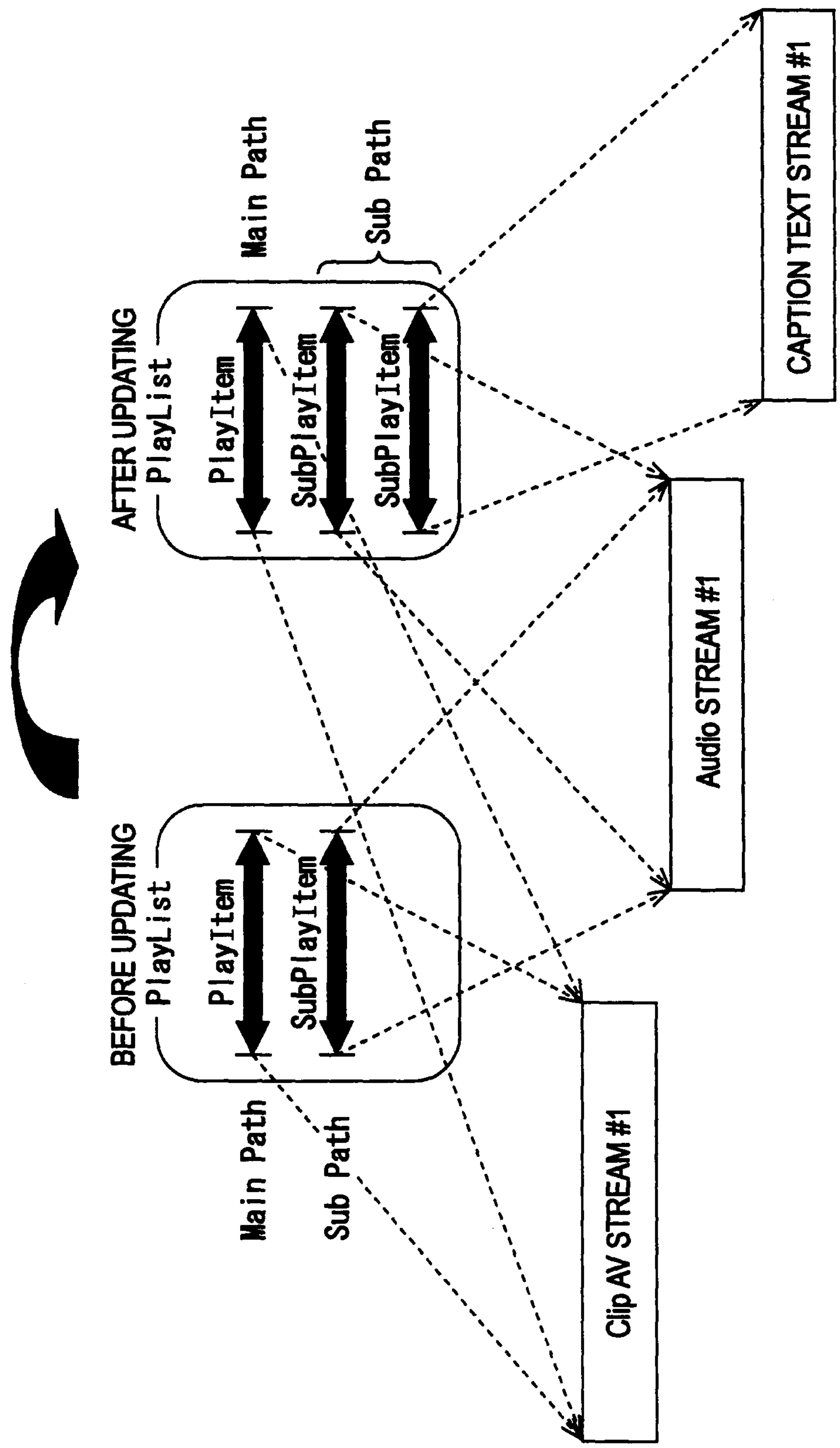
FIG. 21 illustrates the content recorded on the optical disk on the reproducing apparatus with SubPath added to the content.

As shown in FIG. 21, before updating MainPath composed of PlayItem and SubPath composed of SubPlayItem, namely, in the PlayList of the optical disk 11, a clip AV stream #1 to be referenced by PlayItem and an audio stream #1 being second sound data to be reproduced in synchronization with the clip AV stream #1 and to be referenced by SubPlayItem are reproduced. In the updated PlayList (with the file systems merged and thus updated), a second SubPlayItem going to be reproduced in synchronization with the clip AV stream #1 and permitting a reproduction period to be independently set is added to the sub path on the contents recorded on the optical disk 11. The clip AV stream #1 to be referenced by PlayItem and the audio stream #1 being the second sound data to be reproduced in synchronization with the clip AV stream #1 and to be referenced by the first SubPlayItem are reproduced.

Furthermore, a caption text stream #1 permitting a reproduction period to be set independent of the audio stream #1 is also reproduced.

When SubPath is added as described with reference to FIGS. 20 and 21, the number of paths to be selected by SubPath is increased. The user can thus enjoy the additionally selected new caption.

In a third case, SubPlayItem is added to the contents recorded on the optical disk 11 loaded on the reproducing apparatus 1.

Figure 22:
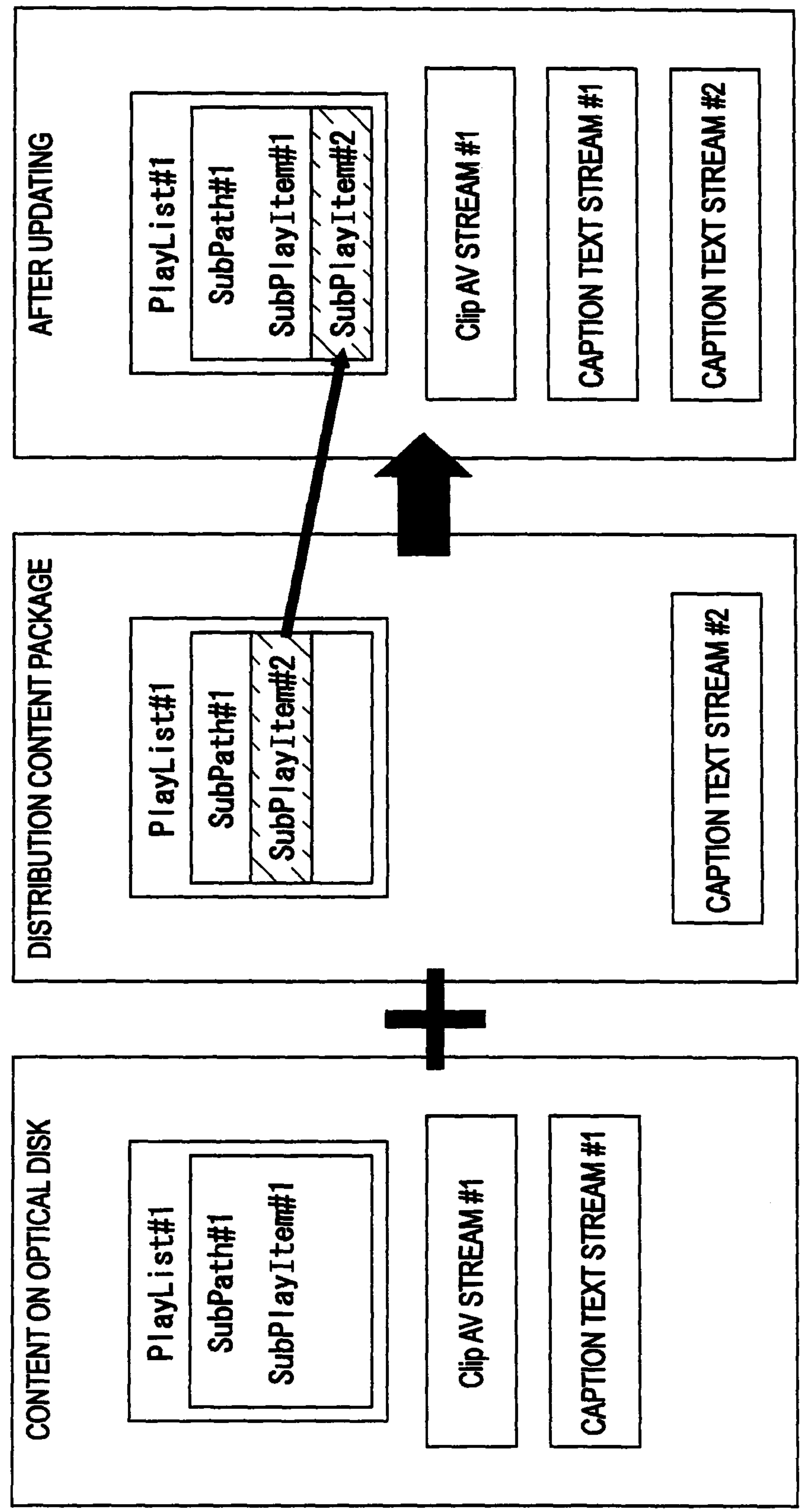
FIG. 22 illustrates the content recorded on the optical disk on the reproducing apparatus with SubPlayItem added to the content.

For example, 0x03 is written on the 8-bit operation_type field. As shown in FIG. 22, the optical disk 11 records a PlayList #1 file containing SubPath #1 composed of SubPlayItem #1, a clip AV stream #1 file, and a caption text stream file. A content package downloaded from the server 3 contains a PlayList #1 file containing SubPath #1 composed of SubPlayItem #2, and a caption text stream file #2 file. The SubPlayItem #2 is extracted from SubPath #1 in the PlayList #1 file in the content package, and the file system is updated so that the extracted SubPlayItem #2 is added to the SubPath #1 of the original PlayList #1 file read from the optical disk 11.

Figure 23:
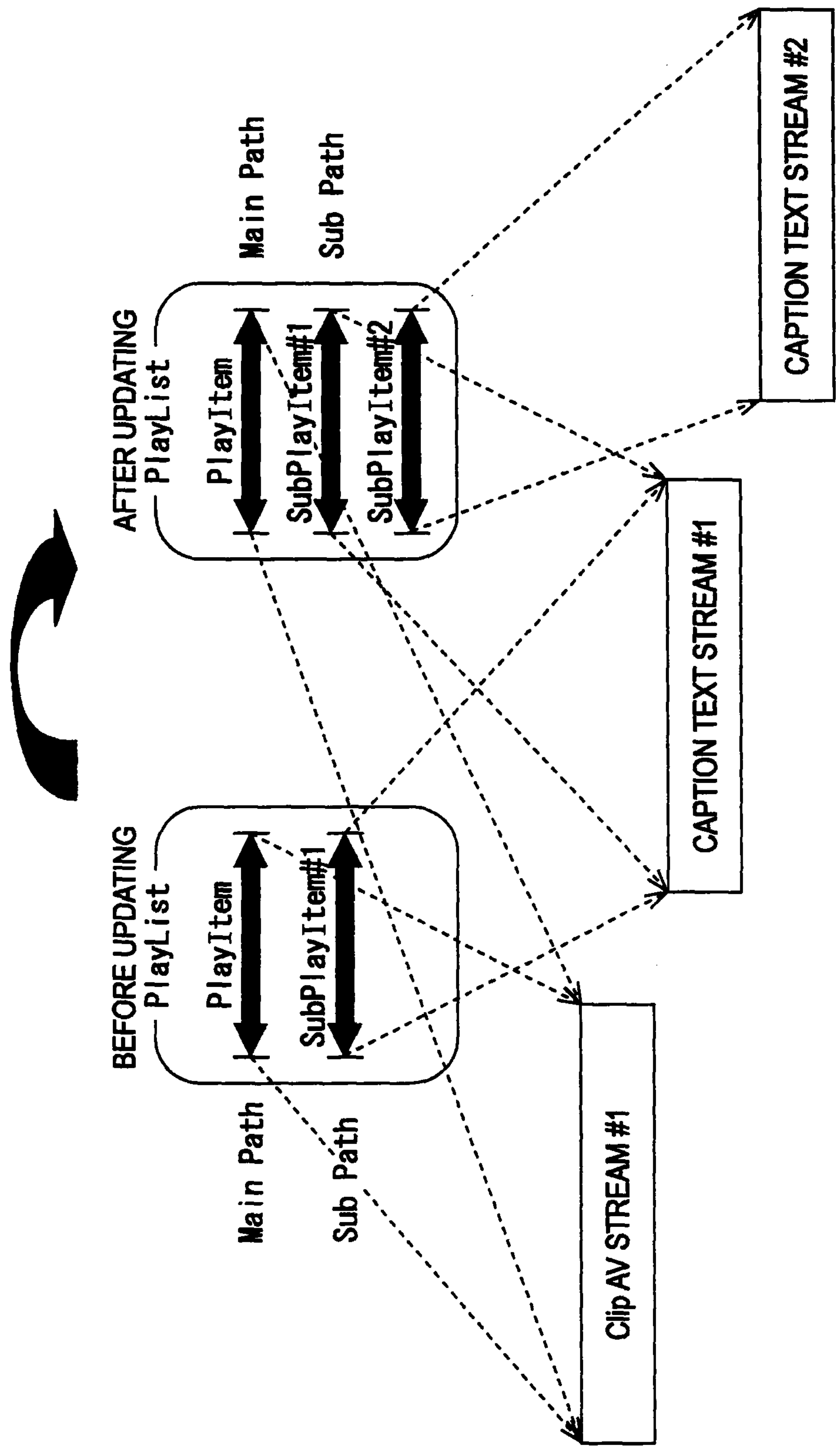
FIG. 23 illustrates the content recorded on the optical disk on the reproducing apparatus with SubPlayItem added to the content.

As shown in FIG. 23, before updating, the PlayList contains MainPath composed of PlayItem and SubPath composed of SubPlayItem #1, and the clip AV stream #1 to be referenced by PlayItem and the caption text stream file #1 to be reproduced in synchronization with the clip AV stream #1 and to be referenced by SubPlayItem #1 are reproduced. In the updated PlayList (with the file systems merged and thus updated), the clip AV stream #1 to be referenced by PlayItem and the caption text stream file #1 to be reproduced in synchronization with the clip AV stream #1 and to be referenced by the SubPlayItem #1 are reproduced, and furthermore SubPlayItem #2 is additionally reproduced. The caption text stream file #2 is thus reproduced in synchronization with the clip AV stream #1.

As discussed above with reference to FIGS. 22 and 23, SubPlayItem in SubPath is added. The user can thus enjoy an additionally selectable caption.

In a fourth example, SubPlayItem is substituted in the contents recorded on the optical disk 11 loaded on the reproducing apparatus 1.

Figure 24:
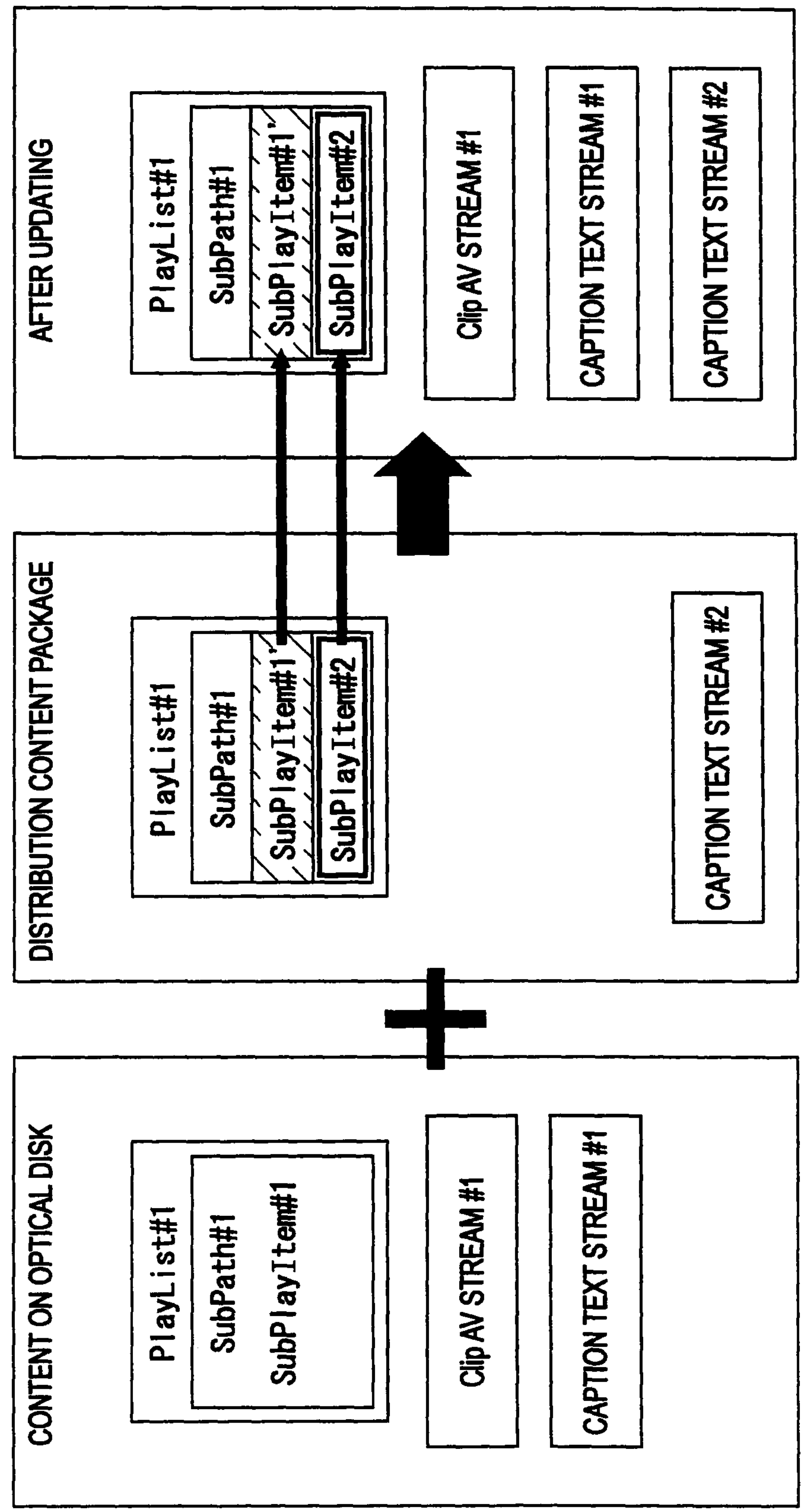
FIG. 24 illustrates the content recorded on the optical disk on the reproducing apparatus with SubPlayItem added to the content.

For example, 0x03 may be written on the 8-bit operation_type field. As shown in FIG. 24, the optical disk 11 records a PlayList #1 file containing SubPath #1, composed of SubPlayItem #1, a clip AV stream #1, and a caption text stream file #1. A content package downloaded from the server 3 contains a PlayList #1 containing, SubPath #1 composed of SubPlayItem #1 and SubPlayItem #2, and a caption text stream file #2. The optical disk 11 also stores SubPlayItem #1. (For distinction, the one recorded on the optical disk 11 is referred to as SubPlayItem #1 and the one contained in the content package is referred to as SubPlayItem #1'. The same is true of FIGS. 24 and 25.) The SubPlayItem #1' and SubPlayItem #2 are extracted from SubPath #1 in the PlayList #1 in the content package, and the file system is updated so that the extracted SubPlayItem #1' and SubPlayItem #2 overwrite (replace) the SubPath #1 in the original PlayList #1 file read from the optical disk 11.

Figure 25:
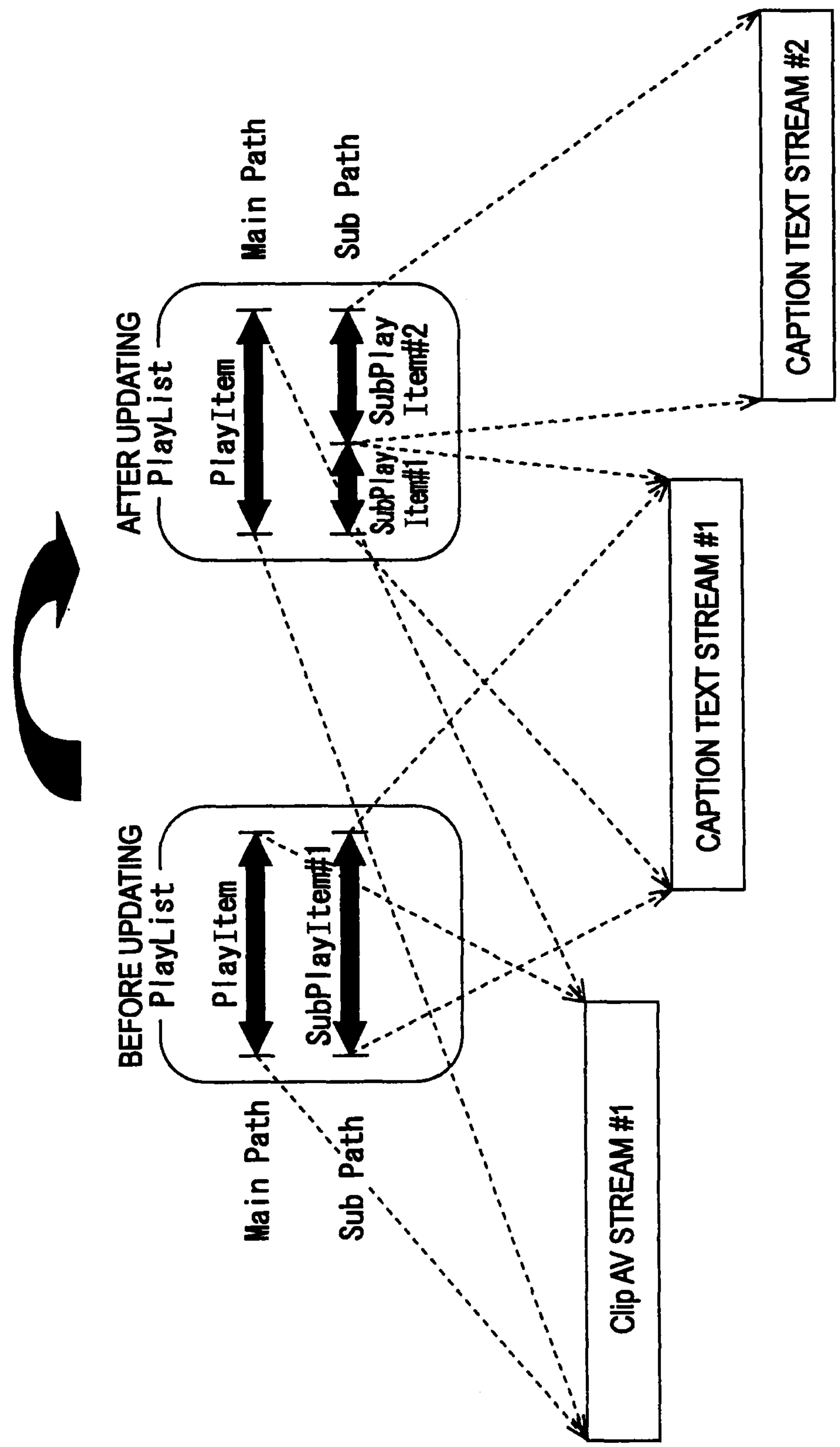
FIG. 25 illustrates the content recorded on the optical disk on the reproducing apparatus with SubPlayItem added to the content.

As shown in FIG. 25, the PlayList contains MainPath composed of PlayItem and SubPath composed of SubPlayItem #1 before updating. The clip AV stream #1 to be referenced by PlayItem and the caption text stream file #1 to be reproduced in synchronization with the clip AV stream #1 and to be referenced by SubPlayItem #1 are reproduced. In contrast to the contents recorded on the optical disk 11, in the updated PlayList (with the file systems merged and thus updated), the clip AV stream #1 to be referenced by PlayItem, the caption text stream file #1 to be referenced by SubPlayItem #1', and the caption text stream file #2 to be referenced by SubPlayItem #2 are reproduced. The caption text reproduced in synchronization with the clip AV stream #1 is thus added. If a reproduction period is the only difference between SubPlayItem #1' and SubPlayItem #1 with SubPlayItem #1' having a longer reproduction period than SubPlayItem #1, the reproduction period of the caption text is extended.

If SubPlayItem is substituted, causing the caption text stream reproduced by the substitute SubPlayItem to be different from the original caption text stream as shown in FIGS. 24 and 25, the caption text stream reproduced in accordance with SubPlayItem in SubPath is modified. The user is thus provided with a caption that has been changed (modified) in the middle of reproduction.

In a fifth example, a clip is added on the contents recorded on the optical disk 11 loaded on the reproducing apparatus 1.

For example, 0x04 may be written on the 8-bit operation_type field. As shown in FIG. 26, the optical disk 11 records a PlayList #1 file containing SubPath #1, composed of SubPlayItem #1, a clip AV stream #1 file associated with clip #1, and a caption text stream #1 file corresponding to a caption of a first language. A content package downloaded from the server 3 contains a PlayList #1 file containing SubPath #1, composed of SubPlayItem #1 corresponding to clip #2, and a caption text stream #2 file corresponding to a caption of a second language. The clip #2 is extracted from SubPath #1 in the PlayList #1 in the content package, and the file system is updated so that the clip #2 is added to the SubPlayItem #1 forming the SubPath #1 of the original PlayList #1 file read from the optical disk 11.

Figure 27:
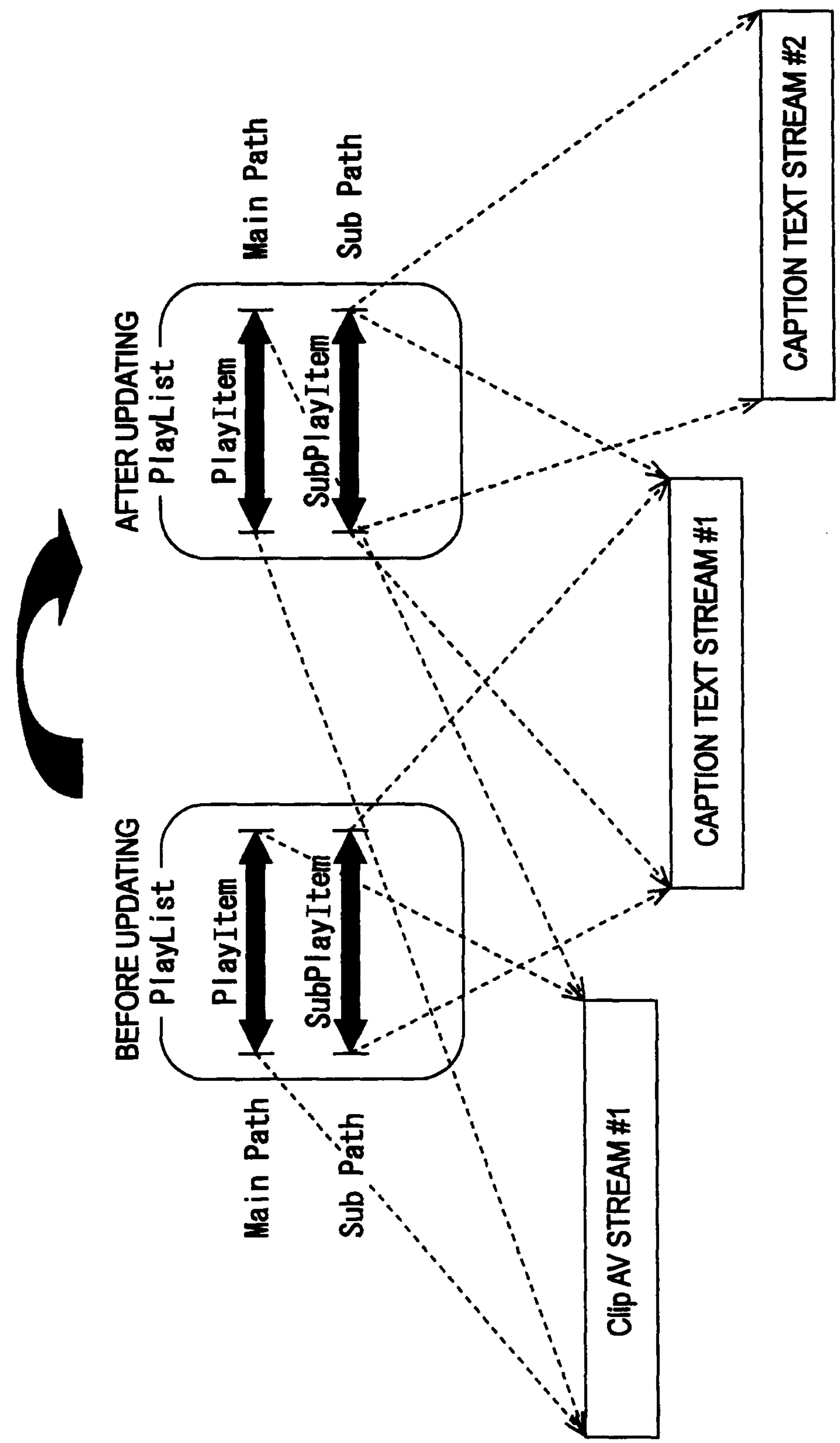
FIG. 27 illustrates the content recorded on the optical disk on the reproducing apparatus with Clip added to the content.

As shown in FIG. 27, in the PlayList having MainPath composed of PlayItem and SubPath composed of SubPlayItem, the clip AV stream #1 to be referenced by PlayItem and the caption text stream file #1 of the first language caption to be reproduced in synchronization with the clip AV stream #1 and to be referenced by SubPlayItem #1 are reproduced before updating. In the updated PlayList (with the file systems merged and thus updated), the clip AV stream #1 to be referenced by PlayItem, and the caption text stream file #1 to be referenced by SubPlayItem #1 of the first language caption to be reproduced in synchronization with the clip AV stream #1 are designed to be reproduced. Furthermore, the clip #2 is added to the SubPlayItem forming the SubPath. The caption text stream file #2 of the second language to be referenced by the SubPlayItem is thus reproduced in synchronization with the clip AV stream #1.

The user is thus additionally provided with a caption of a selectable language if the clip is added as discussed with reference to FIGS. 26 and 27.

AV stream data of files other than the above described files can be recorded on the optical disk 11 and then decoded by the decoder 26. For AV stream data of the files other than the above described files, however, a virtual file system cannot be constructed using a file downloaded on the local storage 24. The user of the reproducing apparatus 1 can neither add a file recorded on the optical disk 11 nor update a portion of the file.

Distributors (content authors) of data may package files required for addition and updating beforehand so that downloading of the files is performed on a disk basis (by directory data basis represented by disc_id). In this arrangement, the reproducing apparatus 1 is freed from the editing of the PlayList file.

If a new file having the same file name as an existing file during addition or updating, the new file overwrites the existing file. If a new file having a file name different from any of existing files during addition or updating, the new file is added.

New data having the structure of FIG. 17 is downloaded onto the reproducing apparatus 1 from the server 3 via the network 2. The new data is stored on the local storage 24 in accordance with a path name indicated by the src_file_name field written in the manifest ( ) as the metadata. A path in the virtual file system is set based on a path name indicated by the dst_file_name written on the manifest ( ). An application of the reproducing apparatus 1 (for example, an application performing a reproduction process) can thus process, without difference, the data recorded on the optical disk 11 and the data recorded on the local storage 24 based on the virtual file system, namely the path indicated by the dst_file_name field.

The application program executed by the reproducing apparatus 1 is described below. Upon receiving a data addition command (download command), the application program for performing a data addition process transmits manifest files (all or part of the manifest files) responsive to the command to the server 3 via the network 2, and acquires a content list of contents that can be currently added. The application program displays the list of additional contents to the user, and the user selects a content to be downloaded from the displayed list of contents.

When the user has selected the content to be downloaded, an application capable of downloading the data from the server 3 (may or may not be the same application program as the application program that can perform the data addition process and data reproduction process) starts downloading the data.

When the downloading application program completes the downloading operation, a downloaded file package group is mounted on the virtual file system by an application for managing the file system. Through the static binding or the dynamic binding, the native file system is synchronized with the virtual file system.

A file deletion process to delete a file in response to a user operation input is described below. The reproducing apparatus 1 displays a menu screen showing a list of files on an auxiliary storage device, using the manifest file. Viewing the menu screen, the user deletes a file from the virtual file system on a file basis (on a per content basis), or on a disk basis.

The deletion of a file from the virtual file system on a per file (content) basis is described below.

For example, the deletion of the file from the virtual disk on a per content basis means to the user that an English caption or a Japanese dubbed-in voice, not recorded on the optical disk 11 but newly recorded on the virtual file system through downloading, is selected on a per content basis and that the corresponding file group is deleted.

Figure 28:
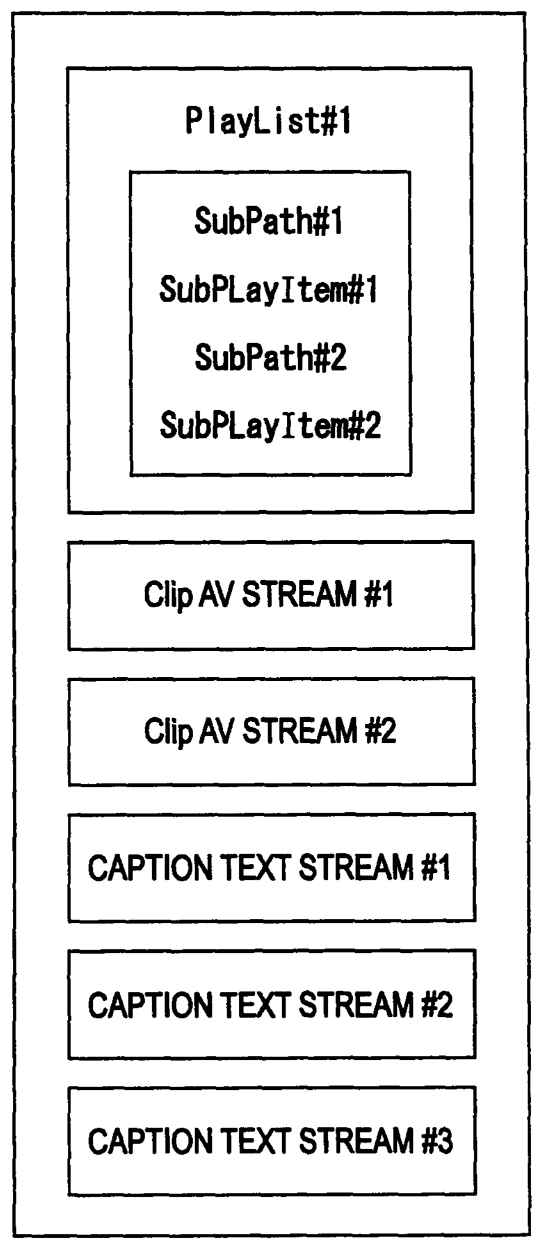
FIG. 28 illustrates a status of PlayList subsequent to the addition and updating of a file.
Figure 29:
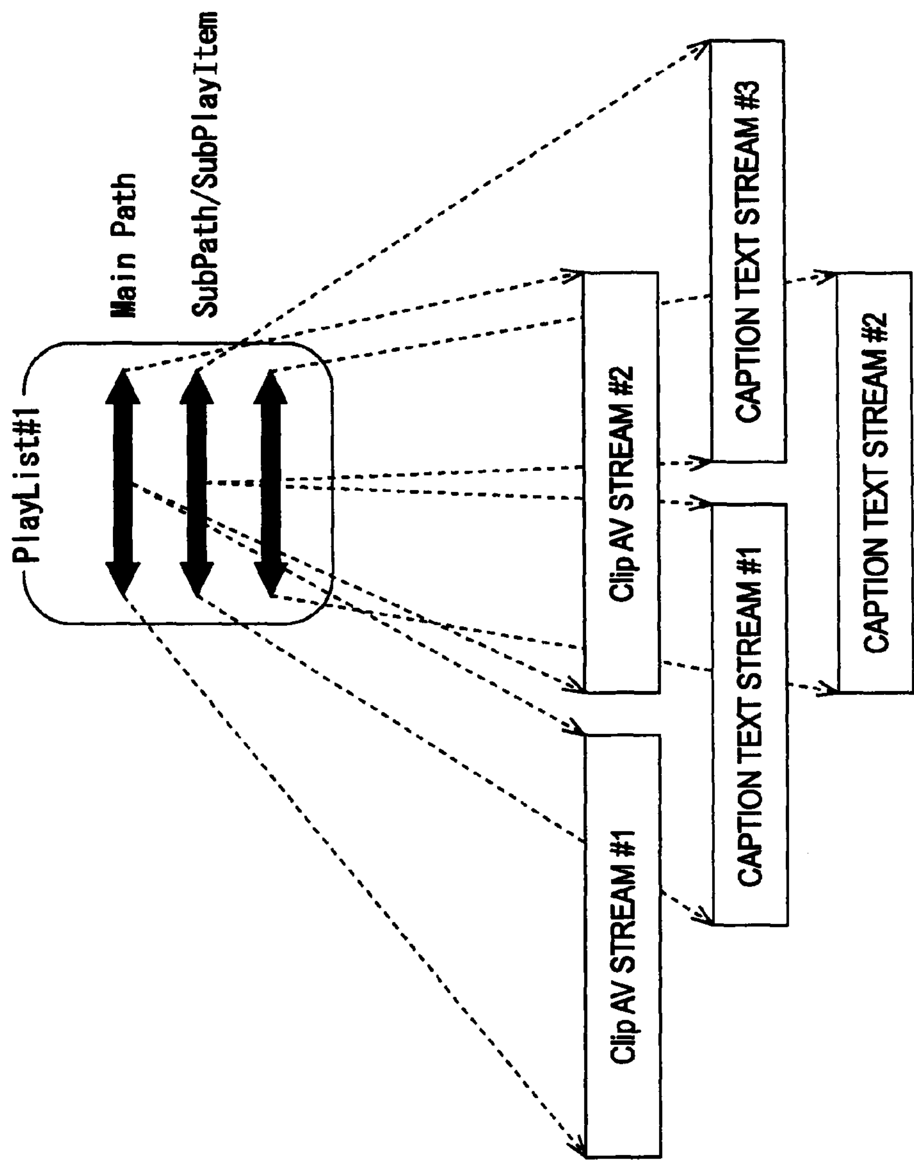
FIG. 29 illustrates a status of PlayList subsequent to the addition and updating of a file.

For example, the file addition and updating process is performed on the optical disk 11 loaded on the reproducing apparatus 1 as described with reference to FIGS. 18 and 19, and the clip AV stream corresponding to the bonus track is added. The file addition and updating process described with reference to FIGS. 20 and 21 is performed, and the caption text stream corresponding to the SubPath of the new caption is added. The file addition and updating process described with reference to FIGS. 22 and 23 is performed. The SubPlayItem is added, and thus the caption text stream corresponding to the additional caption with SubPlayItem in the SubPath extended is thus added. As shown in FIG. 28, the content recorded on the virtual file system of the virtual disk includes the PlayList #1 containing the SubPath #1, the SubPlayItem #1, the SubPath #2 and the SubPlayItem #2, the clip AV stream #1, the clip AV stream #2, and caption text streams #1 through #3. As shown in FIG. 29, the clip AV stream #1 and the clip AV stream #2 are consecutively reproduced in accordance with the main path specified by the PlayItem. The caption text stream #1 and the caption text stream #3 are reproduced in accordance with the SubPath #1 specified by the PlayItem #1. The caption text stream #2 is reproduced in accordance with the SubPath #2 specified by the SubPlayItem #2. In this condition, the user may issue a command to start a deletion process of any file.

The local storage directory manager 34 in the controller 21 controls the data acquisition unit 33, thereby accessing the server 3 via the Internet interface 25 and the network 2. For example, the local storage directory manager 34 transmits, to the server 3, information indicating the current status of the virtual file system, such as manifest_id relating to the content reproduced in accordance with the PlayList #1. The local storage directory manager 34 then receives information relating to updatable data, namely, information indicating a list of deletable files. The menu screen display controller 31 displays the list of deletable files to the user as shown in FIG. 30. French caption, bonus track, and Japanese additional caption are included in the list of deletable files.

If the user selects to delete the bonus track, the local storage directory manager 34 deletes a file corresponding to the bonus track selected by the user. The local storage directory manager 34 can delete a file related to the manifest file within a file package corresponding to the bonus track, thereby deleting the corresponding manifest ( ) section itself in the manifest file.

A file recorded on the local storage 24 is not necessarily referenced by a single PlayItem only. More specifically, the deletion process can cause a malfunction in the reproduction process of another area.

More specifically, a caption text stream file #n (n is an integer) referenced in the bonus track to be deleted is designed to be reproduced in synchronization with an AV stream file not to be deleted. However, if the caption text stream file #n is also deleted in response to the deletion of the bonus track, the caption text stream file #n cannot be reproduced in synchronization with the undeleted AV stream file.

The file system merge processor 36 determines whether the deletion process in the virtual file system causes a malfunction in the reproduction process of another area. If a link structure among data units is destroyed leading to a malfunction, the file system merge processor 36 detects a data file required to reproduce another area, and commands the data acquisition unit 33 to transmits to the server 3 a signal requesting the downloading of the data file, and receives the required data file downloaded from the server 3. As previously discussed, the local storage directory manager 34 expands the data file on the local storage 24.

The file system merge processor 36 performs a binding process on the virtual file system at the above-described timing regardless of whether a new file is downloaded or not. The content is thus reproduced based on the virtual file system with the file selected by the user deleted therefrom.

The file deletion from the virtual file system performed on a disk basis is described below.

The file deletion from the virtual disk performed on a disk basis means that all file groups contained in a directory corresponding to the disc_id on the local storage 24 are deleted. For example, all files related to the manifest file under disc_id are deleted, and then the manifest ( ) sections are also deleted.

An added file or an update file downloaded to be merged with the content of the optical disk 11 and bound to the virtual file system is deleted. To the user, the file deletion seems equivalent to initializing the optical disk 11 (having the original contents only).

The process of the reproducing apparatus 1 is described below with reference to flowcharts.

The file-basis addition and updating process is described below with reference to a flowchart of FIG. 31.

In step S1, the operation input acquisition unit 32 in the controller 21 determines, based on a signal supplied from the operation input unit 29, whether a command to start a disk-basis addition process, namely, an addition process of a file contained in a directory represented by the predetermined disc_id identifier has been received. If it is determined in step S1 that the command to start the file addition process has not been received, the operation input acquisition unit 32 repeats step S1 until it is determined that the start command has been received.

If it is determined in step S1 that the command to start the file addition process has been received, the local storage directory manager 34 in the controller 21 controls the data acquisition unit 33 in step S2, thereby accessing the server 3 via the Internet interface 25 and the network 2 to transmit information indicating the status of the current virtual file system, such as the manifest_id identifier of the manifest ( ) section, to the server 3.

In step S3, the data acquisition unit 33 controls the Internet interface 25, thereby determining whether information corresponding to the list of downloadable files has been received from the server 3 via the network 2.

If it is determined in step S3 that the information corresponding to the list of downloadable files has not been received, the menu screen display controller 31 controls in step S4 displaying of an error message notifying the user that the file addition process is disabled, and then ends the process.

If it is determined in step S3 that the information corresponding to the list of downloadable files has been received, the data acquisition unit 33 supplies in step S5 the menu screen display controller 31 with information regarding the list of downloadable files transmitted from the server 3 and received via the Internet interface 25. The menu screen display controller 31 causes a display device to display a menu screen of the list of downloadable files from which the user is allowed to select one.

In step S6, the operation input acquisition unit 32 determines whether the user has selected an item to be added using one of buttons and icons on the menu screen displayed under the control of the menu screen display controller 31. If it is determined in step S6 that any item the user may want to add has not been selected, step S6 is repeated until it is determined that any item has been selected.

If it is determined in step S6 that the item the user may want to add has been selected, the operation input acquisition unit 32 supplies in step S7, to the data acquisition unit 33, information indicating the content of updating selected by the user. The data acquisition unit 33 controls the Internet interface 25 and transmits information indicating a requested file to the server 3 to request the server 3 to send back the file selected by the user.

In step S8, the data acquisition unit 33 controls the Internet interface 25, thereby causing the server 3 to download one of a PlayList file, a ClipInformation file, a clip AV stream file, an audio file, a caption text stream file and a font file, prepared as download files. The data acquisition unit 33 then notifies the local storage directory manager 34 that these files have been downloaded.

In step S9, the local storage directory manager 34 determines whether the local storage 24 has already stored directories identified by the author_id and disc_id identifiers contained in the manifest ( ) of the downloaded files. If the corresponding directory is present on the local storage 24, the downloaded data file is expanded on that directory. If no corresponding directory is present, a new directory specified by the author_id and disc_id identifiers is created, and the downloaded data file is then expanded thereon.

Figure 32:
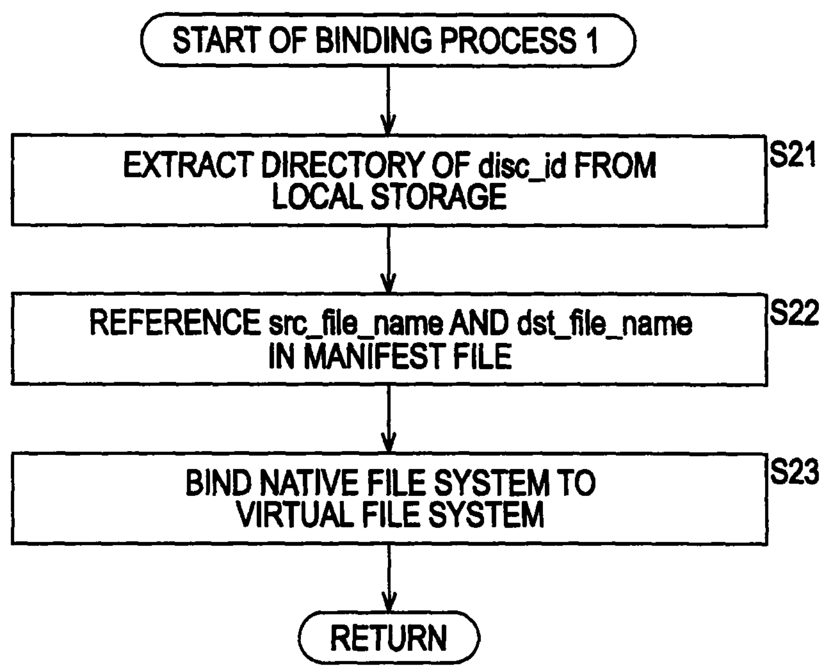
FIG. 32 is a flowchart illustrating a binding process 1.

In step S10, a binding process 1 to be described later with reference to FIG. 32 is performed.

Through this process, the update file is downloaded from the server 3, stored on the local storage 24, and handled as an update file of the content recorded on the optical disk 11.

For example, a user purchases an optical disk 11 having a content such as a movie recorded thereon. The user then acquires a file required to display a caption of a language unrecorded on the optical disk 11 or a file required to view a bonus track, and then stores those files on the local storage 24. The application program for performing the reproduction process can thus handle the data recorded on the optical disk 11 and the data recorded on the local storage 24 without any difference. As a result, a virtual file system that hides the storage of physical data from the user and the application program is produced.

Those update files may be downloaded free of charge or for a fee.

Figure 31:
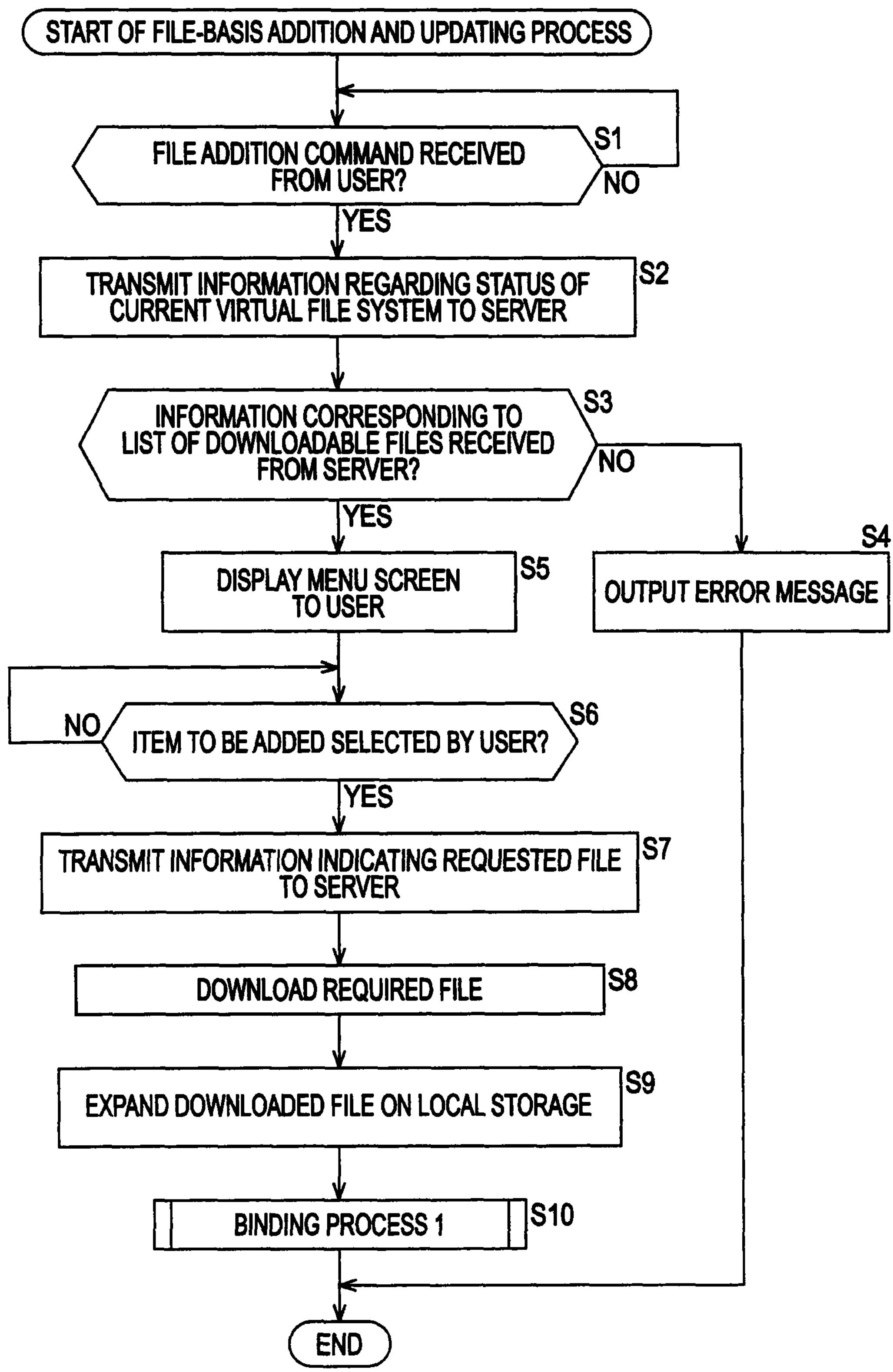
FIG. 31 is a flowchart illustrating an addition and updating process performed on a per file basis.

The binding process 1 executed in step S10 of FIG. 31 is described below with reference to a flowchart of FIG. 32.

In step S21, the local storage directory manager 34 extracts a directory of a corresponding disc_id from a downloaded data group stored on the local storage 24, and then supplies the directory to the file system merge processor 36.

In step S22, the file system merge processor 36 references the src_file_name and dst_file_name fields in the manifest file.

In step S23, the file system merge processor 36 binds a native file system to a virtual file system based on the src_file_name and dst_file_name.

More specifically, the src_file_name presents a "path name" representing a path, i.e., information uniquely identifying where the corresponding file is recorded in the directory structure in the file system of the local storage 24. The dst_file_name field presents a "path name" representing a path, i.e., information uniquely identifying where the corresponding file is recorded in the directory structure at a binding destination in the virtual disk of the file stored on the local storage 24.

For example, in the manifest ( ) section described with reference to FIG. 10, "/MainMovie/movie01/main.r1.jp.mp2" as a path name might be specified in the src_file_name field and "/STREAM/01002.m2ts" as a path name might be specified in the dst_file_name field. As previously discussed with reference to FIG. 15, the downloaded data is stored under a file name of main.r1.jp.mp2 in a movie01 folder in MainMovie folder on the local storage 24 in accordance with the author_id and disc_id identifiers. In the virtual file system on the virtual disk, the file system merge processor 36 performs the binding process so that the downloaded data is handled as a file having a file name of 01002.m2ts in a STREAM directory.

The content author can specify the path name in the local storage 24 in the src_file_name field of the manifest ( ) section of the downloaded file package, and the path name of the virtual file system on the virtual disk in the dst_file_name field. If the path name adapted to the virtual file system on the virtual disk (i.e., adapted to the file system of the optical disk 11) is set in the dst_file_name field, the content author can freely set the file/directory structure under the disc_id identifier and add newly a directory and a file in an area under the disc_id identifier of the data actually recorded on the local storage 24 in the reproducing apparatus 1.

Figure 33:
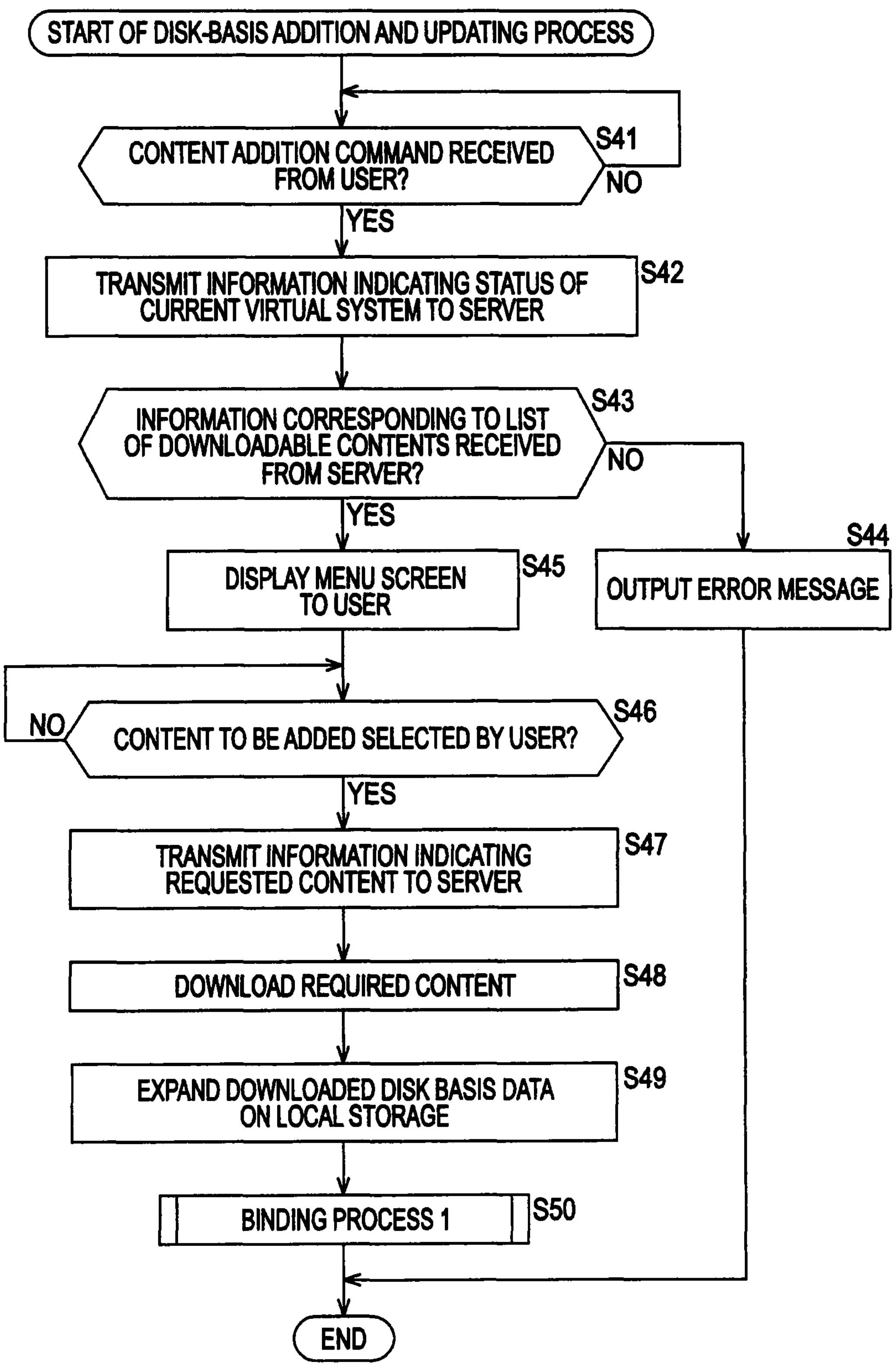
FIG. 33 is a flowchart illustrating an addition and updating process performed on a disk basis.

An addition and updating process performed on a disk basis is described below with reference to a flowchart of FIG. 33.

In step S41, the operation input acquisition unit 32 in the controller 21 determines, based on a signal supplied from the operation input unit 29, whether a command to start the disk-basis file addition and updating process, i.e., the file addition and updating process of a file under the disc_id identifier of the data to be recorded on the local storage 24 has been received. If it is determined in step S41 that the command to start the file addition process has not been received, the operation input acquisition unit 32 repeats step S41 until the start command has been received.

If it is determined in step S41 that the command to start the file addition process has been received, the local storage directory manager 34 in the controller 21 controls the data acquisition unit 33 in step S42, thereby accessing the server 3 via the Internet interface 25 and the network 2 to transmit information indicating the status of the current virtual file system, such as the manifest_id identifier of the manifest ( ) section under the disc_id identifier, to the server 3.

In step S43, the data acquisition unit 33 controls the Internet interface 25, thereby determining whether information corresponding to the list of downloadable disk-basis files has been received from the server 3 via the network 2.

If it is determined in step S43 that the information corresponding to the list of downloadable disk-basis files has not been received, the menu screen display controller 31 controls in step S44 displaying of an error message notifying the user that the file addition process is disabled, and then ends the process.

If it is determined in step S43 that the information corresponding to the list of downloadable files has been received, the data acquisition unit 33 supplies in step S45 the menu screen display controller 31 with information regarding the list of downloadable files transmitted from the server 3 and received via the Internet interface 25. The menu screen display controller 31 causes a display device to display a menu screen of the list of downloadable files from which the user is allowed to select one.

In step S46, the operation input acquisition unit 32 determines whether the user has selected an item to be added using one of buttons and icons on the menu screen displayed under the control of the menu screen display controller 31. If it is determined in step S46 that any item the user may want to add has not been selected, step S46 is repeated until it is determined that any item has been selected.

If it is determined in step S46 that an item the user may want to add has been selected, the operation input acquisition unit 32 supplies in step S47, to the data acquisition unit 33, information indicating the content of updating selected by the user. The data acquisition unit 33 controls the Internet interface 25 and transmits information indicating a requested file to the server 3 to request the server 3 to send back the file selected by the user.

In step S48, the data acquisition unit 33 controls the Internet interface 25, thereby causing the server 3 to download a disk-basis file group prepared as download files. The data acquisition unit 33 then notifies the local storage directory manager 34 that the disk-basis file group have been downloaded.

In step S49, the local storage directory manager 34 generates, on the local storage 24, directories identified by the author_id and disc_id identifiers contained in the manifest ( ) of the downloaded files. The local storage directory manager 34 then expands the downloaded disk-basis data on the generated directories on the local storage 24.

In step S50, the binding process 1 discussed with reference to FIG. 32 is performed.

Through this process, the update file is downloaded from the server 3, stored on the local storage 24, and handled as an update file of the content recorded on the optical disk 11.

For example, a user purchases an optical disk 11 having a content such as a movie recorded thereon. The user then acquires, on a disk basis, a file required to display a caption of a language unrecorded on the optical disk 11, a file required to view a bonus track, and the like, and then stores those files on the local storage 24. The application program for performing the reproduction process can thus handle the data recorded on the optical disk 11 and the data recorded on the local storage 24 without any difference. As a result, a virtual file system that hides the storage of physical data from the user and the application program is produced.

As the downloading of the update file on a file basis, the downloading of the update file on a disk basis may be performed free of charge or for a fee.

The downloading of the update file on a file basis has been discussed with reference to FIG. 31, and the downloading of the update file on a disk basis has been discussed with reference to FIG. 33. Alternatively, the user can issue a command to start downloading files without paying attention to the difference between file-basis downloading and disk-basis downloading. More specifically, depending on whether the data to be downloaded from the server 3 is on a file basis or a disk basis, the method of the local storage directory manager 34 for expanding the data downloaded to the local storage 24 is changed.

Figure 34:
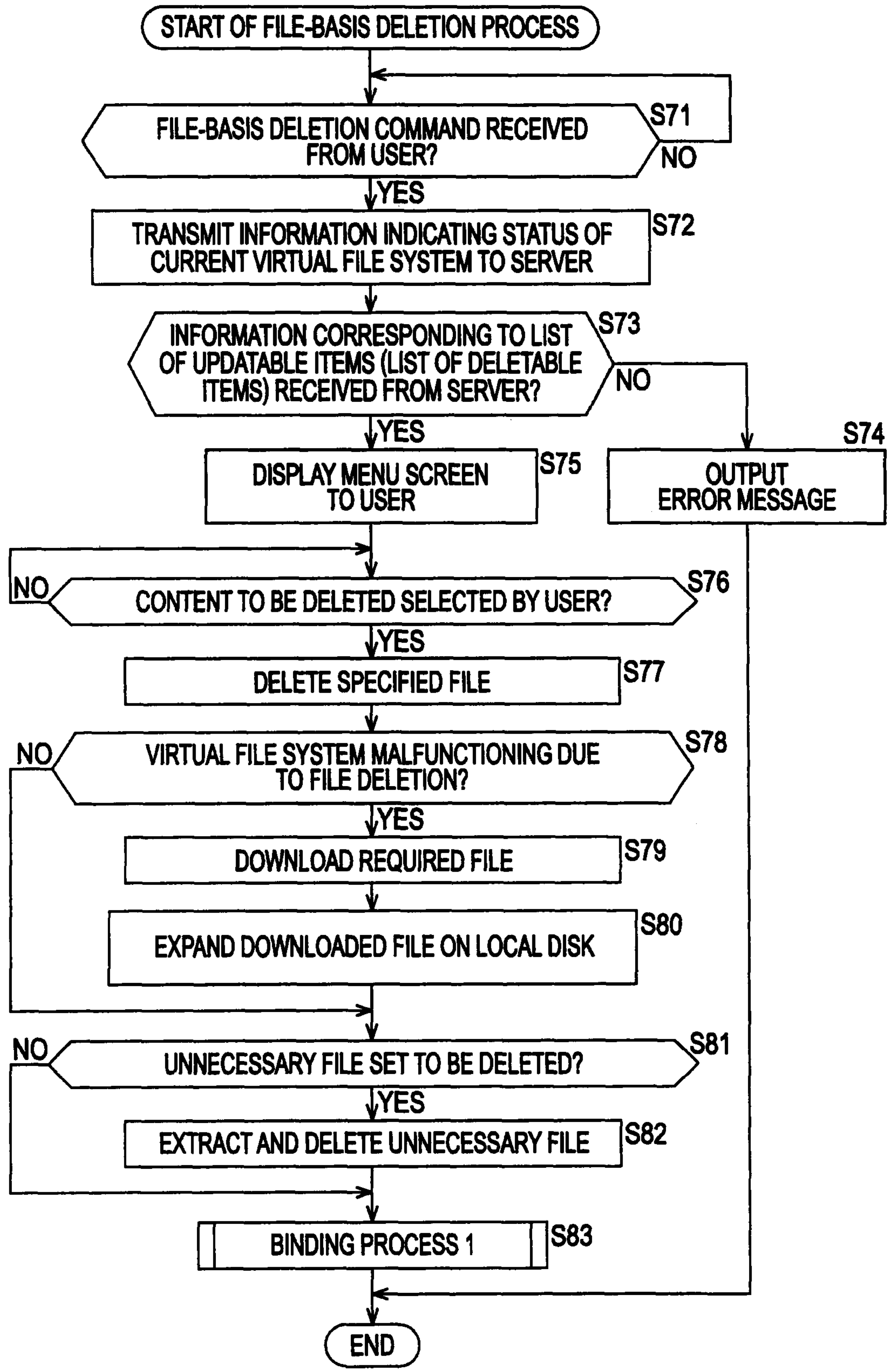
FIG. 34 is a flowchart illustrating a deletion process performed on a file basis.

The deletion process performed on a file basis is described below with reference to a flowchart of FIG. 34.

In step S71, the operation input acquisition unit 32 in the controller 21 determines, based on a signal supplied from the operation input unit 29, whether a command to start the file-basis file deletion process, i.e., the file deletion process of a file on a directory under the disc_id identifier has been received. If it is determined in step S71 that the command to start the file-basis deletion process has not been received, the operation input acquisition unit 32 repeats step S71 until it is determined that the start command has been received.

If it is determined in step S71 that the command to start the file-basis deletion process has been received, the local storage directory manager 34 in the controller 21 controls the data acquisition unit 33 in step S72, thereby accessing the server 3 via the Internet interface 25 and the network 2 to transmit information indicating the status of the current virtual file system, such as the manifest_id identifier of the manifest ( ) section, to the server 3.

In step S73, the data acquisition unit 33 controls the Internet interface 25, thereby determining whether updatable information, i.e., information corresponding to a list of deletable items has been received from the server 3 via the network 2.

If it is determined in step S73 that the information corresponding to the list of updatable items has not been received, the menu screen display controller 31 controls in step S74 displaying of an error message notifying the user that the file deletion process is disabled, and then ends the process.

If it is determined in step S73 that the information corresponding to the list of updatable items has been received, the data acquisition unit 33 supplies in step S75 the menu screen display controller 31 with information regarding the list of updatable items transmitted from the server 3 and received via the Internet interface 25. The menu screen display controller 31 causes the display device to display a menu screen of the list of updatable items from which the user is allowed to select one.

In step S76, the operation input acquisition unit 32 determines whether the user has selected an item to be deleted using one of buttons and icons on the menu screen displayed under the control of the menu screen display controller 31. If it is determined in step S76 that any item the user may want to delete has not been selected, step S76 is repeated until it is determined that any item has been selected.

If it is determined in step S76 that an item the user may want to delete has been selected, the operation input acquisition unit 32 supplies in step S77, to the local storage directory manager 34, information indicating the item the user has selected as an item to be deleted. The local storage directory manager 34 deletes the selected file from the local storage 24.

In step S78, the file system merge processor 36 determines whether the deletion process executed in step S77 can cause any malfunction in the link structure of the files in the virtual file system. If it is determined in step S78 that no malfunction can be caused in the link structure of the files in the virtual file system, processing proceeds to step S81.

If it is determined in step S78 that a malfunction can be caused in the link structure of the files in the virtual file system, the file system merge processor 36 extracts in step S79 a data file (or a folder or a directory) required to correct the malfunction, and supplies the data file to the data acquisition unit 33. The data acquisition unit 33 controls the Internet interface 25, and transmits information indicating a requested file to the server 3 to request the server 3 to download the file selected by the user. The data acquisition unit 33 controls the Internet interface 25, thereby downloading the file required to correct the malfunction and prepared by the server 3. The data acquisition unit 33 then notifies the local storage directory manager 34 that these files have been downloaded.

In step S80, the local storage directory manager 34 determines whether the local storage 24 stores a directory identified by the author_id and disc_id identifiers contained in the manifest ( ) of the downloaded file. If the corresponding directory is present on the local storage 24, the local storage directory manager 34 expands the downloaded data file on that directory. If no corresponding directory is present on the local storage 24, the local storage directory manager 34 generates a new directory specified by the author_id and disc_id identifiers on the local storage 24 and expands the downloaded data file there.

If it is determined in step S78 that no malfunction can be caused in the link structure of the files in the virtual file system, or subsequent to step S80, the file system merge processor 36 determines in step S81 whether a file having become unnecessary as a result of the file deletion process in step S77, such as a file not to be reproduced by any PlayList (file unspecified by all PlayLists) is set to be deleted. If it is determined in step S81 that an unnecessary file is set to be left rather than being deleted, processing proceeds to step S83.

If it is determined in step S81 that the unnecessary file is set to be deleted, the file system merge processor 36 extracts in step S82 the unnecessary file and commands the local storage directory manager 34 to delete the unnecessary file. In response to the command from the file system merge processor 36, the local storage directory manager 34 deletes the unnecessary file recorded on the local storage 24.

If it is determined in step S81 that the unnecessary file is set to be left rather than being deleted, the binding process 1 discussed with reference to FIG. 32 is performed in step S83 subsequent to step S82.

Through the above-described process steps, the update file downloaded from the server 3 and then stored on the local storage 24 is deleted on a file basis, namely, by file unit containing the directory specified by the disc_id identifier.

Figure 35:
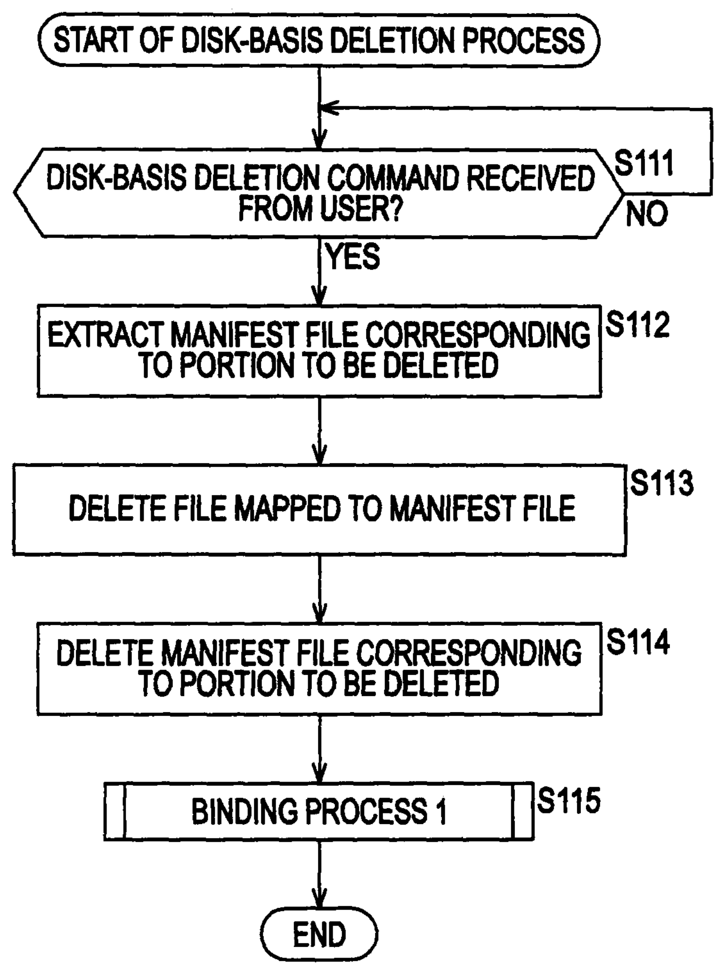
FIG. 35 is a flowchart illustrating a deletion process performed on a disk basis.

The deletion process performed on a disk basis is described below with reference to a flowchart of FIG. 35.

In step S111, the operation input acquisition unit 32 in the controller 21 determines, based on a signal supplied from the operation input unit 29, whether a disk-basis deletion command, namely, a command to start deleting all files contained in the directory specified by the disc_id identifier has been received. If it is determined in step S111 that the command to start the disk-basis deletion process has not been received, step S111 is repeated until it is determined that the command to start the disk-basis deletion process has been received.

If it is determined in step S111 that the command to start the disk-basis deletion command has been received, the file system merge processor 36 extracts in step S112 a manifest file corresponding to the portion to be deleted, for example, the manifest file corresponding to the author_id and disc_id identifiers of the optical disk 11 loaded on the reproducing apparatus 1, and causes the local storage directory manager 34 to read the corresponding manifest file.

In step S113, the local storage directory manager 34 deletes a file associated with the manifest file from the local storage 24 based on the read manifest file.

In step S114, the local storage directory manager 34 deletes the manifest file corresponding to the deleted portion from the local storage 24.

In step S115, the binding process 1 described with reference to FIG. 32 is performed, and the process then ends.

All files contained in the directory identified by the disc_id identifier are deleted, and the manifest file corresponding to the deleted files is also deleted. In the binding process, the file system merge processor 36 binds zero directory and zero file because no manifest file is found (i.e., binds nothing), and ends the binding process. Finally, the file/directory structure on the optical disk 11 is managed as a virtual file system.

The update files downloaded from the server 3 and recorded on the local storage 24 is deleted as all files contained in the directory identified by the disc_id identifier.

As the file-basis file addition and deletion process, the disk-basis file deletion process may be performed by transmitting information indicating the current virtual disk (virtual file system) to the server 3 and receiving information regarding updatable content from the server 3. Based on the information regarding the updatable content, the deletion process may be performed.

Figure 36:
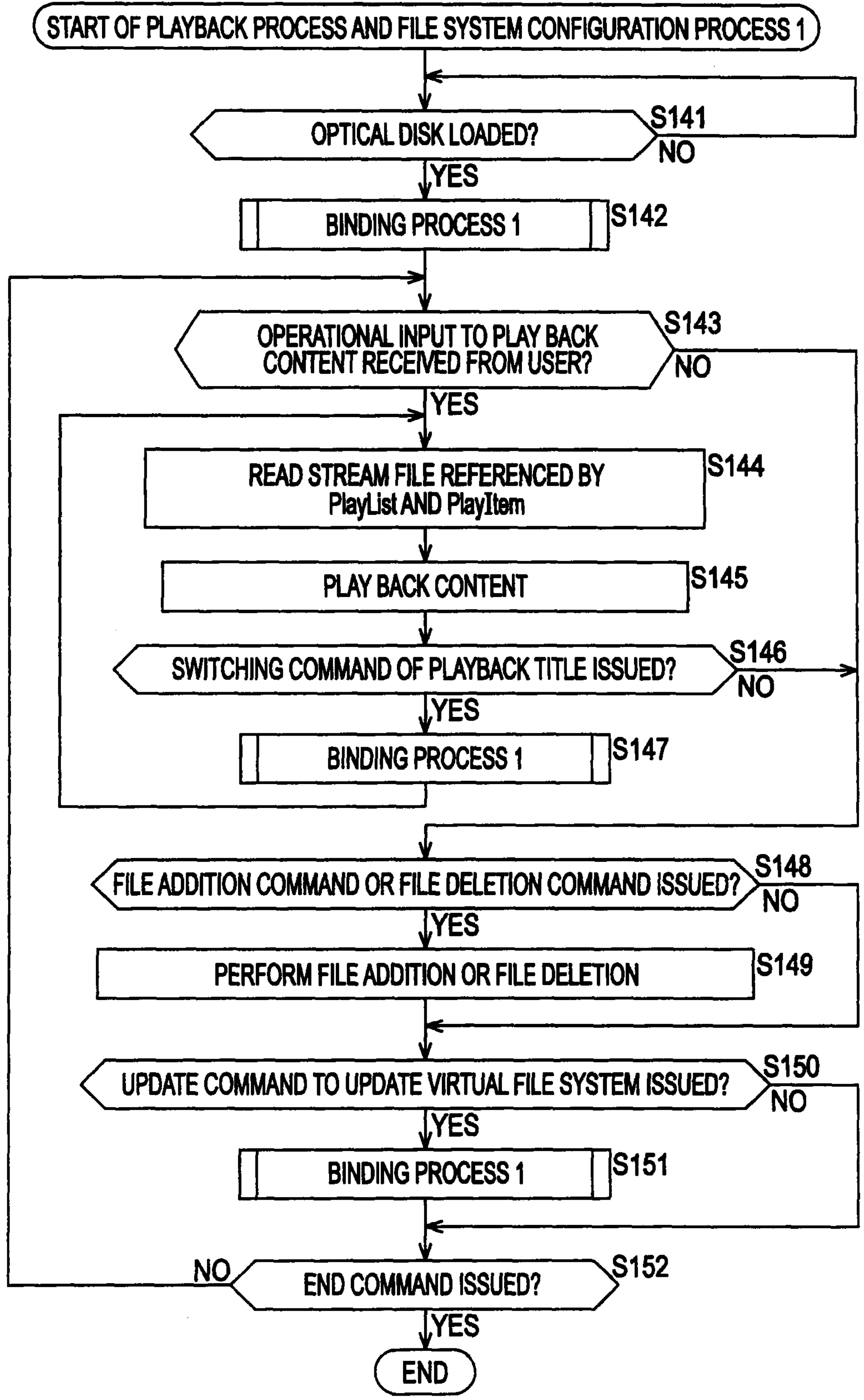
FIG. 36 is a flowchart illustrating a reproduction process and a file system configuration process.

A reproduction process and a file system configuration process are described below with reference to a flowchart of FIG. 36. The binding method used herein is the static binding.

In step S141, the optical disk directory manager 35 determines whether the optical disk 11 is loaded. If it is determined in step S141 that the optical disk 11 is not loaded, step S141 is repeated until it is determined that the optical disk 11 is loaded. If it is determined in step S141 that the optical disk 11 is loaded, the optical disk directory manager 35 reads the author_id and disc_id identifiers from the optical disk 11, and outputs the read author_id and disc_id identifiers to the local storage directory manager 34 and the file system merge processor 36. Processing proceeds to step S142. The binding process 1 described with reference to FIG. 32 is executed.

In step S143, the reproduction controller 37 determines, based on an operation input supplied via the operation input acquisition unit 32 by the user, whether a user command input to reproduce a content has been received. If it is determined in step S143 that no user command input to reproduce a content has not been received, processing proceeds to step S148.

If it is determined in step S143 that the user command input to reproduce the content has been received, the reproduction controller 37 controls in step S144 the local storage directory manager 34 and the optical disk directory manager 35, thereby acquiring the PlayList and the SubPlayItem by which the navigation program specifies a reproduction period. The reproduction controller 37 further controls the local storage directory manager 34 and the optical disk directory manager 35, thereby reading stream files (an AV file, an audio file, a caption text stream file) referenced by the acquired PlayList and SubPlayItem and supplying the read stream files to the decoder 26. A timestamp represented by the PlayList and SubPlayItem is Converted into address in accordance with the clip information, and accessing to the AV stream is thus performed.

In step S145, the reproduction controller 37 controls the decoder 26, thereby reproducing the content specified by the PlayItem.

In step S146, the operation input acquisition unit 32 determines whether an operation input command to switch a reproduction title (content to be reproduced) has been received. If it is determined in step S146 that the operation input command to switch the reproduction title has not been received, processing proceeds to step S148.

If it is determined in step S146 that the operation input command to switch the reproduction title has been received, the operation input acquisition unit 32 supplies a signal responsive to the user operation input to the optical disk directory manager 35. The optical disk directory manager 35 reads the author_id and disc_id identifiers from the optical disk 11, and outputs the read author_id and disc_id identifiers to the local storage directory manager 34. Processing proceeds to step S147. The binding process 1 described with reference to FIG. 32 is executed. Subsequent to the end of step S147, processing returns to step S144 to repeat step S144 and subsequent steps.

If it is determined in step S143 that the operation input command to reproduce the content has not been received, or if it is determined in step S146 that the operation input command to switch the reproduction title has not been received, the operation input acquisition unit 32 determines in step S148 whether one of a file addition command and a file deletion command has been received from the user.

If it is determined in step S148 that one of the file addition command and the file deletion command has been received from the user, one of the data acquisition unit 33 and the local storage directory manager 34 executes in step S149 one of the file addition process and the file deletion process as previously discussed with reference to FIGS. 31, and 33 through 35.

If it is determined in step S148 that none of the file addition command and the file deletion command has been received, or subsequent to step S149, the operation input acquisition unit 32 determines in step S150 whether a command to update the virtual file system has been issued.

If it is determined in step S150 that the command to update the virtual file system has been issued, API (such as update ( )) defined to update the virtual file system is called. In step S151, the binding process 1 described with reference to FIG. 32 is executed.

If it is determined in step S150 that the command to update the virtual file system has not been issued, or subsequent to step S151, the operation input acquisition unit 32 determines in step S152 whether a command to end the process of the reproducing apparatus 1 (such as a command to end the application program or a command to power off the reproducing apparatus 1) has been issued.

If it is determined in step S152 that the command to end the process of the reproducing apparatus 1 has not been issued, processing returns to step S143 to repeat step S143 and subsequent steps. If it is determined in step S152 that the command to end the process of the reproducing apparatus 1 has been issued, the process thus ends.

Through the process steps, the data recorded on the optical disk 11 and the data downloaded from the server 3 and stored on the local storage 24 are bound to each other to construct a virtual file system at a predetermined timing, and the content is reproduced based on the virtual file system.

The update file of the content recorded on the optical disk 11 is downloaded and then stored on the local storage 24 in the reproducing apparatus 1. The content file recorded on the optical disk 11 and the update file stored on the local storage 24 are thus easily handled.

More specifically, the virtual file system is defined as an upper layer of the native file system of the reproducing apparatus 1 (file system of the data actually recorded on one of the optical disk 11 and the local storage 24). The file systems of the data actually recorded on the optical disk 11 and the local storage 24 are merged to produce the virtual file system. The manifest file as the metadata of the downloaded data contains an author_id identifier uniquely identifying a content originator, and a disc_id identifier uniquely identifying the optical disk 11 bearing the content created by the content originator identified by the author_id identifier.

The disk area of the local storage 24 contains a directory structure which is segmented on a per content supplier (content author) basis. In a disc_id directory immediately below the author_id identifier, the content author may configure a flexible file/directory structure. The location of the data stored in the disk area on the local storage 24, namely, the file/directory structure of the downloaded file, is described as a path name in the src_file_name field of the manifest data contained in the downloaded data.

The file/directory structure of the virtual disk accessible from the application complies with the file/directory structure of the optical disk 11. A path name uniquely identifying a binding destination in the virtual disk of the file stored on the local storage 24 is specified in the dst_file_name field of the manifest data contained in the downloaded data.

With this arrangement, the file/directory structure of the local storage 24 is hidden from the application program executed by the reproducing apparatus 1 and the user.

It is also possible to delete part of a file recorded on the local storage 24. At a predetermined timing after the deletion of part of the file, the binding process is again executed and a new virtual file system is generated. If the deletion of the file causes a malfunction in the link structure of the files in the virtual file system, a file required to correct the malfunction is extracted, and then downloaded from the server 3.

In the discussion of the above-referenced process, the downloading of files from the server 3 is preformed from the command of the user. The server 3 may be accessed to download the files therefrom immediately subsequent to the loading of the optical disk 11 onto the reproducing apparatus.

As previously discussed with reference to FIG. 13, the Index file recorded on the optical disk 11 contains information regarding a menu for reproducing the optical disk 11. The reproducing apparatus 1 causes a display device to display a reproduction menu screen based on the Index file. The reproduction menu screen shows items for reproducing all contents on the optical disk 11, reproducing a particular chapter only, reproducing repeatedly a particular chapter, and displaying an initial menu. MovieObject that is executed with any item selected is set in the Index file. When a user selects one item from the reproduction menu screen, the reproducing apparatus 1 executes a MoveObject command set in the Index file.

FIG. 37 illustrates a syntax of the Index file (Index.bdmv).

A type_indicator field includes an "INDEX" value encoded based on ISO 646.

A version_number field includes a four-character string representing a version number of Index.bdmv, namely, the value "0089" encoded based on ISO 646.

An indexes_start_address field includes a start address of the Indexes ( ) block.

An AppInfoBDMV ( ) field includes an individual identifier representing a source of the optical disk 11.

A Indexes ( ) field includes a link to an application (MovieObject) for reading a menu, searching a title, jumping to a predetermined title, or automatically initiating the optical disk 1 when the optical disk is loaded on the reproducing apparatus 1. The syntax of the Indexes ( ) will be described later with reference to FIG. 38.

A padding_word field includes 0 or a positive integer inserted based on the syntax of Index.bdmv.

FIG. 38 illustrates the syntax of Index.bdmv.

A length field represents how many bytes of information is written in Indexes ( ).

FirstPlayback is a data block containing information relating to Movie Object that is automatically performed first when the optical disk 11 is loaded onto the reproducing apparatus 1.

A FirstPlayback_mobj_id_ref field specifies a value of mobj_id of the first performed Movie Object. The mobj_id is an ID uniquely identifying the respective Movie Object. The Movie Object that is automatically performed in response to the loading of the optical disk 11 onto the reproducing apparatus 1 may not be set. In other words, any application is not executed in response to a mere loading of the optical disk 11 onto the reproducing apparatus 1, but executed in response to a subsequent command from a user. In such a case, "OXffff" is written in this field.

A TopMenu ( ) is a data block containing information regarding the Movie Object of TopMenu called when the user displays a menu screen.

A TopMenu_mobj_id_ref field specifies the value of mobj_id of the Movie Object of TopMenu. If TopMenu is not set in the optical disk 11, "OXFFFF" is written in this field.

A number_of_Titles field represents the number of titles written in Indexes ( ).

A Title[title_id] ( ) block includes information regarding each title uniquely identified by title_id. The assigned title_id starts with zero.

A Title_playback_type[title_id] field represents a playback type of a title identified by the title_id. If the title is a content containing a moving image and audio, a reproduction process is performed based on PlayList.

A Title access_type[title_id] field includes information indicating whether the reproduction of the title identified by title_id using Title_Search is permitted.

A Title_mobj_id_ref[title_id} field specifies the value of mobj_id of the Movie Object having the title identified by title_id entered.

In FirstPlayback of the Index file (Index.bdmv) discussed with reference to FIGS. 37 and 38, an application may be specified to transmit information indicating the state of a current virtual file system. In such a case, the reproducing apparatus 1 accesses the server 3 immediately in response to the loading of the optical disk 11 onto the reproducing apparatus 1, transmits information indicating the state of own virtual file system, and downloads files as necessary.

Figure 39:
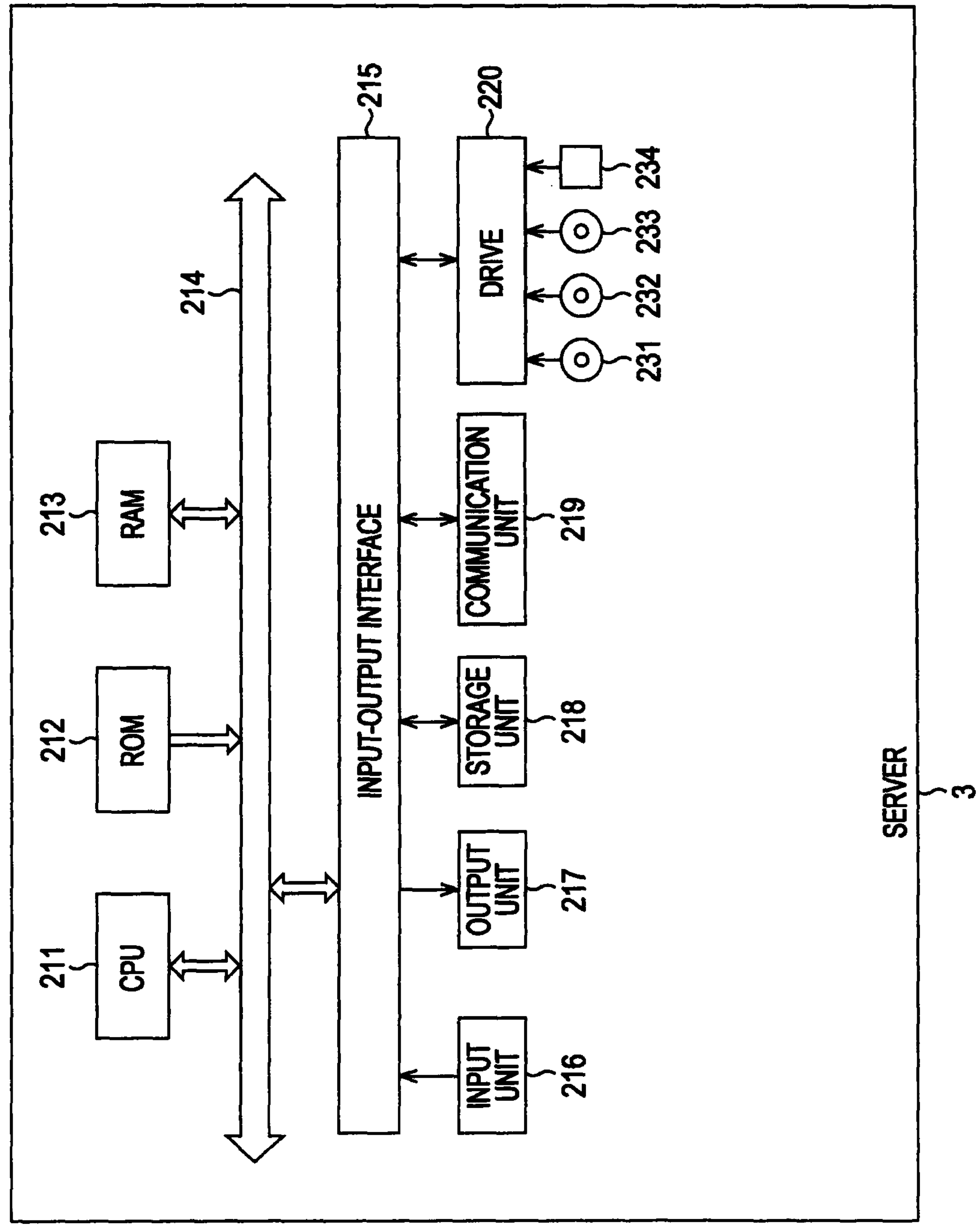
FIG. 39 is a block diagram illustrating a structure of a server 3.

FIG. 39 is a block diagram illustrating the server 3.

A CPU (Central Processing Unit) 211 executes a variety of processes in accordance with a program stored on a ROM (Read Only Memory) 212 and a program loaded to a RAM (Random Access Memory) 213. The RAM 213 stores data required by the CPU 211 in the execution of the processes.

The CPU 211, the ROM 212, and the RAM 213 are interconnected to each other via a bus 214. The bus 214 connects to an input-output interface 215.

Also connected to the input-output interface 215 are an input unit 216 including a keyboard and a mouse, an output unit 217 including a display and a loudspeaker, a storage unit 218 including a hard disk, and a communication unit 219 including a modem and a terminal adaptor. The communication unit 219 performs a communication process via the network 2 such as the Internet.

The input-output interface 215 is also connected to a drive 220 as necessary. One of a magnetic disk 231, an optical disk 232, a magneto-optical disk 233, and a semiconductor memory 234 is loaded onto the drive 220. A computer program read from one of these recording media is installed onto the storage unit 218 as necessary.

Figure 40:
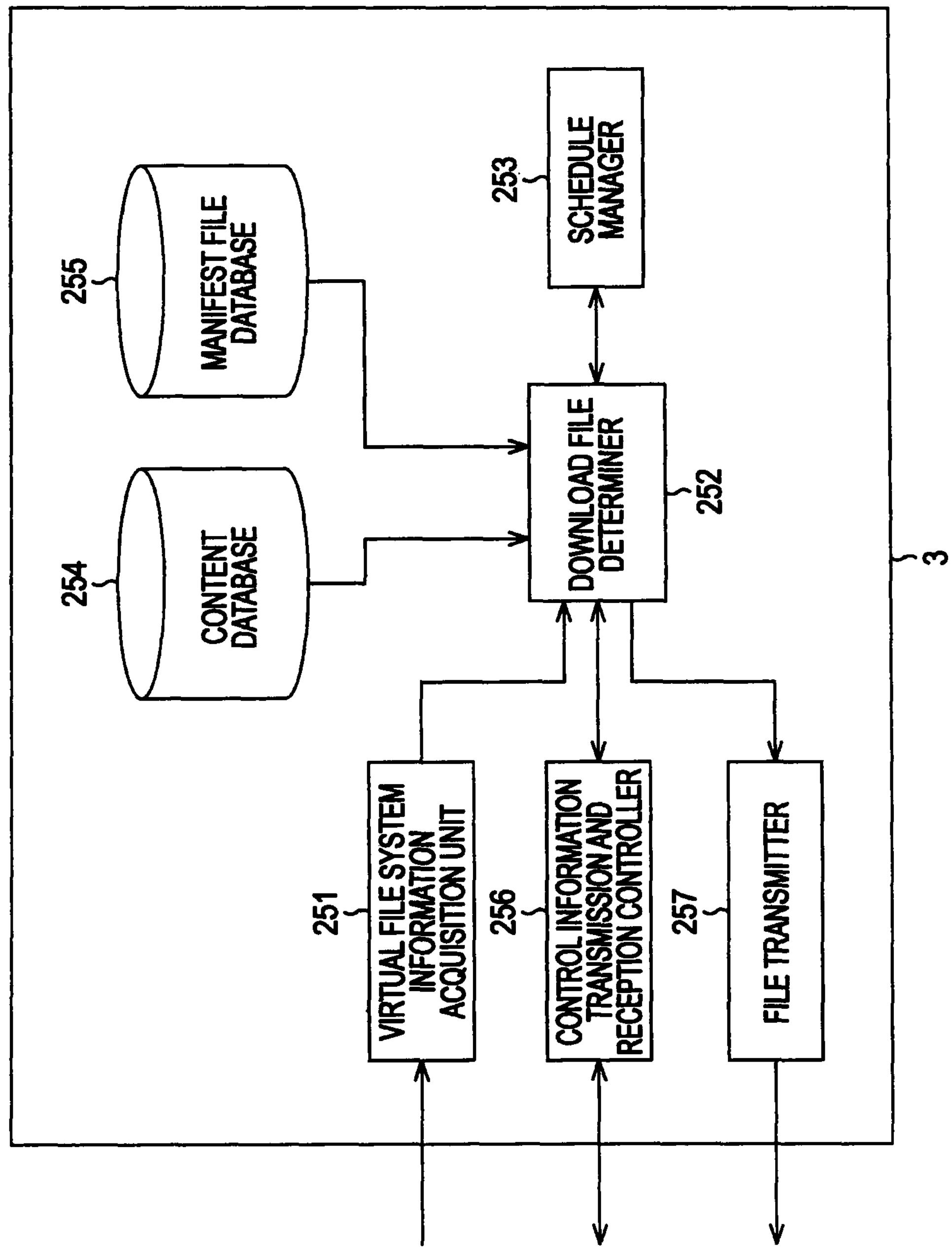
FIG. 40 is a functional block diagram illustrating a function of the server 3.

FIG. 40 is a block diagram of a function that is performed when the CPU 211 in the server 3 executes a predetermined program. The server 3 is embodied when the CPU 211 executes the predetermined program to perform the function of FIG. 40. Alternatively, the server 3 may be embodied using hardware units that perform the function of FIG. 40.

A virtual file system information acquisition unit 251 acquires information supplied from the reproducing apparatus 1 via the network 2 and indicating the state of a current virtual file system of the reproducing apparatus 1 and then supplies the information to a download file determiner 252.

Based on the information supplied by the virtual file system information acquisition unit 251 and indicating the state of the current virtual file system of the reproducing apparatus 1, the download file determiner 252 selects, based on management of the schedule of a schedule manager 253, a file that the reproducing apparatus 1 can download. The download file determiner 252 generates a list of files, and supplies the list of files to a control information transmission and reception controller 256, thereby causing the control information transmission and reception controller 256 to supply the list of files to the reproducing apparatus 1 via the network 2. In response to the reception of information specifying a file, desired to be downloaded, from control information transmission and reception controller 256, the download file determiner 252 reads from a content database 254 content data to be downloaded, or reads from a manifest file database 255 a manifest file to be downloaded. The download file determiner 252 then supplies the read content data and the manifest file to a file transmitter 257, thereby transmitting the content data and the manifest file to the reproducing apparatus 1 via the network 2.

The schedule manager 253 manages a schedule that the download file determiner 252 uses to select contents downloadable to the reproducing apparatus 1. By managing the selection of the contents downloadable to the reproducing apparatus 1 in time sequence, the server 3 can update, for example, advertisements to be reproduced on the reproducing apparatus 1. The schedule manager 253 manages a download permit schedule on a per content basis. For example, the schedule manager 253 downloads a movie A as a content while downloading a preview of a movie B until a predetermined date. After the predetermined date, the schedule manager 253 inhibits the downloading of the movie B and then downloads a preview of another movie C.

For example, in the download permit schedule, the schedule manager 253 permits a given commercial film to be downloaded as one matching the current season, or a particular content to be downloaded during a predetermined campaign period only. Furthermore, the schedule manager 253 manages the download permit schedule on a per manifest file as to whether to permit each manifest file to be downloaded. More specifically, the schedule manager 253 permits an update manifest file to be downloaded to the reproducing apparatus 1 for a predetermined period of time or subsequent to a predetermined date and time. In this way, the schedule manager 253 modifies files recognizable by the reproducing apparatus 1.

The download permit schedule may be managed as table information that lists an ID uniquely identifying each content and each manifest file, and download start date or download permit period. The download permit schedule may be managed creating a database therefor. If a content (such as a CM) or a manifest file downloaded together with a predetermined content is managed in time sequence, the download permit schedule may be managed as table information. The table information may list an ID uniquely identifying a content, an ID uniquely identifying a content or a manifest file downloaded together with the content, and a download start date or a download permit period of a file downloaded together with the content. As another method, a database may be created to manage the download permit schedule.

The content database 254 stores content data downloaded from the server 3 to the reproducing apparatus 1. The manifest file database 255 stores manifest files downloaded together with the content from the server 3 to the reproducing apparatus 1.

The control information transmission and reception controller 256 controls transmission and reception of control information via the network 2 between the server 3 and the network 2. More specifically, the control information transmission and reception controller 256 controls to the reproducing apparatus 1 the transmission of information indicating a list of downloadable contents supplied from the download file determiner 252. The control information transmission and reception controller 256 also controls from the reproducing apparatus 1 the reception of information indicating a file desired to be downloaded, thereby supplying the file to the download file determiner 252. The file transmitter 257 controls to the reproducing apparatus 1 the transmission of the file supplied from the download file determiner 252 for downloading.

The process of the reproducing apparatus 1 and the server 3 is described below with reference to a flowchart of FIG. 41. In the process, the reproducing apparatus 1 accesses the server 3 immediately after the optical disk 11 is loaded, and downloads files as necessary.

In step S201, the optical disk drive 22 in the optical disk 11 determines whether the optical disk 11 is loaded. If it is determined in step S201 that the optical disk 11 has not yet been loaded, step S201 is repeated until it is determined that the optical disk 11 has been loaded.

If it is determined in step S201 that the optical disk 11 has been loaded, the controller 21 controls the optical disk drive 22 in step S202 to load data in a predetermined area of the loaded optical disk 11, namely, data written in the FirstPlayback of the above-mentioned Indexes ( ). The controller 21 expands the data onto the memory 23, and reads and initiates an application specified in the FirstPlayback ( ). The application specified by data written in the FirstPlayback ( ) accesses the server 3 to download files as necessary.

In step S203, the local storage directory manager 34 in the controller 21 controls the data acquisition unit 33, thereby accessing the server 3 via the Internet interface 25 and the network 2. The local storage directory manager 34 thus transmits to the server 3 information indicating the state of the current virtual file system, for example, Manifest_id of the Manifest ( ) section corresponding to disc_id of the loaded optical disk 11.

In step S204, the virtual file system information acquisition unit 251 in the server 3 receives the information indicating the state of the current virtual file system from the reproducing apparatus 1 via the network 2 and supplies the information to the download file determiner 252.

In step S205, the download file determiner 252 references the supplied information indicating the state of the current virtual file system, and determines whether file updating is possible to the reproducing apparatus 1. If it is determined in step S205 that file updating is not possible, processing ends.

If it is determined in step S205 that file updating is possible, the download file determiner 252 references in step S206 the schedule managed by the schedule manager 253, and determines whether the reproducing apparatus 1 has a content in need of updating. The schedule manager 253 manages the schedule for use in selection of a content downloadable to the reproducing apparatus 1.

If it is determined in step S206 that the reproducing apparatus 1 has no content in need of updating, the download file determiner 252 in the server 3 supplies in step S207 the control information transmission and reception controller 256 with information notifying the reproducing apparatus 1 that there is no downloadable file. The control information transmission and reception controller 256 transmits to the reproducing apparatus 1 the information notifying the reproducing apparatus 1 that there is no downloadable file.

In step S208, the data acquisition unit 33 in the controller 21 in the reproducing apparatus 1 receives from the server 3 via the network 2 the notification that there is no downloadable file, and supplies the menu screen display controller 31 with the notification. The menu screen display controller 31 notifies the user that there is no downloadable file, by displaying a message to that effect. The reproducing apparatus 1 waits on standby for an operation input from the user.

If it is determined in step S206 that there is a content in need of updating, the download file determiner 252 in the server 3 generates in step S209 information corresponding to a list downloadable files, and supplies the control information transmission and reception controller 256 with the information. The control information transmission and reception controller 256 transmits to the reproducing apparatus 1 via the network 2 the information corresponding to the list of downloadable files.

In step S210, the data acquisition unit 33 in the controller 21 in the reproducing apparatus 1 receives the information corresponding to the list of downloadable files from the server 3 via the network 2, and supplies the menu screen display controller 31 with the received information. The menu screen display controller 31 causes the display device to display a menu screen from which the user can select a desired file on the list of the downloadable files.

In step S211, the operational input acquisition unit 32 in the controller 21 in the reproducing apparatus 1 determines whether a command to add a content has been received from the user. If it is determined in step S211 that no command has been received, step S211 is repeated until it is determined the command to add the content has been received.

If it is determined in step S211 that the command to add the content has been received, the operational input acquisition unit 32 supplies in step S212 the data acquisition unit 33 with information indicating update content selected by the user. The data acquisition unit 33 controls the Internet interface 25, thereby transmitting information indicating a requested file to the server 3 and requesting the server 3 to download the file requested by the user.

In step S213, the download file determiner 252 receives a signal indicating the download requested file transmitted from the reproducing apparatus 1 via the network 2, and supplies the download file determiner 252 with the signal.

In step S214, the download file determiner 252 reads the requested file from one of the content database 254 and the manifest file database 255, and supplies the file transmitter 257 with the read file. The file transmitter 257 transmits the request file to the reproducing apparatus 1 via the network 2.

In step S215, the data acquisition unit 33 in the controller 21 in the reproducing apparatus 1 controls the Internet interface 25, thereby causing the server 3 to download a PlayList file, a ClipInformation file, a ClipAV stream file, an audio file, a caption text stream file, or a font file as a download file, and then notifies the local storage directory manager 34 that these files have been downloaded.

In step S216, the local storage directory manager 34 determines, based on author_id and disc_id contained in Manifest ( ) of the downloaded file, whether a directory identified by these IDs is already present in the local storage 24. If it is determined in step S216 that the corresponding directory is already present, the downloaded data file is expanded onto that directory. If there is no corresponding directory, a new directory specified by author_id and disc_id is created in the local storage 24 and the downloaded data file is then expanded onto that directory.

Processing ends after the binding process 1 discussed with reference to FIG. 32 is performed in step S217.

If the application to access the server 3 and transmit the information indicating the state of the current virtual file system is specified in the FirstPlayback of the Index file (Index.bdmv), the reproducing apparatus 1 accesses the server 3 immediately subsequent to the loading of the optical disk 11, transmits the information indicating the state of own virtual file system, and downloads a file as necessary.

As described above, the server 3 manages the schedule for use in selection of the contents downloadable to the reproducing apparatus 1. For example, the server 3 downloads a movie A as a content while downloading a preview of a movie B until a predetermined date. After the predetermined date, the server 3 inhibits the downloading of the movie B and then downloads a preview of another movie C. Furthermore, the server 3 manages the download permit schedule on a per content basis or on a manifest file basis so that an update manifest may be downloaded to the reproducing apparatus 1 after a predetermined date or during a predetermined period of time. In this way, the server 3 updates the files recognizable by the reproducing apparatus 1.

In the above-described process, the content downloaded from the server 3 is not encrypted. An encryption key may be stored on the optical disk 11 and a new decryption processor may be arranged in the reproducing apparatus. Alternatively, the controller 21 in the reproducing apparatus 1 may have the decryption function using an encryption key, and a content downloaded from the server 3 is decrypted using the encryption key recorded on the optical disk 11, and is then subjected to the binding process.

Figure 42:
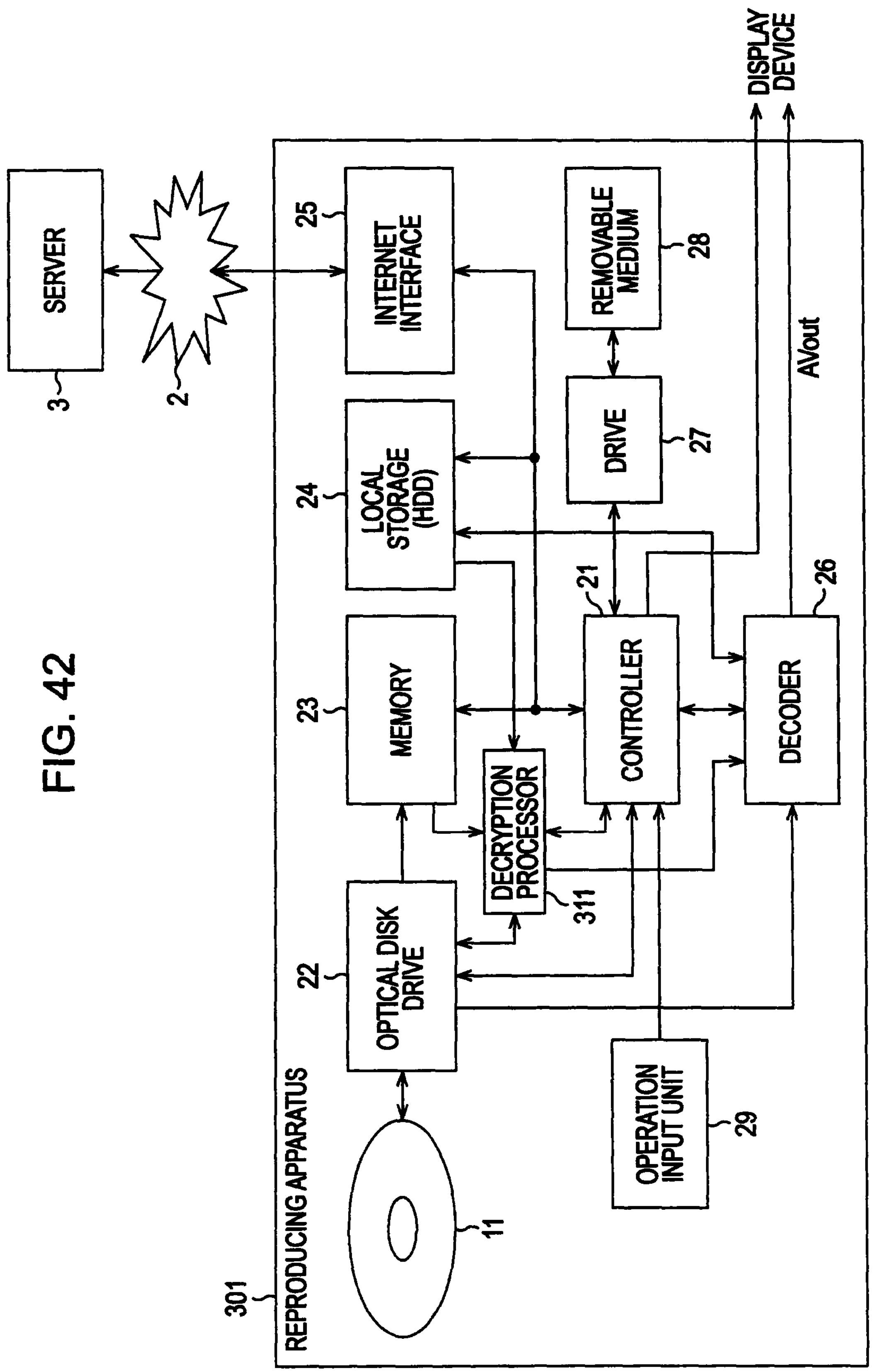
FIG. 42 illustrates the structure of the reproducing apparatus having a decryption processor.

FIG. 42 illustrates a reproducing apparatus having a decryption processor.

A reproducing apparatus 301 is basically identical to the reproducing apparatus 1 of FIG. 1 except that a decryption processor 311 is included.

The decryption processor 311 receives an encryption key that the optical disk drive 22 has read from the optical disk 11, and also receives a data file as an encrypted content from the local storage 24. Under the control of the controller 21, the decryption processor 311 decrypts the content and supplies the decrypted content to one of the memory 23 and the decoder 26.

Figure 43:
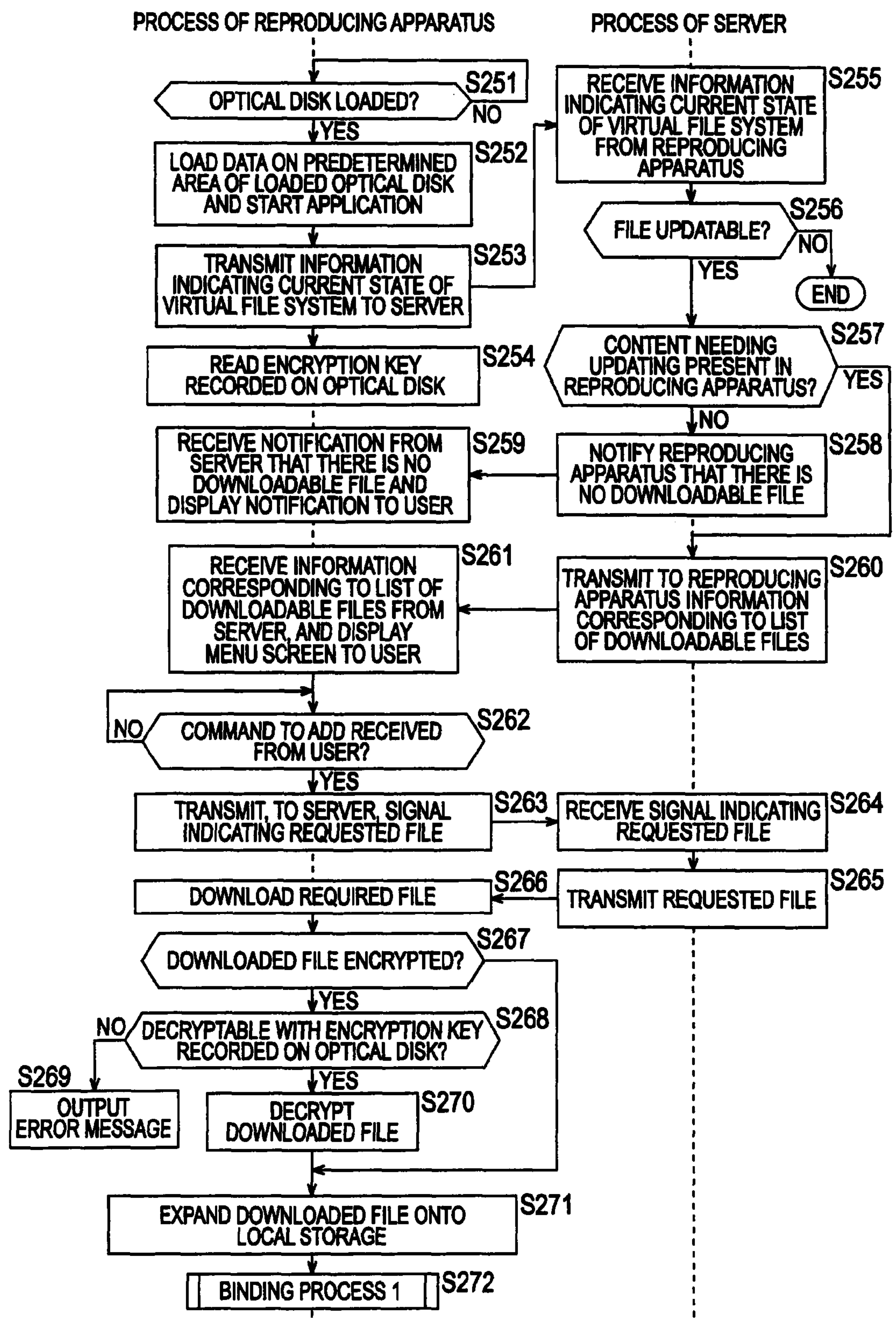
FIG. 43 is an arrow chart illustrating a process of the reproducing apparatus and the server.

A process performed by the reproducing apparatus 301 of FIG. 42 and the server 3 is described below with reference to a flowchart of FIG. 43.

Figure 41:
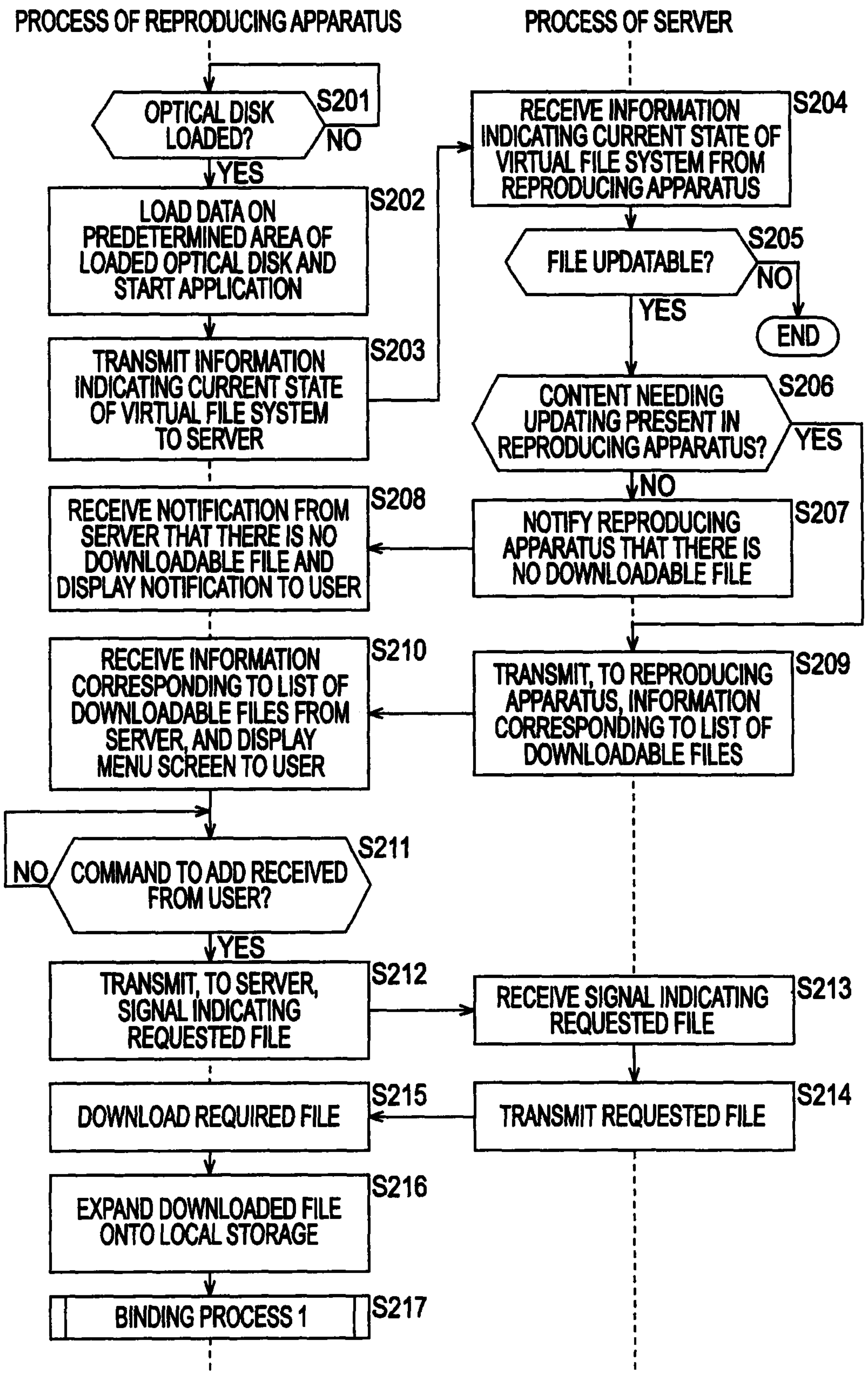
FIG. 41 is an arrow chart illustrating a process of the reproducing apparatus and the server.

The process performed by the reproducing apparatus 301 in steps S251 through S253 is basically identical to the process performed by the reproducing apparatus 1 in steps S201 through S203 of FIG. 41.

When the optical disk 11 is loaded, the data recorded on a predetermined area of the loaded optical disk 11 is loaded, and the application to download the file as necessary is performed with the server 3 being accessed by the reproducing apparatus 301. The information indicating the state of the current virtual file system, i.e., Manifest_id of the corresponding Manifest ( ) section is transmitted to the server 3.

In step S254, the optical disk drive 22 reads the encryption key from the optical disk 11 and then supplies the decryption processor 22 with the encryption. The decryption processor 22 stores the supplied encryption key.

The process performed by the reproducing apparatus 301 and the server 3 in steps S255 through S266 is basically identical to the process performed by the reproducing apparatus 1 and the server 3 in steps S204 through S215 of FIG. 41.

More specifically, the server 3 receives from the reproducing apparatus 301 the information indicating the state of the current virtual file system and determines whether file updating is possible in the reproducing apparatus 301. If it is determined that file updating is possible, the server 3 references the schedule managed by the schedule manager 253, and determines whether the reproducing apparatus 301 has a content in need of updating.

If it is determined that there is no content in need of updating, the server 3 transmits to the reproducing apparatus 301 via the network 2 information notifying the reproducing apparatus 301 that there is no downloadable file. Upon receiving from the server 3 via the network 2 the notification that there is no downloadable file, the reproducing apparatus 301 displays a message to notify the user that there is now no downloadable file. The reproducing apparatus 301 waits on standby for an operation input from the user.

If it is determined that there is a content in need of updating, the server 3 generates information corresponding to a list of downloadable files, and transmits the list to the reproducing apparatus 301 via the network 2. The reproducing apparatus 301 receives the information corresponding to the list of downloadable files from the server 3 via the network 2, and causes the display device to display a menu screen from which the user can select a desired one from the list of downloadable files.

The reproducing apparatus 301 determines whether a command to add a content has been received from the user. If it is determined that the command has been received, the reproducing apparatus 301 transmits to the server 3 information indicating update content selected by the user.

The server 3 receives a download-requested file from the reproducing apparatus 301 via the network 2, reads a requested file from one of the content database 254 and the manifest file database 255, and transmits the requested file via the network 2.

The reproducing apparatus 301 downloads from the server 3 one of a PlayList file, a ClipInformation file, a ClipAV stream file, an audio file, a caption text stream file, and a font file.

In step S267, the local storage directory manager 34 in the controller 21 in the reproducing apparatus 301 determines whether or not the downloaded file is an encrypted one.

If it is determined in step S267 that the downloaded file is encrypted, the local storage directory manager 34 determines in step S268 whether the downloaded file is decryptable with the encryption key supplied from the optical disk 11 to the decryption processor 311.

If it is determined in step S268 that the downloaded file is not decryptable with the encryption key recorded on the optical disk 11, the local storage directory manager 34 controls the menu screen display controller 31 in step S269, thereby outputting an error message notifying the user that the downloaded file cannot be decrypted.

If it is determined in step S268 that the downloaded file is decryptable with the encryption key recorded on the optical disk 11, the local storage directory manager 34 controls the decryption processor 311 in step S270, thereby decrypting the downloaded file.

If it is determined in step S267 that the downloaded file is not encrypted, or subsequent to step S270, the local storage directory manager 34 determines in step S271, based on author_id and disc_id contained in Manifest ( ) of the downloaded file, whether the directory identified by these IDs is already present on the local storage 24. If it is determined that the corresponding directory is already present, the downloaded data file is expanded onto that directory. If there is no corresponding directory, a new directory specified by author_id and disc_id is created on the local storage 24, and the downloaded data file is then expanded onto that directory in the local storage 24.

Processing ends when the binding process 1 discussed with reference to FIG. 32 is performed in step S272.

Even if only the Index.bdmv file and the encryption key are stored on the optical disk 11, the specified file is downloaded with the optical disk 11 loaded onto the reproducing apparatus 1. The specified file is then decrypted with the encryption key recorded on the loaded optical disk 11. The decrypted file is then expanded onto the local storage 24 (namely, stored in a file system of the local storage 24). When the optical disk 11 is loaded next time, the download process and the decryption process are no longer necessary, and the content previously downloaded and expanded is simply reproduced. Only a portion of the content may be recorded on the optical disk 11. As long as the Index.bdmv file and the encryption key for performing the above processes are recorded, the remaining content data file is automatically downloaded with the optical disk 11 loaded on the reproducing apparatus 1, decrypted with the encryption key recorded on the loaded optical disk 11, and expanded onto the local storage 24 (in the file system of the local storage 24). More specifically, even if all content data is not recorded on the optical disk 11 distributed to the user, the user enjoys the content through the above-described processes in the same manner as when all content data recorded on the optical disk 11 is distributed to the user. Unauthorized downloading of the content is thus prevented.

A content author distributes the optical disk 11 to each user, thereby supplying a large volume content regardless of the size of the optical disk 11 (even if the capacity of the optical disk 11 is not sufficient).

In the above-described processes, a path name in the local storage 24 is specified in the src_file_name field of the Manifest ( ) section of the downloaded file package, and a path name of the virtual file system in the virtual disk is specified in the dst_file_name field. Alternatively, not only the path name in the local storage 24 but also a path name of the data on the optical disk 11 may be specified in the src_file_name field.

By inhibiting accessing to a predetermined file in the description of index.bdmv, a portion of a file recorded on the optical disk 11 is hidden from the application program to be executed by the reproducing apparatus 1 (also the reproducing apparatus 301 hereinafter) or hidden from the user. On later days, the Manifest ( ) section having the Manifest_id corresponding to the optical disk 11 is downloaded from the server 3 to the reproducing apparatus 1. The Manifest ( ) section includes the src_file_name field in which the path name of the data of the hidden file on the optical disk 11 is specified, and the dst_file_name field in which the predetermined path name in the virtual file system is written. The application program executed on the reproducing apparatus 1 allows the file pre-recorded on the optical disk 11 to be handled in the same manner as the one newly downloaded at the same timing as the downloading of the new Manifest ( ) section.

The Manifest ( ) section, having the path name of the data of the optical disk 1 specified in the src_file_name field and the predetermined path name in the virtual file system written in the dst_file_name field, is managed by the schedule manager 253. The downloading of the Manifest ( ) section may be performed when the optical disk 11 is loaded onto the reproducing apparatus 1 or when the user of the reproducing apparatus 1 performs a predetermined process, such as performing a registration process or a billing process subsequent to accessing the server 3.

The path name of the data on the optical disk 11 is specified in the src_file_name field. If a Manifest ( ) section with the corresponding dst_file_name field being blank is downloaded and overwrites, the corresponding file cannot be referenced from the application program running on the reproducing apparatus 1 (i.e., the application program executed on the reproducing apparatus 1 or the user cannot recognize the presence of that file). In other words, even if the actual file is stored on the optical disk 11, that file is recognized as being nonexistent in the virtual file system by blanking the dst_file_name field. The file is thus hidden from the application program executed on the reproducing apparatus 1 or from the user.

The Manifest ( ) section, having the path name of the data of the optical disk 1 specified in the src_file_name field and the predetermined path name in the virtual file system written in the dst_file_name field, may be downloaded. A predetermined file recorded beforehand on the optical disk 11 can thus be referenced. The Manifest ( ) section, having the path name of the data of the optical disk 1 specified in the src_file_name field and the dst_file_name field being blank, may be downloaded. In this case, the predetermined file that was referenceable is set to be unreferenceable.

A plurality of bonus tracks are recorded beforehand onto the optical disk. The Manifest ( ) section having the src_file_name field and the dst_file_name field is downloaded for overwriting in a predetermined timing so that the application recognizes one bonus track at one timing after another bonus track at another timing. Without the need for frequently downloading a vast amount of data, the user can enjoy the service in which bonus tracks different in timing are added or deleted.

Figure 44:
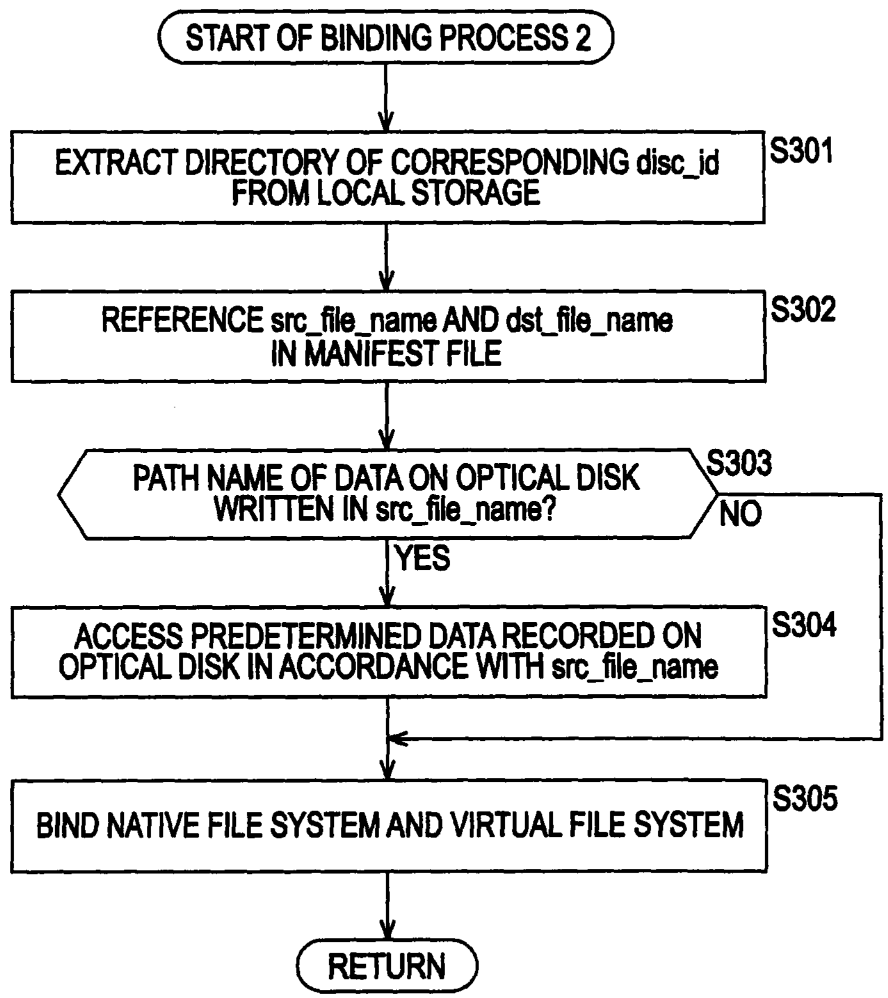
FIG. 44 is a flowchart illustrating a binding process 2.

A binding process 2 is described below with reference to FIG. 44. The binding process 2 is executed when the path name of the data on the optical disk 11 can be specified in the src_file_name field of the Manifest ( ) section.

In step S301, the local storage directory manager 34 extracts a directory of the corresponding disc_id from a downloaded data group stored on the local storage 24, and supplies the file system merge processor 36 with the directory.

In step S302, the file system merge processor 36 references the src_file_name field and the dst_file_name field of the Manifest file.

In step S303, the file system merge processor 36 determines whether the path name of the data on the optical disk 11 is written on the src_file_name field of the Manifest file.

If it is determined in step S303 that the path name of the data on the optical disk 11 is written in the src_file_name field of the Manifest file, the file system merge processor 36 supplies in step S304 the optical disk directory manager 35 with the path name of the data on the optical disk 11 written in the src_file_name field. The optical disk directory manager 35 accesses predetermined information recorded on the optical disk 11 based on the information of the src_file_name field.

If it is determined in step S303 that the path name of the data on the optical disk 11 is not written in the src_file_name field of the Manifest file, or subsequent to step S304, the file system merge processor 36 binds a native file system and the virtual file system in step S305 based on the src_file_name field and the dst_file_name field referenced in step S302.

If the path name of the data recorded on the optical disk 11 is not written in the src_file_name field of the Manifest file, the binding process is performed in the same manner as the binding process 1 discussed with reference to FIG. 32. If the path name of the data recorded on the optical disk 11 is written in the src_file_name field of the Manifest file, the file system merge processor 36 performs the binding process so that the file recorded in the path indicated by the src_file_name field of the optical disk 11 is handled as a file having the path and the file name written on the dst_file_name field.

If nothing is written in the dst_file_name field, the file recorded on the path indicated by the src_file_name field of the optical disk 11 is not bound to the virtual file system.

A content author records an actual file of a content on a optical disk 11 to be supplied to a user, and inhibits accessing to the content during the reproduction of the optical disk 11 alone (hides the content from the application and the user). The content author then specifies the path name in the optical disk 11 in the src_file_name field and the path name of the virtual file system in the virtual disk in the dst_file_name field of the Manifest ( ) section of a downloaded package. The content author can thus freely set the path name in the virtual file system of the actual file of the content recorded on the optical disk 11 loaded on the reproducing apparatus 301, by the description in the Manifest ( ) section of the downloaded package. Although the file is present on the optical disk 11, the content author may or may not permit the user to access the file.

As previously discussed, the update file is not only downloaded from the server 3 but also distributed in the recorded state thereof on the removable medium 28. In such a case, the controller 21 reads the update file from the removable medium 28 via the drive 27, and writes the update file onto the local storage 24. Even if the reproducing apparatus 1 cannot be connected to the server 3 (for example, when the reproducing apparatus 1 has no interfacing function with the server 3, or when the reproducing apparatus 1 and the server 3 are in an environment where no link is provided), data updating is possible.

In this case as well, the content reproduction is performed in the same way as when the update file is downloaded from the server 3. The update file is recorded in a predetermined file format on the local storage 24, and the binding process is performed with the data recorded on the optical disk 11. A virtual file system is constructed, and an updated content is reproduced.

Figure 45:
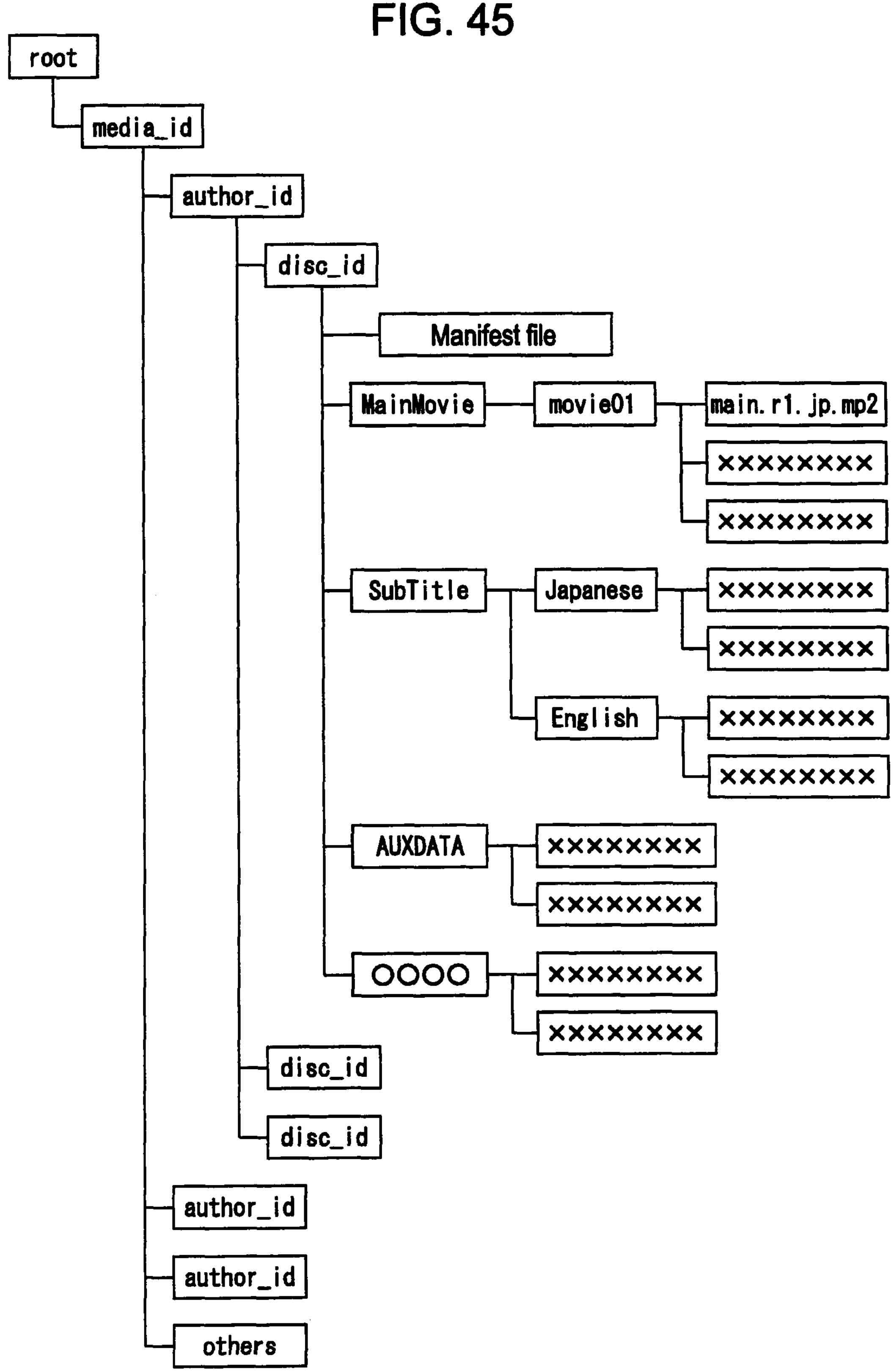
FIG. 45 illustrates a file structure of an update file to be recorded on a removable medium.

In the data structure of the update file recorded on the removable medium 28, a media_id identifier individually identifying the removable medium 28 is stored immediately under the root directory as shown in FIG. 45. Data having the same configuration as the data downloaded from the server 3 discussed with reference to FIG. 14 and identified by the author_id and disc_id identifiers is written for the media_id identifier. The syntax of the manifest file and other files under the disc_id identifier is the same as the data downloaded from the server 3. The update file recorded on the removable medium 28 includes "others" directory, in which a predetermined application program and a variety of data units are stored.

An application program executing a write process for writing the update file recorded on the removable medium 28 onto the local storage 24 is available as an application program recorded on the "others" directory. Data required to execute the write process for writing the update file recorded on the removable medium 28 onto the local storage 24 is preferably recorded in the "others" directory.

The write process for writing the update file recorded on the removable medium 28 onto the local storage 24 may be executed only when the optical disk 11 is loaded on the optical disk 11 or even when the optical disk 11 is not loaded on the optical disk 11.

The controller 21 under the control of the navigation program recorded on the optical disk 11 may perform the write process for writing the update file recorded on the removable medium 28 onto the local storage 24. The controller 21 may perform the write process only when the optical disk 11 is loaded onto the reproducing apparatus 1. Alternatively, the controller 21 may perform the write process for writing the update file recorded on the removable medium 28 onto the local storage 24 even when the optical disk 11 is not loaded on the reproducing apparatus 1. In this case, the controller 21 performs the write process under the control of a control program prepared in the reproducing apparatus 1 or under the control of an application program in the same format as the navigation program recorded on the removable medium 28 (recorded in the "others" directory of FIG. 45).

When the update file is downloaded from the server 3, the optical disk 11 is loaded on the reproducing apparatus 1, information indicating the current status of the virtual file system is transmitted to the server 3, and data required for updating is then downloaded. However, if the removable medium 28 is used to provide the update file, supplied update data cannot be modified depending on the current status of the virtual file system.

Figure 46A:
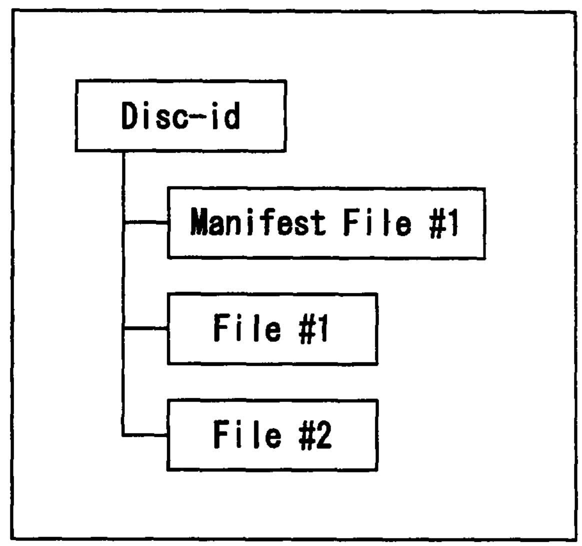
FIG. 46A illustrates a malfunction that could occur in an updating operation using a removable medium.
Figure 46B:
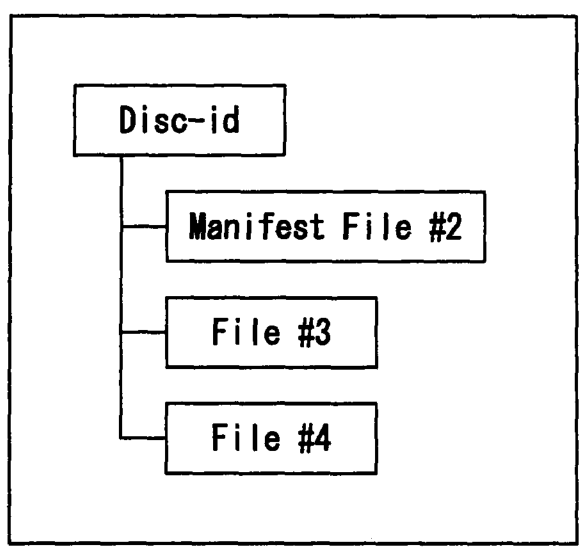
FIG. 46B illustrates a malfunction that could occur in an updating operation using a removable medium.

As shown in FIG. 46A, the local storage 24 already stores a manifest file, and a file #1 and a file #2, each associated with the manifest file. If an update file recorded on the removable medium 28 containing a file #3 and a file #4 as shown in FIG. 46B is recorded on the local storage 24, the manifest file overwrites the manifest file on the local storage 24. The manifest file cannot reference the file #1 and the file #2 previously updated.

To allow the previously updated files to be referenced, information indicating a combination of a current manifest file and a manifest file that can overwrite the current manifest file may be recorded on one of the optical disk 11 and the removable medium 28.

As shown in FIG. 47, for example, a manifest file #1 is associated with a Japanese caption, a manifest file #2 is associated with an English caption, a manifest file #3 is associated with a French caption, a manifest file #4 is associated with a Japanese and English caption, a manifest file #5 is associated with a Japanese and French caption, a manifest file #6 is associated with an English and French caption, a manifest file #7 is associated with a Japanese, English, and German caption, and a manifest file #8 is associated with a Japanese, English, French, and German caption. The other manifest files also have respective file numbers indicating associated caption languages thereof.

If the manifest file #1 and a corresponding file of the Japanese caption are recorded on the local storage 24 in the reproducing apparatus 1, data updating is performed using the removable medium 28 recording the manifest file #4, the manifest file #5, the manifest file #7, and the manifest file #8, and their respective caption stream files. The user can still continuously select the Japanese caption even after data updating. When the data updating is performed using the removable medium 28 storing another manifest file and a caption stream file corresponding thereto, the user cannot select the Japanese caption after the updating using the removable medium 28. This is because a re-written file is not associated with the Japanese caption.

A mapping table of the manifest files of FIG. 48 is recorded on one of the optical disk 11 and the removable medium 28. When updating the data using the removable medium 28, the reproducing apparatus 1 re-writes the manifest files with reference to the mapping table to control a malfunction, or notifies the user of the mapping table.

More specifically, the manifest file #1 associated with the Japanese caption is recorded on the local storage 24, and the manifest file #2 associated with the English caption is prepared as an update file using the removable medium 28. If the manifest file #2 overwrites the manifest file #1, the Japanese caption can be used no longer. The reproducing apparatus 1 may display to the user a message such as the one: "The English caption only becomes available if updating is executed. Do you update?" Instead of the manifest file #2 overwriting the manifest file #1, a manifest file that permits mapping to the Japanese caption and the English caption, such as the manifest file #4, may be created and then overwrite the manifest file #1.

If the creation of the manifest file cannot control a malfunction that could occur as a result of the manifest file rewriting, information regarding the manifest file prior to rewriting (for example, information by which the server 3 can identify the manifest files, such as manifest_id identifier, or code information generated based on the manifest_id identifier, or other information) may be provided to the user. The user then notifies the server 3 information indicating the manifest file prior to rewriting, using an information processing apparatus such as the reproducing apparatus 1 connectable with the server 3, a personal computer connectable with the server 3, a PDA, or a cellular phone. The server 3 then downloads the pre-rewritten manifest file. In this way, the reproducing apparatus 1 can be restored back to a pre-rewriting state.

A file-updating process 1 using the removable medium 28 is described below with reference to a flowchart of FIG. 49. The file-updating process 1 using the removable medium 28 is executable only if the write process for writing the update file recorded on the removable medium 28 onto the local storage 24 is set to be performed with the optical disk 11 loaded on the reproducing apparatus 1.

In step S410, the optical disk 11 is loaded onto the reproducing apparatus 1, and the navigation program recorded on the optical disk 11 is read by the optical disk drive 22. The read navigation program is expanded onto the memory 23, and the controller 21 starts the navigation program.

In step S411, the operation input acquisition unit 32 in the controller 21 determines, based on a user operation input, whether a command to add a file using the removable medium 28 has been issued. If it is determined in step S411 that the command to add the file using the removable medium 28 has not been issued, step S411 is repeated until it is determined that the command to add the file using the removable medium 28 has been issued.

If it is determined in step S411 that the command to add the file using the removable medium 28 has been issued, the menu screen display controller 31 in the controller 21 outputs a message prompting the user to load the removable medium 28 in step S412.

In step S413, the data acquisition unit 33 determines whether the removable medium 28 has been loaded on the drive 27. If it is determined in step S413 that the removable medium 28 has not been loaded, step S413 is repeated until it is determined that the removable medium 28 has been loaded.

If it is determined in step S413 that the removable medium 28 has been loaded, the data acquisition unit 33 reads in step S414 a predetermined portion of the data recorded on the loaded removable medium 28 (such as a header or TOC where data used for the reproducing apparatus 1 to determine a data structure and a data format is recorded), and determines whether the removable medium 28 is replayable on the reproducing apparatus 1.

If it is determined in step S414 that the removable medium 28 cannot be replayed on the reproducing apparatus 1, processing proceeds to step S425.

If it is determined in step S414 that the removable medium 28 can be replayed on the reproducing apparatus 1, the data acquisition unit 33 determines in step S415 whether an application program executable on the reproducing apparatus 1 is recorded on the loaded removable medium 28. If it is determined in step S415 that the application program executable on the reproducing apparatus 1 is not recorded on the removable medium 28, processing proceeds to step S418.

If it is determined in step S415 that the application program executable on the reproducing apparatus 1 is recorded on the removable medium 28, the controller 21 expands in step S416 the application program recorded on the removable medium 28 onto the memory 23. The controller 21 determines whether the application program recorded on the removable medium 28 is an application program for performing the data addition process. If it is determined in step S416 that the application program recorded on the removable medium 28 is an application program for performing the data addition process, processing proceeds to step S421.

If it is determined in step S416 that the application program recorded on the removable medium 28 is not the application program for performing the data addition process, the controller 21 executes in step S417 the application program recorded on the removable medium 28. Subsequent to the end of the execution of the application program, the reproducing apparatus 1 returns back to the state in which the controller 21 is executing the navigation program recorded on the optical disk 11.

If it is determined in step S415 that the application program executable on the reproducing apparatus 1 is not recorded on the removable medium 28, or subsequent to step S417, the data acquisition unit 33 in the controller 21 determines in step S418 whether additional data discussed with reference to FIG. 45 is recorded on the loaded removable medium 28. If it is determined in step S418 that the removable medium 28 does not store the additional data, processing proceeds to step S425.

If it is determined in step S418 that the additional data is recorded on the loaded removable medium 28, the data acquisition unit 33 reads the additional data from the loaded removable medium 28 in step S419.

Figure 50:
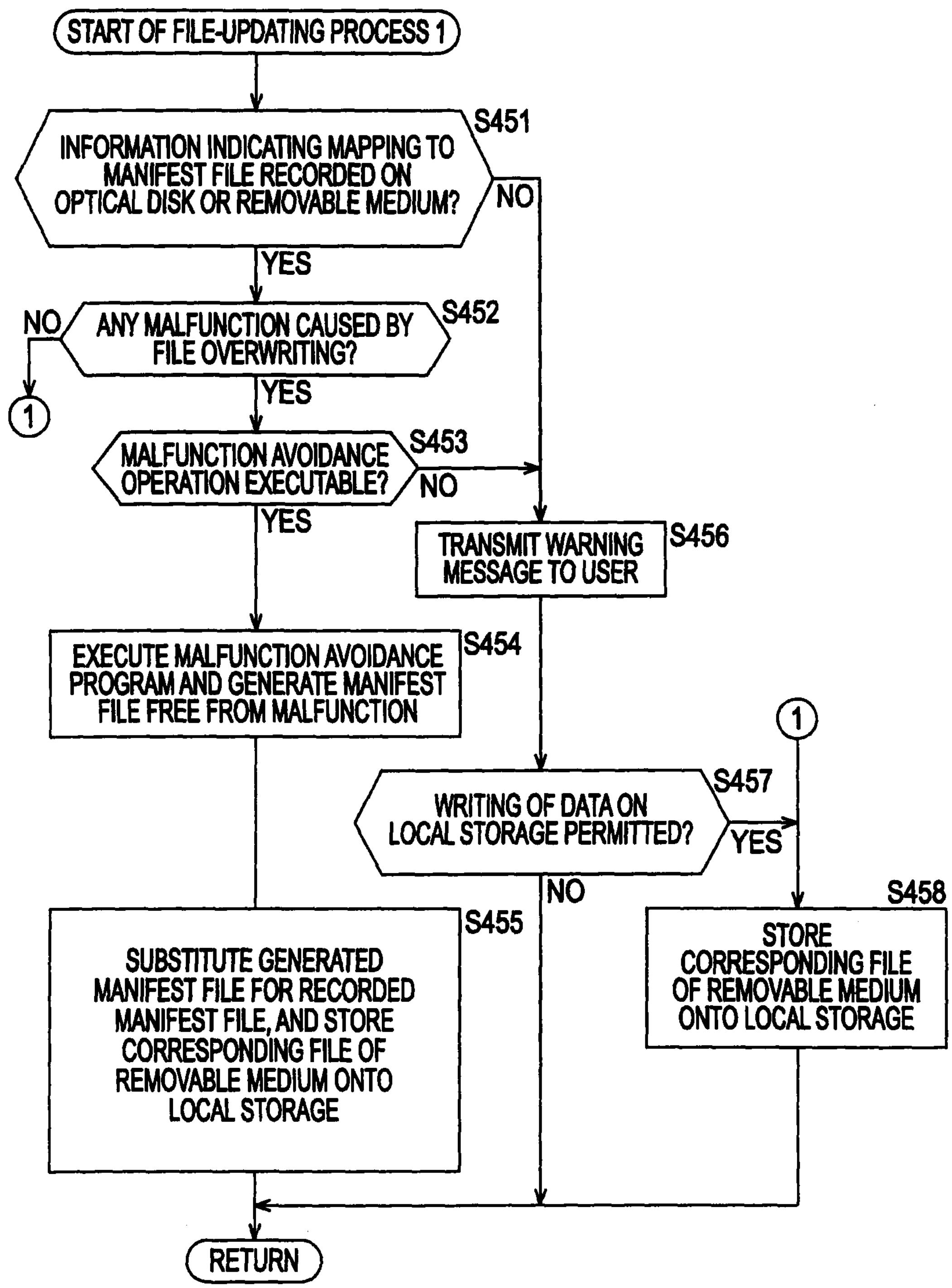
FIG. 50 is a flowchart illustrating a file-updating process 1.

The file-updating process 1 to be discussed later with reference to FIG. 50 is performed in step S420. Processing proceeds to step S424.

If it is determined in step S416 that the application program recorded on the removable medium 28 is an application program for executing the data addition process, the controller 21 executing the application program recorded on the removable medium 28 determines in step S421 whether the loaded removable medium 28 stores the additional data described with reference to FIG. 45. If it is determined in step S421 that the additional data is not recorded on the removable medium 28, processing proceeds to step S425.

If it is determined in step S421 that the additional data is stored on the loaded removable medium 28, the controller 21 executing the application program recorded on the removable medium 28 reads in step S422 the additional data from the loaded removable medium 28.

In step S423, the file-updating process 1 to be discussed later with reference to FIG. 50 is performed. Subsequent to step S423, namely, subsequent to the end of the application program recorded on the removable medium 28, the controller 21 returns to the state thereof in which the navigation program recorded on the optical disk 11 is being executed.

Subsequent to step S420 or step S423, the binding process described with reference to FIG. 32 is performed in step S424. Processing proceeds to step S426.

If it is determined in step S414 that the loaded removable medium 28 is not replayable on the reproducing apparatus 1, if it is determined in step S418 that the loaded removable medium 28 does not store the additional data, or if it is determined in step S421 that the loaded removable medium 28 does not store the additional data, the menu screen display controller 31 in the controller 21 may output in step S425 an error message such as the one: "Data addition is disabled. Check the removable medium."

Subsequent to step S424 or S425, the operation input acquisition unit 32 determines in step S426 whether a command to end the navigation program has been issued. If it is determined in step S426 that the command to end the navigation program has not been issued, processing returns to step S411 to repeat step S411 and subsequent steps. If it is determined in step S426 that that the command to end the navigation program has been issued, processing ends.

In accordance with the navigation program recorded on the optical disk 11 or the navigation program recorded on the removable medium 28, the update file is read from the removable medium 28 and written onto the local storage 24.

Figure 49:
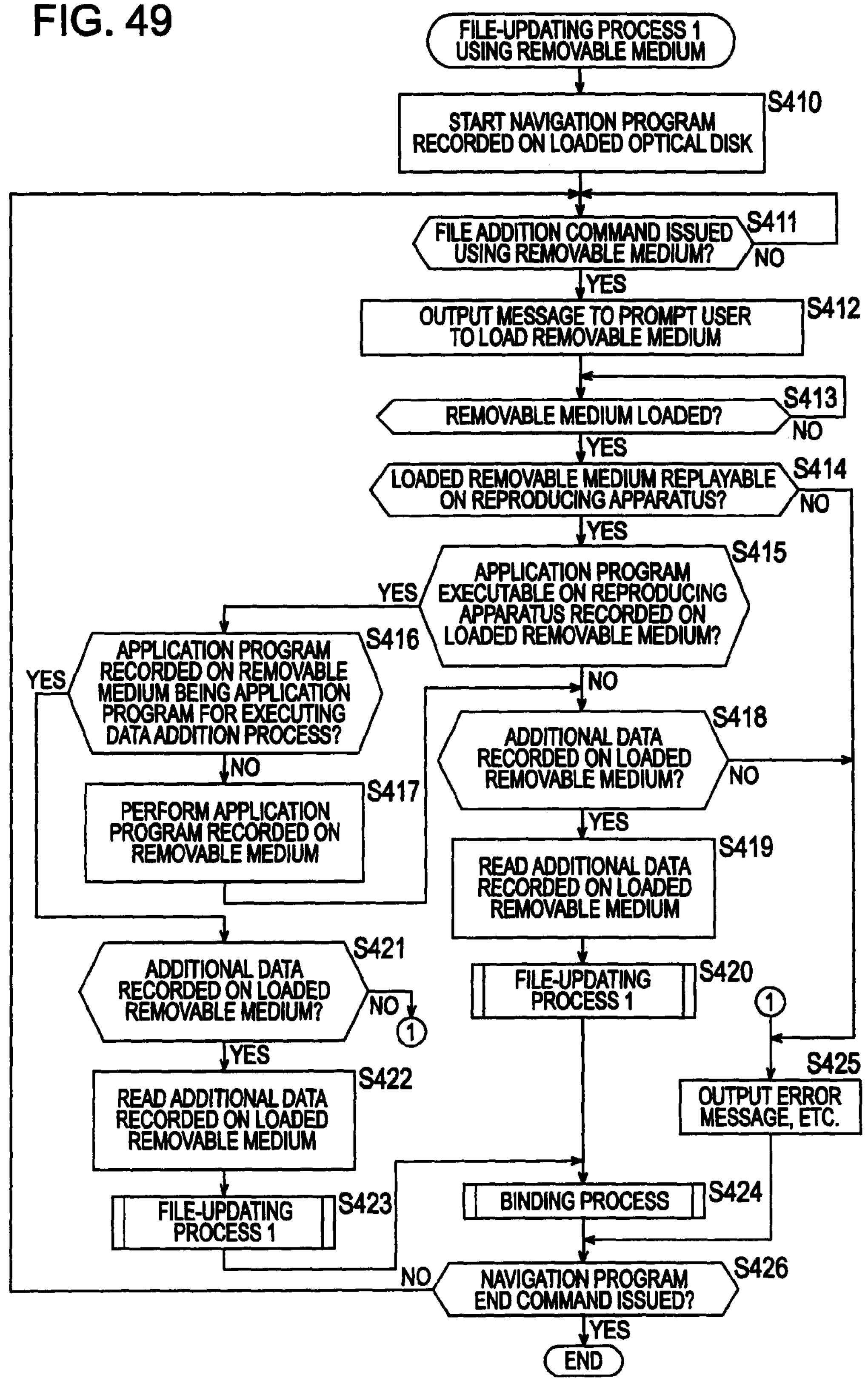
FIG. 49 is a flowchart illustrating a file-updating process 1 using a removable medium.

The file-updating process 1 executed in each of step S420 and step S423 of FIG. 49 is described below with reference to a flowchart of FIG. 50.

The controller 21 under the control of the application program recorded on the removable medium 28 performs the file-updating process 1 in step S423 of FIG. 49 while performing the data addition process. If the application program recorded on the removable medium 28 is the one performing the data application process, the controller 21 has the same function as described with reference to FIG. 6. The file-updating process 1 is thus described below with reference to the flowchart of FIG. 50 in view of the block diagram of FIG. 6.

In step S451, the local storage directory manager 34 determines whether information indication mapping of the manifest files, such as the one described with reference to FIG. 48 is stored on one of the optical disk 11 managed by the optical disk directory manager 35 and the removable medium 28 able to read data from the data acquisition unit 33. If it is determined in step S451 that the information indication the mapping of the manifest files is not stored, processing proceeds to step S456.

If it is determined in step S451 that the information indicating the mapping of the manifest files is stored, the local storage directory manager 34 determines, based on the information indicating the mapping of the manifest files, in step S452 whether any malfunction can occur. For example, in one malfunction, the overwriting of the update file recorded on the removable medium 28 causes a previously update file to become useless as previously discussed with reference to FIG. 46. If it is determined in step S452 that no malfunction can take place, processing proceeds to step S458.

If it is determined in step S452 that any malfunction can occur, the local storage directory manager 34 determines in step S453 whether a malfunction avoidance process for generating a manifest file free from malfunction is executable. This determination of the local storage directory manager 34 is performed based on the manifest file recorded on the current local storage 24, the information indicating the mapping of the manifest files discussed with reference to FIG. 48, and the manifest file of the update file recorded on the removable medium 28. If it is determined in step S453 that the malfunction avoidance process is not executable, processing proceeds to step S456.

If it is determined in step S453 that the malfunction avoidance process is executable, the local storage directory manager 34 executes in step S454 the malfunction avoidance process, thereby producing the manifest file free from malfunction.

For example, the manifest file #7 for using Japanese, English, and German captions, and respective caption data may be currently recorded on the local storage 24 while the manifest file #3 for French and the French caption data may be recorded on the removable medium 28. If the user causes the update file recorded on the removable medium 28 to overwrite the file on the local storage 24 in an attempt to add the French caption, the Japanese, English, and German captions that were available for use can no longer be used. The manifest file #3 is not associated with Japanese, English, and German caption data. To avoid such a malfunction, the local storage directory manager 34 executes the malfunction avoidance process, thereby producing a manifest file #8 that is associated with the Japanese, English, and German caption data. The generated manifest file #8 is recorded together with the French caption data onto the local storage 24.

In step S455, the local storage directory manager 34 substitutes the generated manifest file for the manifest file recorded on the removable medium 28. The corresponding file on the removable medium 28 is stored on the local storage 24. Processing returns to step S420 of FIG. 49 to proceed to step S424 or returns to step S423 of FIG. 49 to proceed to step S424.

If it is determined in step S451 that the information indicating the mapping of the manifest files is not stored, or if it is determined in step S453 that the malfunction avoidance process cannot be performed, the menu screen display controller 31 issues in step S456 to the user a warning message such as the one: "The English caption only becomes available if updating is executed. Do you update?". Furthermore, the menu screen display controller 31 displays to the user information regarding the manifest file prior to rewriting (for example, information by which the server 3 can identify the manifest files, such as manifest_id identifier, or code information generated based on the manifest_id identifier, or other information). The user then notifies the server 3 of information indicating the manifest file prior to rewriting, using an information processing apparatus such as the reproducing apparatus 1 connectable with the server 3, a personal computer connectable with the server 3, a PDA, or a cellular phone. The server 3 then downloads the pre-rewritten manifest file. In this way, the reproducing apparatus 1 can be restored back to at least a pre-rewriting state.

In step S457, the operation input acquisition unit 32 determines, based on a user operation input recognizing the warning message, whether the data writing onto the local storage 24 is permitted. If it is determined in step S457 that the data writing onto the local storage 24 is not permitted, processing returns to step S420 of FIG. 49 to proceed to step S424 or to step S423 of FIG. 49 to proceed to step S424.

If it is determined in step S452 that no malfunction may be caused, or if it is determined in step S457 that the data writing onto the local storage 24 is permitted, the local storage directory manager 34 stores in step S458 a file corresponding to the removable medium 28 onto the local storage 24. Processing returns to step S420 of FIG. 49 to proceed to step S424 or to step S423 of FIG. 49 to proceed to step S424.

Through the above-described process steps, the malfunction avoidance process is performed. A manifest file is generated so that no inconsistency takes place between an already updated file and a manifest file. The generated manifest file is recorded on the local storage 24 together with the file recorded on the removable medium 28. Alternatively, the user may be notified of the possibility of a malfunction due to file overwriting. If a malfunction took place as a result of overwriting of the file recorded on the removable medium 28, information available to restore the file recorded on the removable medium 28 to the pre-overwriting state is provided to the user.

A file-updating process 2 using the removable medium 28 is described below with reference to a flowchart of FIG. 51. The file-updating process 2 using the removable medium 28 is performed in the reproducing apparatus 1. Even with the optical disk 11 not loaded on the reproducing apparatus 1, the reproducing apparatus 1 herein is set to perform the write process for writing the update file from the removable medium 28 to the local storage 24.

In step S481, the data acquisition unit 33 determines whether the removable medium 28 is loaded on the drive 27. If it is determined in step S481 that the removable medium 28 is not loaded, step S481 is repeated until it is determined that the removable medium 28 is loaded.

If it is determined in step S481 that the removable medium 28 is loaded, the controller 21 starts the application program for the file updating process in step S482. The application program is the one held by the reproducing apparatus 1 (not the one recorded on one of the optical disk 11 and the removable medium 28).

In step S483, the data acquisition unit 33 reads a predetermined portion of the data recorded on the loaded removable medium 28 (such as a header or TOC where data used for the reproducing apparatus 1 to determine a data structure and a data format is recorded), and then determines whether the removable medium 28 is replayable on the reproducing apparatus 1.

If it is determined in step S483 that the removable medium 28 cannot be replayed on the reproducing apparatus 1, processing proceeds to step S495.

If it is determined in step S483 that the removable medium 28 can be replayed on the reproducing apparatus 1, the data acquisition unit 33 determines in step S484 whether an application program executable on the reproducing apparatus 1 is recorded on the loaded removable medium 28. If it is determined in step S484 that the application program executable on the reproducing apparatus 1 is not recorded on the removable medium 28, processing proceeds to step S489.

If it is determined in step S484 that the application program executable on the reproducing apparatus 1 is recorded on the removable medium 28, the controller 21 executing the application program held by the reproducing apparatus 1 determines in step S485 whether a preparation process for preparing the application program recorded on the removable medium 28 can be performed. If the reproducing apparatus 1 itself is aware of whether the preparation process can be performed or not, this determination step can be skipped.

For example, the application program recorded on the removable medium 28 may be identical to the MovieObject recorded on the optical disk 11 and data corresponding to a index file may not be prepared. To execute a variety of commands of the application program recorded on the removable medium 28, the data corresponding to the index file is required. In such a case, the preparation process for executing the application program recorded on the removable medium 28 means a generation process for generating a corresponding index file. If the optical disk 11 has already been loaded on the reproducing apparatus 1, the index file is already generated and expanded, and the preparation process is not required.

If it is determined in step S485 that the preparation process to execute the application program recorded on the removable medium 28 cannot be performed (or if the apparatus has no function to perform the preparation process), processing proceeds to step S489.

If it is determined in step S485 that the preparation process to execute the application program recorded on the removable medium 28 can be performed, the controller 21 executing the application program held by the optical disk 11 executes in step S486 the preparation process to execute the application program recorded on the removable medium 28.

In step S487, the controller 21 expands the application program recorded on the removable medium 28 onto the memory 23. The controller 21 determines whether the application program recorded on the removable medium 28 is an application program for performing the data addition process. If it is determined in step S487 that the application program recorded on the removable medium 28 is the application program for performing the data addition process, processing proceeds to step S492.

If it is determined in step S487 that the application program recorded on the removable medium 28 is not the application program for performing the data addition process, the controller 21 executes in step S488 the application program recorded on the removable medium 28. Subsequent to the end of the execution of the application program, the reproducing apparatus 1 returns back to the state in which the controller 21 is executing the navigation program held by the reproducing apparatus 1.

If it is determined in step S484 that the application program executable on the reproducing apparatus 1 is not recorded on the removable medium 28, or if it is determined in step S485 that the preparation process to execute the application program recorded on the removable medium 28 cannot be performed, or subsequent to step S488, the data acquisition unit 33 in the controller 21 determines in step S489 whether the additional data discussed with reference to FIG. 45 is recorded on the loaded removable medium 28. If it is determined in step S489 that the removable medium 28 does not store the additional data, processing proceeds to step S495.

If it is determined in step S489 that the additional data is recorded on the loaded removable medium 28, the data acquisition unit 33 reads the additional data from the loaded removable medium 28 in step S490.

Figure 52:
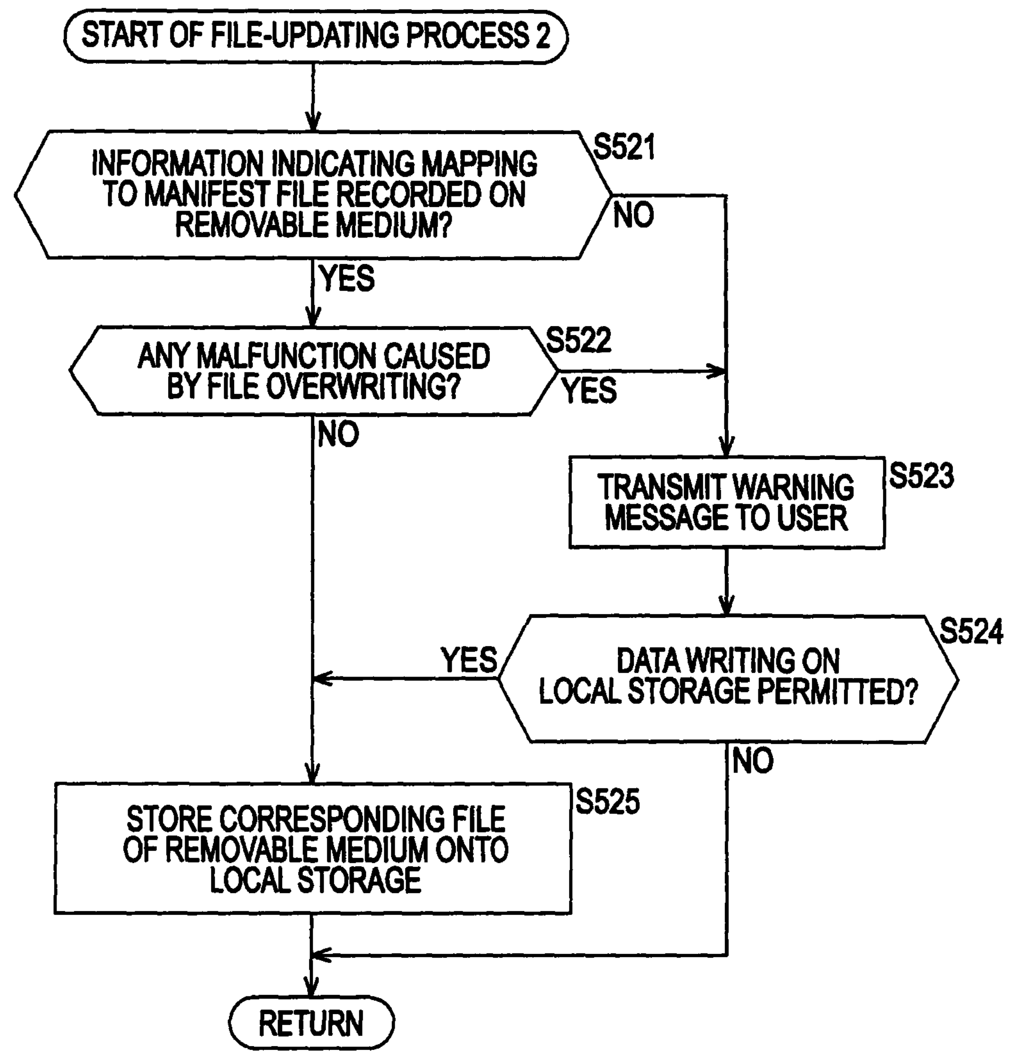
FIG. 52 is a flowchart illustrating the file-updating process 2.

The file-updating process 2 to be discussed later with reference to FIG. 52 is performed in step S491. Processing proceeds to step S496.

If it is determined in step S487 that the application program recorded on the removable medium 28 is the application program for executing the data addition process, the controller 21 executing the application program recorded on the removable medium 28 determines in step S492 whether the loaded removable medium 28 stores the additional data described with reference to FIG. 45. If it is determined in step S492 that the additional data is not recorded on the removable medium 28, processing proceeds to step S495.

If it is determined in step S492 that the additional data is stored on the loaded removable medium 28, the controller 21 executing the application program recorded on the removable medium 28 reads in step S493 the additional data from the loaded removable medium 28.

In step S494, the file-updating process 2 to be discussed later with reference to FIG. 52 is performed. Subsequent to step S494, namely, subsequent to the end of the application program recorded on the removable medium 28, the controller 21 returns to the state thereof in which the navigation program recorded on the optical disk 11 is being executed.

If it is determined in step S483 that the loaded removable medium 28 is not replayable on the reproducing apparatus 1, if it is determined in step S489 that the loaded removable medium 28 does not store the additional data, or if it is determined in step S492 that the loaded removable medium 28 does not store the additional data, the menu screen display controller 31 in the controller 21 may output in step S495 an error message such as the one: "Data addition is disabled. Check the removable medium."

Subsequent to step S491, S494 or S495, the operation input acquisition unit 32 determines in step S496 whether a command to end the application program has been issued. If it is determined in step S496 that the command to end the application program has not been issued, processing returns to step S483 to repeat step S483 and subsequent steps. If it is determined in step S496 that that the command to end the application program has been issued, processing ends.

In accordance with the application program recorded on the optical disk 11 or the application program recorded on the removable medium 28, the update file is read from the removable medium 28 and written onto the local storage 24.

The file-updating process 2 using the removable medium 28 does not require that the optical disk 11 be loaded on the reproducing apparatus 1. The binding process discussed with reference to FIG. 32 is executed subsequent to this process when the optical disk 11 is loaded onto the reproducing apparatus 1 later.

Figure 51:
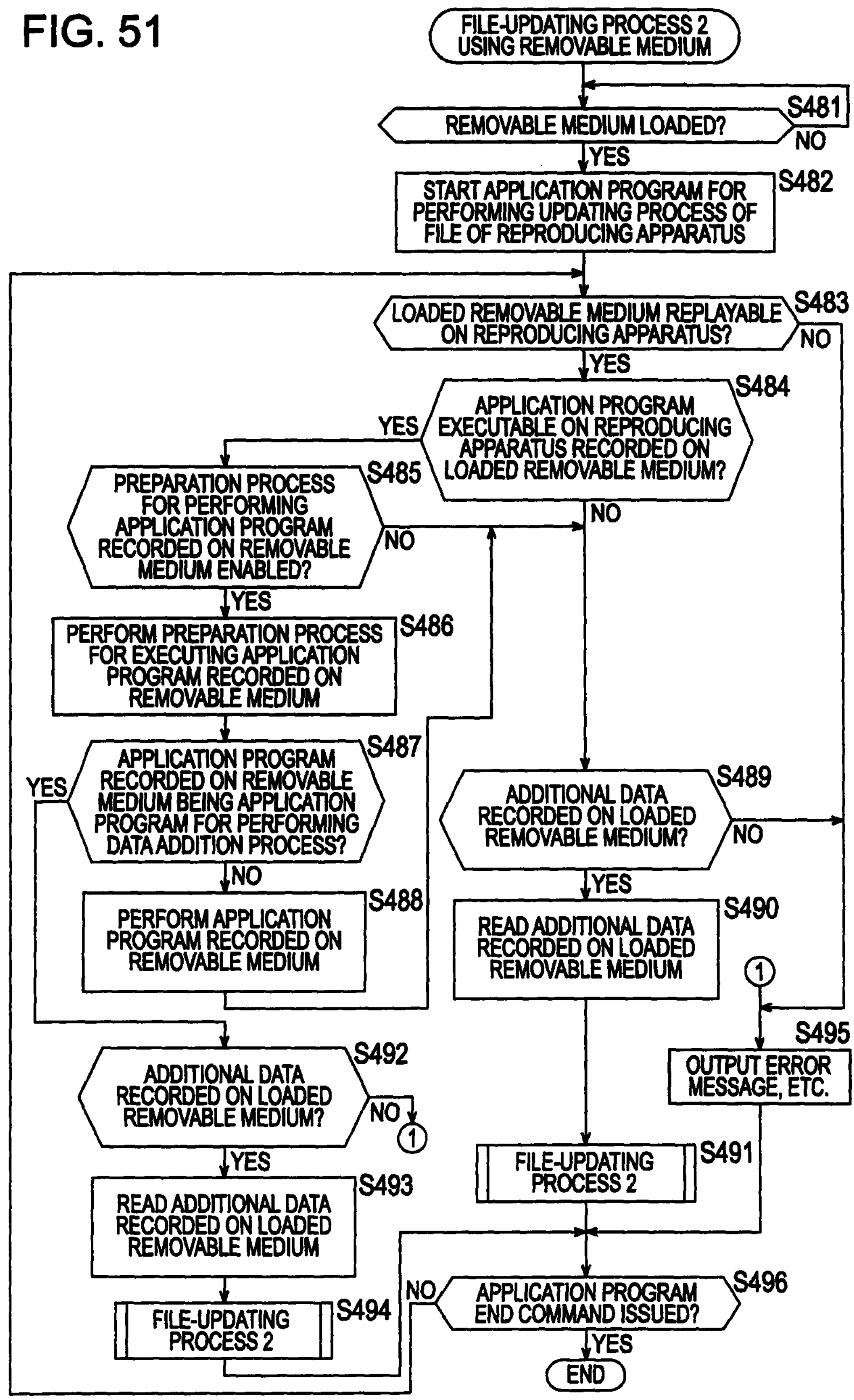
FIG. 51 is a flowchart illustrating a file-updating process 2 using a removable medium.

The file-updating process 2 executed in one of step S491 and S494 of FIG. 51 is described below with reference to the flowchart of FIG. 52.

The controller 21 under the control of the application program pre-stored in the reproducing apparatus 1 performs the file-updating process 2 in step S491 of FIG. 51 while also performing the data addition process. The controller 21, performing the data addition process under the control of the application program pre-stored in the reproducing apparatus 1, has basically the same functional structure as the one described with reference to FIG. 6. The controller 21 under the control of the application program removable medium 28 performs the file-updating process 2 executed in step S494 of FIG. 51 while also performing the data addition process. The controller 21, performing the data addition process under the control of the application program recorded on the removable medium 28, has basically the same functional structure as the one described with reference to FIG. 6. In the discussion of the flowchart of FIG. 52, the functional block diagram of FIG. 6 is also referred to.

In step S521, the local storage directory manager 34 determines whether information indicating mapping of the manifest files, such as the one described with reference to FIG. 48 is stored on the removable medium 28 able to read data from the data acquisition unit 33. If it is determined in step S521 that the information indicating the mapping of the manifest files is not stored, processing proceeds to step S523.

If it is determined in step S521 that the information indicating the mapping of the manifest files is stored, the local storage directory manager 34 determines, based on the information indicating the mapping of the manifest files, in step S522 whether any malfunction can take place. For example, in one malfunction, the overwriting of the update file recorded on the removable medium 28 causes a previously update file to become useless as previously discussed with reference to FIG. 46. If it is determined in step S522 that no malfunction can take place, processing proceeds to step S525.

If it is determined in step S521 that the information indicating the mapping of the manifest files is not stored, or if it is determined in step S522 that the malfunction can take place, a warming message is displayed to the user in step S523. The warming message may be: "The English caption only becomes available if updating is executed. Do you update?". Furthermore, the menu screen display controller 31 displays to the user information regarding the manifest file prior to rewriting (for example, information by which the server 3 can identify the manifest files, such as manifest_id identifier, or code information generated based on the manifest_id identifier, or other information). The user then notifies the server 3 of information indicating the manifest file prior to rewriting, using an information processing apparatus such as the reproducing apparatus 1 connectable with the server 3, a personal computer connectable with the server 3, a PDA, or a cellular phone. The server 3 then downloads the pre-rewritten manifest file. In this way, the reproducing apparatus 1 can be restored back to a pre-rewriting state.

In step S524, the operation input acquisition unit 32 determines, based on a user operation input recognizing the warning message, whether the data writing onto the local storage 24 is permitted. If it is determined in step S524 that the data writing onto the local storage 24 is not permitted, processing returns to step S491 of FIG. 51 to proceed to step S496 or to step S494 of FIG. 51 to proceed to step S496.

If it is determined in step S522 that any malfunction cannot take place, or if it is determined in step S524 that the data writing to the local storage 24 is permitted, the local storage directory manager 34 stores the corresponding file of the removable medium 28 onto the local storage 24 in step S525. Processing returns to step S491 of FIG. 51 to proceed to step S496 or to step S494 of FIG. 51 to proceed to step S496.

Through the above-described process steps, the user is notified of the possibility of a malfunction due to the file overwriting. In the event of a malfunction as a result of overwriting of the file recorded on the removable medium 28, information available to restore the file recorded on the removable medium 28 to the pre-overwriting state is provided to the user.

Figure 53:
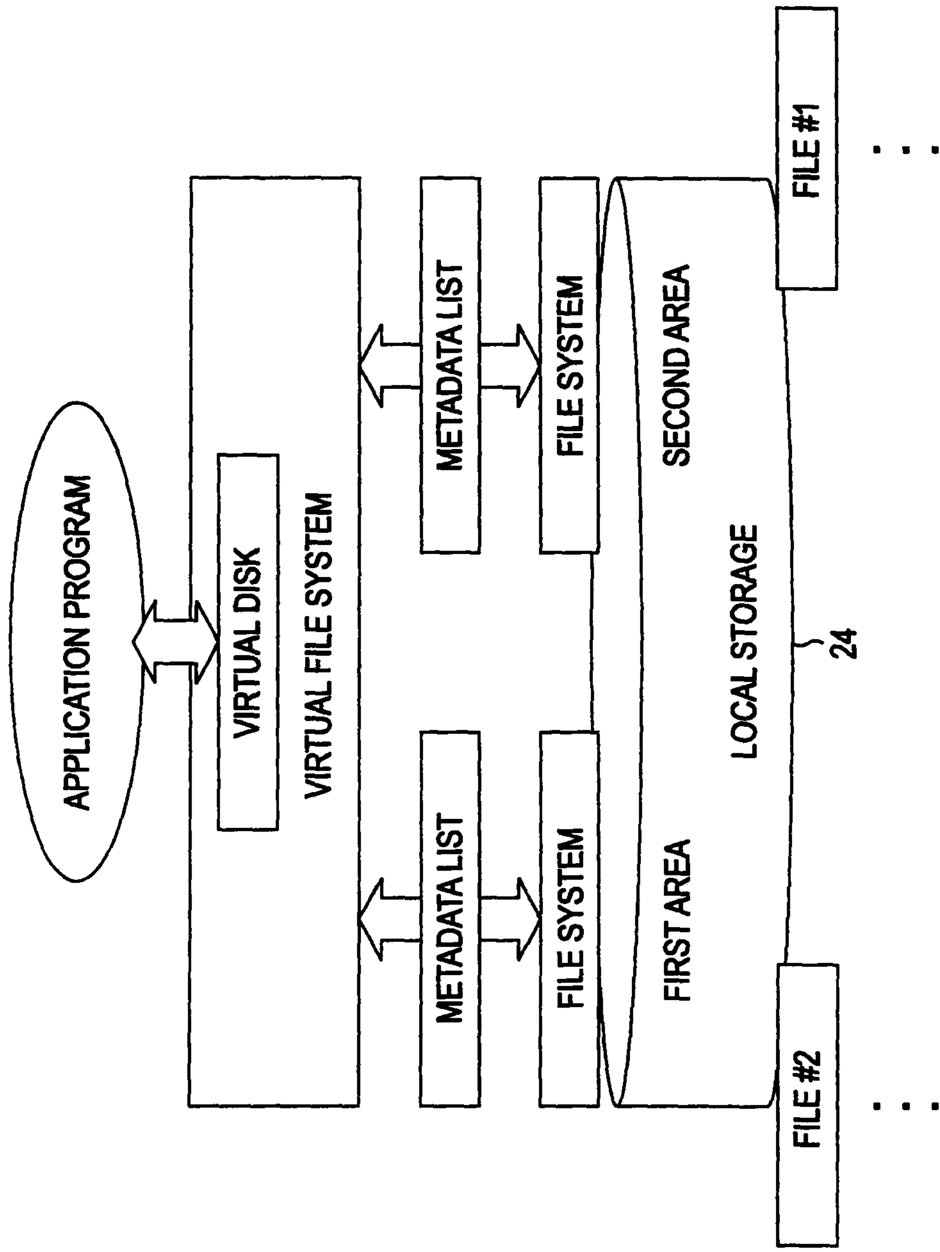
FIG. 53 illustrates the binding between file systems of data files recorded on a first area and a second area on a local storage.

The write process of writing the update file recorded on the removable medium 28 to the local storage 24 has been described with reference to FIGS. 45 through 52. The removable medium 28 may record the data having the same data structure as the optical disk 11 described with reference to FIG. 13. As shown in FIG. 53, the reproducing apparatus 1 may store, onto a first area of the local storage 24, the file recorded on the removable medium 28, and onto a second area different from the first area, data having the structure described with reference to FIG. 14 and downloaded from the server 3 or data having the data structure described with reference to FIG. 45 and recorded on the removable medium 28. In a process similar to the binding process to bind the file systems of the data files recorded on each of the optical disk 11 and the local storage 24, the file system of the data file recorded on the first area of the local storage 24 is bound to the file system of the data file recorded on the second area of the local storage 24.

The data acquisition unit 33 reads, from the removable medium 28, the data having the same file structure as the optical disk 11 described with reference to FIG. 13, and supplies the read data to the local storage directory manager 34. The local storage directory manager 34 stores, onto the first area of the local storage 24, the data having the same data structure as the optical disk 11. The data acquisition unit 33 reads, the data downloaded from the 3 and having the data structure described with reference to FIG. 14, or the data recorded on the removable medium 28 and having the data structure described with reference to FIG. 45, and supplies the read data to the local storage directory manager 34. The local storage directory manager 34 stores, onto the second area of the local storage 24, the data downloaded from the 3 and having the data structure described with reference to FIG. 14, or the data recorded on the removable medium 28 and having the data structure described with reference to FIG. 45. The file system merge processor 36 binds the file systems recorded on the first and second areas of the local storage 24, thereby producing a virtual file system. The reproduction controller 37 references the virtual file system, thereby controlling the reproduction process.

The PlayList file manages the reproduction of the acquired caption stream, Clip AV stream, etc. using PlayItem, SubPlayItem, and Subpath. If the PlayList file is downloaded together with the caption stream, Clip AV stream, etc. or acquired together with the caption stream, Clip AV stream, etc. from another recording medium, the reproduction of the acquired steams can be managed using the acquired PlayList file. In this case, if a virtual file system is created using a PlayList file bound in accordance with the designation of the src_file_name field and the dst_file_name field rather than the PlayList file present on the optical disk 11, a newly acquired steam can be managed without the need for using the above-described operation_type.

In the above discussion, the PlayList is edited in accordance with the designation of the operation_type. Alternatively, a MovieObject as a navigation program containing an edit program of PlayList may be newly acquired, the acquired MovieObject may be stored onto the local storage 24 of FIG. 14, and PlayList may be automatically edited in accordance with the edit program during the binding process, or edited by the user. A MovieObject having an application program registered therewithin for editing and storing PlayList and Clip AV stream may be stored beforehand on the optical disk 11. The MovieObject is not necessarily contained in the program. A program stored in another unshown directory may be called.

In the above-described process, the reading of each file forming a stream that is reproduced using the virtual file system is controlled. If a file to be read is not present in the virtual file system, an external acquisition program for acquiring a program separate from the navigation program is initiated, and the file to be read from the outside other than the virtual file system is acquired.

Figure 54:
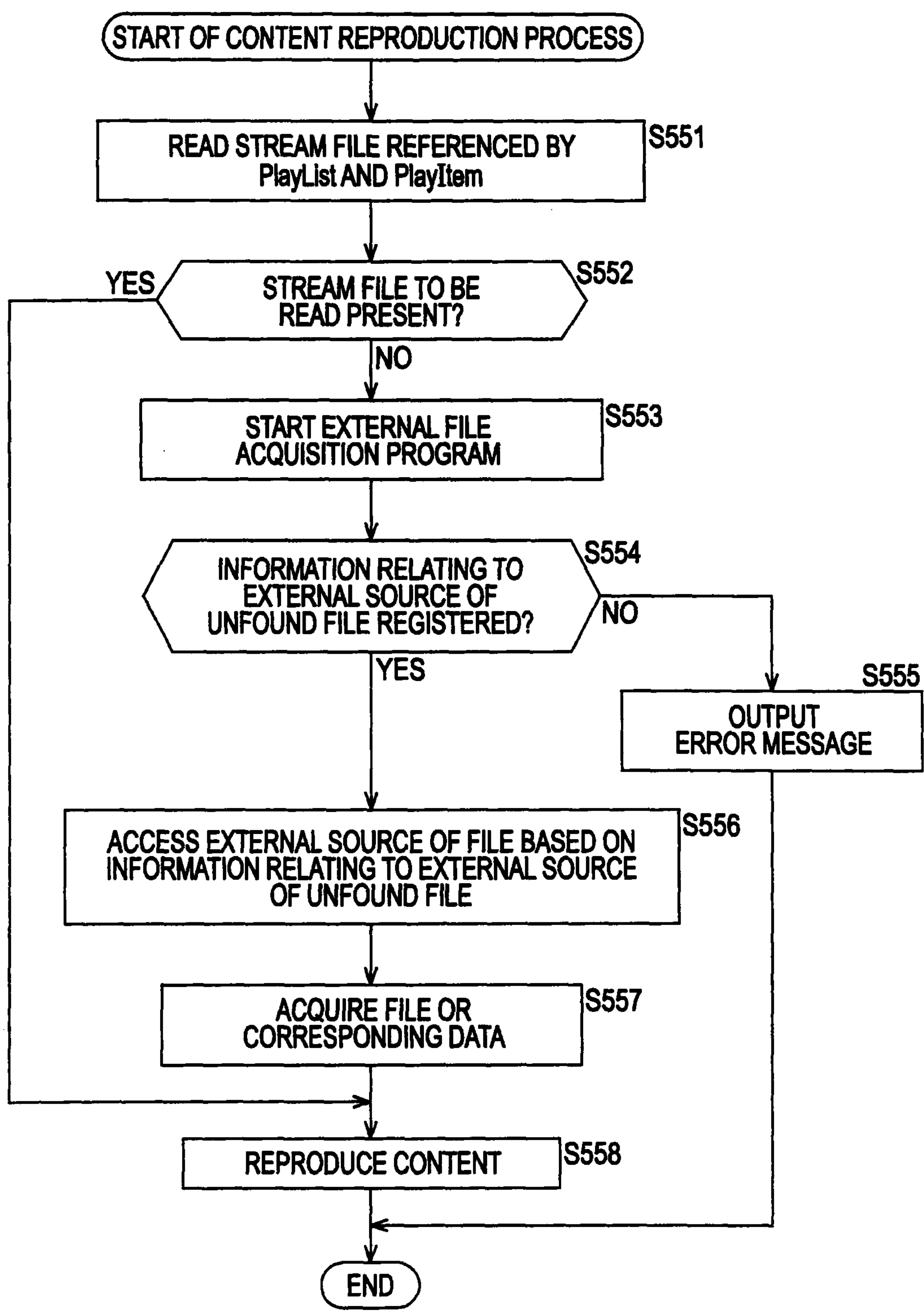
FIG. 54 is a flowchart illustrating a content reproduction process.

A content reproduction process is described below with reference to a flowchart of FIG. 54.

In step S551, the playback controller 37 controls the local storage directory manager 34 and the optical disk directory manager 35, thereby acquiring PlayList and SubPlayItem that the navigation program specifies as a reproduction period, and reading stream files (an AV file, an audio file, a caption text file, etc) referenced by the acquired PlayList and the SubPlayItem.

In step S552, the playback controller 37 determines whether a stream file to be read is present. If it is determined in step S552 that the stream file to be read is present, processing proceeds to step S558.

If it is determined in step S552 that the stream file to be read is not present, the playback controller 37 initiates a file external acquisition program.

The file external acquisition program, independent of the navigation program, is initiated by the navigation program. The navigation program is on standby while the file external acquisition program performs an acquisition process of acquiring a predetermined file. After the file external acquisition program acquires the file, the reproduction process resumes based on PlayList and PlayItem.

The file external acquisition program is stored on the local storage 24 in the reproducing apparatus 1. When a command to start is provided in response to the process of the navigation program, the file external acquisition program is read by the controller 21 from the local storage 24 and expanded onto the memory 23 for execution. Alternatively, the file external acquisition program may be recorded on one of the optical disk 11 and the removable medium 28, and when a command to start the file external acquisition program is provided in response to the process of the navigation program, the file external acquisition program is read by the controller 21 from the one of the optical disk 11 and the removable medium 28, and then expanded onto the memory 23 for execution.

In step S554, the controller 21 executing the file external acquisition program determines whether information about an external source of an unfound file is registered in one of the local storage 24 of the reproducing apparatus 1, the optical disk 11 and the removable medium 28.

The information about the external source of the file may be recorded on a recording area of one of the local storage 24 of the reproducing apparatus 1, the optical disk 11 and the removable medium 28, as information managed by only the file external acquisition program, separate from PlayList and PlayItem and a stream file relating to the content. Source information of the above-described Manifest file stored on the local storage 24 may be used as the information about the external source of the file.

The information about the external source of the file may be registered one of the dst_file_name and the src_file_name associated therewith, or with author_id and disc_id, or may be registered by different unit such as a content.

If the information about the external source of the file may be registered with one of the dst_file_name and the src_file- _name associated therewith, a file and information about a registration destination thereof are associated with each other on a one-to-one correspondence basis, and the reproducing apparatus 1 can easily identify a file to be acquired, and then acquires the file. If information corresponding to a directory containing a plurality of files such as author_id and disc_id and the external acquisition source of the file are registered with one associated with each other, one file does not correspond to the information of registration destination on a one-to-one correspondence basis. In such a case, a file to be acquired by the reproducing apparatus 1 is acquired by supplying to the external acquisition source the information concerning the file to be acquired by the reproducing apparatus 1 or by causing the file system of the external acquisition source to have the same structure as one of the file system of the optical disk 11, the file system of the local storage 24 and the virtual file system.

If it is determined in step S554 that the information about the external source of the unfound file is not registered, the controller 21 executing the file external acquisition program outputs in step S555 an error message to an external display device, and ends the process.

If it is determined in step S554 that the information about the external source of the unfound file is registered, the controller 21 executing the file external acquisition program accesses the file external acquisition source via the Internet interface 25 or the drive 27 with the removable medium 28 loaded thereon based on the information about the file external acquisition source of the unfound file.

The information about the external source of the file may be a URL of the server 3 accessible via the Internet 2, an address of a recording area or a path of a file system of the removable medium 28 loaded on the drive 27, device information of a recording device or another information processing apparatus connected via a predetermined local network, or an address of a recording area or a path of a file system of a recording unit of these apparatuses.

In step S557, the controller 21 executing the file external acquisition program acquires a file or data corresponding to the file from the specified file external acquisition source. The controller 21 executing the file external acquisition program then resumes the process of the navigation program.

The acquisition method of acquiring the file or the corresponding data from the specified file external acquisition source may be a so-called downloading process in which all corresponding files are acquired, stored on the local storage 24 and then reproduced. The acquisition method may also be a so-called streaming reproduction process in which data forming a corresponding file is acquired and then successively reproduced without being stored on the local storage 24.

If it is determined in step S552 that a stream file to be read is present, or subsequent to step S557, the playback controller 37 supplies in step S558 the acquired file or the data corresponding to the data to the decoder 26, and then controls the decoder 26 to reproduce the content. Processing then ends.

As long as the file external acquisition source is registered, the file to be reproduced or the data forming the file can be acquired and reproduced even if the file to be read from PlayList and SubPlayItem is not recorded at a predetermined position.

The file external acquisition program is independent of the navigation program in the above discussion. Alternatively, the file external acquisition program may be included in the navigation program as a subroutine thereof.

In the process discussed with reference to the flowchart of FIG. 54, if the file to be read is not present on the virtual file system, the file external acquisition program independent of the navigation program is initiated, and the file to be read is read from outside the virtual file system. For example, if one of a file to be read, a folder containing the file, and a directory containing the file is not present on the created virtual file system, a program, independent of the navigation program, for acquiring from the outside one of the file, the folder containing the file, and the directory containing the file may be initiated. One of the file read from outside the virtual file system, the folder containing the file, and the directory containing the file is thus acquired.

The local storage 24 composed of a semiconductor memory is removably loaded onto the reproducing apparatus 1 as described above. Data in the same content distribution file format as the content distributed by the content author as previously discussed with reference to FIG. 17 may be recorded onto the medium 28 removably loaded to the drive 27 in the directory structure discussed with reference to FIG. 14. Without the need for storing the data onto the local storage 24, the file system of the data stored on the removable medium 28 and the file system of the data stored on the optical disk 11 may be bound to each other as described above.

The content data and the data required to reproduce the content data (for example, PlayList, SubPlayItem or a Manifest file) may be stored on both the local storage 24 and the removable medium 28 in the directory structure discussed with reference to FIG. 14. The file system of the data stored on the local storage 24, the file system of the data stored on the removable medium 28, and the file system of the data stored on the optical disk 11 can thus be bound to each other as discussed above. Through the process discussed above, the file system of the data stored on the local storage 24 is bound to the file system of the data stored on the optical disk 11, a first virtual file system is created, the first virtual file system is then bound to the file system of the data stored on the removable medium 28, and then a second virtual file system is created.

A manufacturing method of an optical disk storing data replayable on the reproducing apparatus 1 is described below with reference to FIGS. 55 and 56. As shown, the recording medium is an optical disk, and may be one of the optical disk 11 and the removable medium 28. If the removable medium 28 is one other than a disk-like recording medium, data replayable on the reproducing apparatus 1 is recorded onto the recording medium using a known recording medium manufacturing method.

Figure 55:
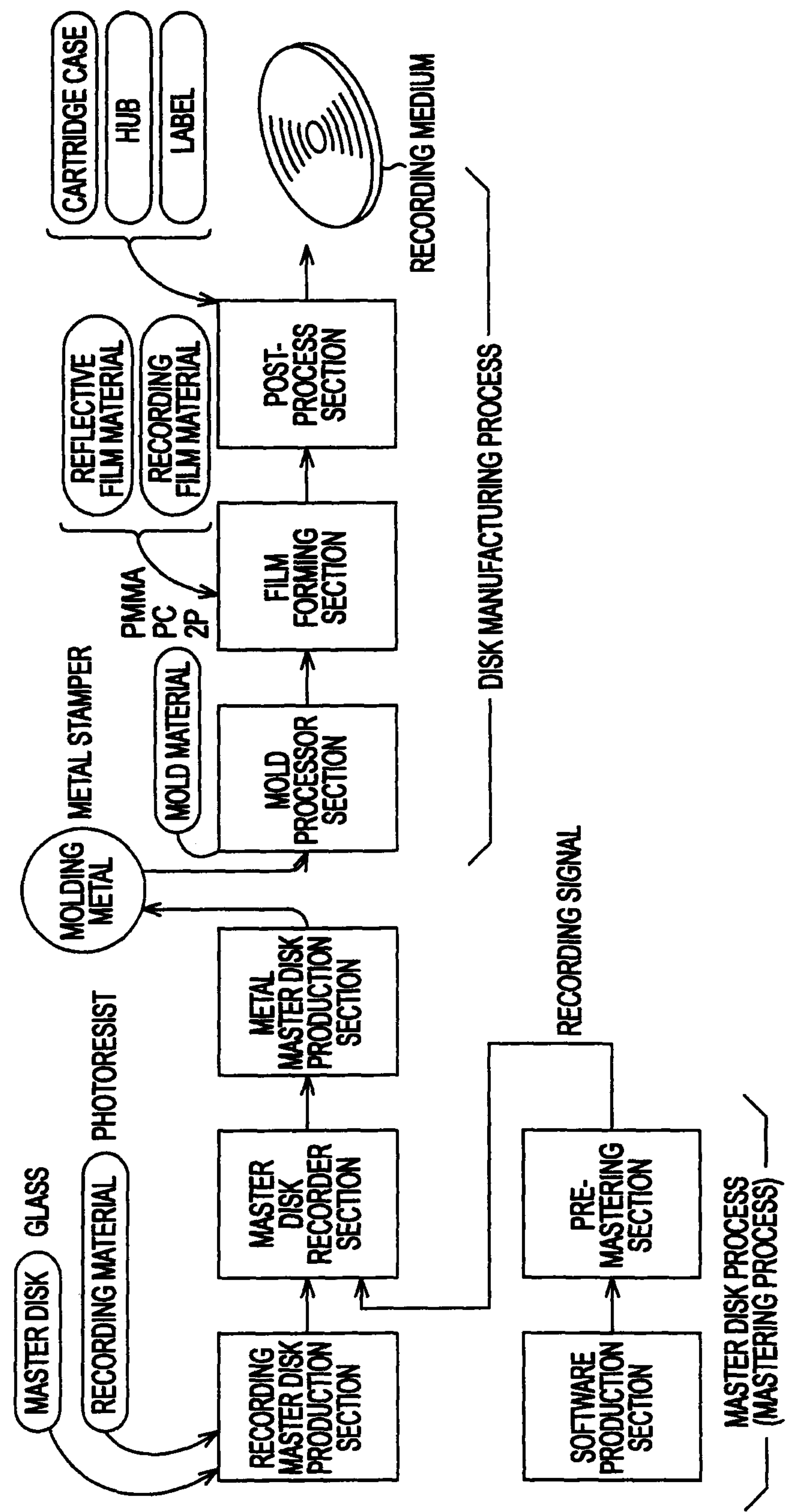
FIG. 55 illustrates manufacturing of a recording medium storing data replayable on the reproducing apparatus.

As shown in FIG. 55, a master disk made of glass is prepared. A recording material made of photoresist or the like is applied on the master disk. The recording master disk thus results.

Figure 56:
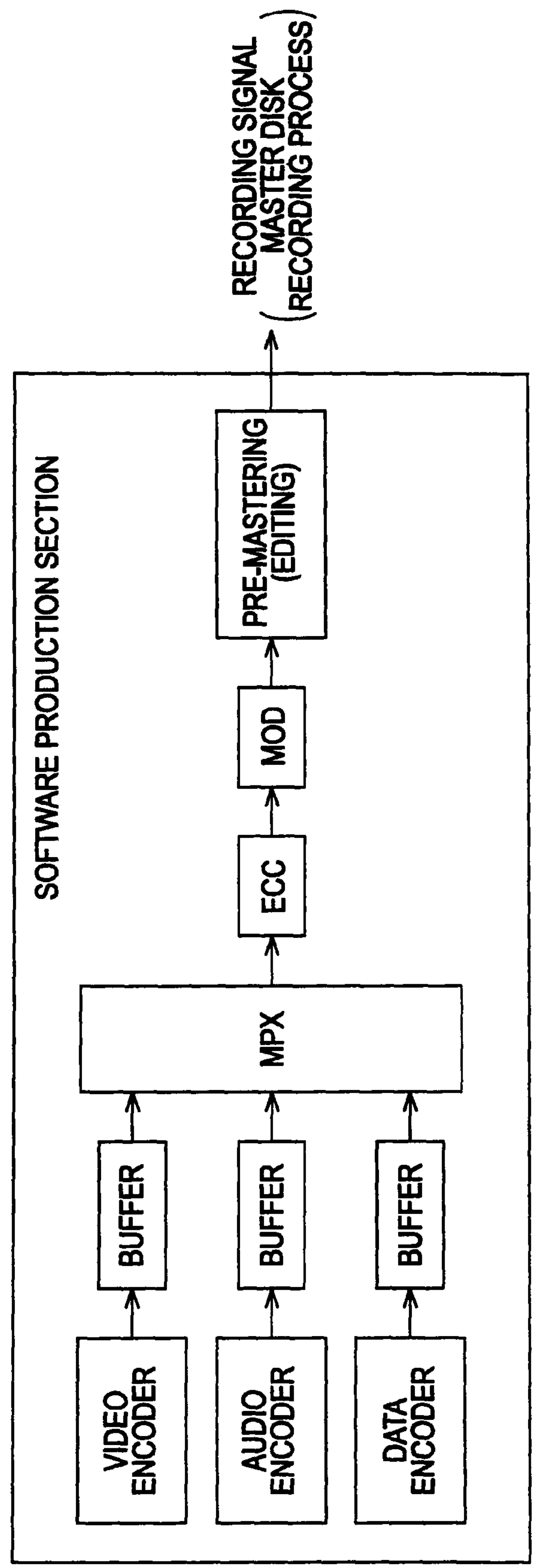
FIG. 56 illustrates manufacturing of a recording medium recording data replayable on the reproducing apparatus.

As shown in FIG. 56, video data in a format replayable on the reproducing apparatus 1 encoded by a video encoder in a software production section is stored temporarily on a buffer. Audio data encoded by an audio encoder is temporarily stored on a buffer. Data other than streams (for example, Indexes, Playlist, PlayItem, etc.) encoded by a data encoder is temporarily stored on a buffer. The video data, the audio data, and the data other than the stream stored on the respective buffers are multiplexed by a multiplexer (MPX) in synchronization with a synchronization signal, and an error correction code (ECC) circuit attaches an error correction code to the multiplexed signal. The resulting signal is modulated by a modulator (MOD) circuit, and then stored on a magnetic tape in accordance with a predetermined format. Thus, a software program is manufactured to be recorded onto one of the optical disk 11 and the removable medium 28 replayable on the reproducing apparatus 1.

The software program is edited (pre-mastered) as necessary, and a signal having a format to be recorded on the optical is thus produced. A laser beam is modulated In accordance with the recording signal, and then directed to the photoresist on the master disk. The photoresist on the master disk is thus exposed to the laser beam modulated with the recording signal.

The master disk is then developed, and pits are arranged on the master disk. The master disk is then subjected to electroforming to manufacture a metal master disk into which the pits of the glass master disk are transferred. From the metal master disk, a metal stamper is produced and used as a mold.

A material such as PMMA (acryl) or PC (polycarbonate) is injected into the mold and solidified. Alternatively, after applying 2P (ultraviolet curing resin) on the metal stamper, ultraviolet light is directed to the metal stamper for curing. In this way, the pits on the metal stamper are transferred to a replica made of the resin.

A reflective film is formed on thus constructed replica using deposition or sputtering technique. Alternatively, a reflective film is formed on the replica using spin coating technique.

The inner circular edge and the outer circular edge of the disk is then neatly shaped and a process required to bond two disks together is also performed. Further, a label is glued on the disk and a hub is attached to the disk, and the resulting disk is inserted into a cartridge. The optical disk 11 or the removable medium 28 having data replayable on the reproducing apparatus 1 are thus manufactured.

The above-referenced series of process steps may be performed using software. A program of the software may be installed from a recording medium onto a computer built in dedicated hardware or a general-purpose personal computer enabled to perform a variety of functions with a variety of programs installed thereon.

As shown in FIG. 1, the recording medium includes the removable medium 28 distributed to a user separate from a computer to provide the user with the program. The recording media include the removable medium 28, such as one of a magnetic disk (including a flexible disk), an optical disk (such as compact disk read-only memory (CD-ROM)), or digital versatile disk (DVD)), a magneto-optical disk (such as mini-disk (MD®), and a semiconductor memory. The recording media also include the memory 23, such a ROM or a RAM, or the local storage 24 such as a hard disk, each storing the program and supplied in the apparatus to the user.

The process steps describing the program stored on the recording medium may be performed in the time-series order sequence as previously stated. Alternatively, the process steps may be performed in parallel or separately.

In this description, the system refers to an entire apparatus including a plurality of units.

The embodiments of the present invention are not limited to the ones discussed above, and a variety of modifications to the embodiments are possible without departing from the scope of the present invention.

The invention claimed is:

1. A reproducing apparatus for reproducing an audio-visual stream file using a first data group recorded on a first recording medium and a second data group recorded on a second recording medium different from the first recording medium, the reproducing apparatus comprising:

circuitry configured to:

transmit to an external server via a network an identifier corresponding to a position in the first data group;

receive from the external server a list of downloadable files corresponding to the identifier and in accordance with a date and time of the transmitted identifier;

transmit to the external server a signal indicating a requested file from the list of downloadable files;

acquire from the external server a manifest file containing recording medium path information indicating a path of a file contained in the second data group on the second recording medium, and virtual file system path information indicating a path of the file also contained in the second data group in a virtual file system, said file being an update file corresponding to the requested file and provides updated information not originally included with the first recording medium and included in the audio-visual stream;

generate the virtual file system by mapping at least part of the second data group to the first data group in accordance with the virtual file system path information, said mapping including a conversion of file name of the file to a different file name, the first data group being managed in a directory structure containing an audio-visual stream directory managing the audio-visual stream file and a reproduction control file directory managing a reproduction control file as information for reproducing the audio-visual stream file; and reproduce the audio-visual stream file managed in the audio-visual stream directory of the virtual file system by having access to the file, in accordance with the recording medium path information and by having access to the file of the different file name via the reproduction control file managed in the reproduction control file directory of the virtual file system.

2. The reproducing apparatus according to claim 1, wherein the circuitry is further configured to map the second data group to a path in the virtual file system in the generation of the virtual file system when a file contained in the first data group is present in the same path as the path indicated by the virtual file system path for mapping the second data group.

3. The reproducing apparatus according to claim 2, wherein the reproduction control file contains information managing the reproduction of the audio-visual stream file in accordance with the path in the virtual file system, and the circuitry is further configured to:

read and reproduce the reproduction-managed audio-visual stream file out of the first data group recorded on the first recording medium based on the path in the virtual file system of the audio-visual stream file managed in reproduction when the audio-visual stream file reproduction-managed by the reproduction control file is contained in the first data group, and read and reproduce the reproduction-managed audio-visual stream file out of the second data group recorded on the second recording medium in accordance with the recording medium path information paired with the virtual file system path information corresponding to the path in the virtual file system of the reproduction-managed audio-visual stream file when the audio-visual stream file reproduction-managed by the reproduction control file is contained in the second data group.

4. The reproducing apparatus according to claim 1, wherein the reproduction control file directory of the virtual file system contains a directory containing a play list file as the reproduction control file managing the reproduction of the audio-visual stream file, and the audio-visual stream directory of the virtual file system contains a directory storing the audio-visual stream file.

5. The reproducing apparatus according to claim 1, wherein the second data group is recorded on the second recording medium including one of a semiconductor memory and a magnetic disk, and the recording medium path information indicates a path in a file system one of the semiconductor memory and the magnetic disk.

6. The reproducing apparatus according to claim 5, wherein the second data group is recorded on the second recording medium, on one of another apparatus connected thereto via the network and a third recording medium loaded on the reproducing apparatus at the same time, and the circuitry is further configured to control the acquisition of data to be read, out of the second data group recorded on one of the other apparatus and the third recording medium when the data to be read out of the second data group is not present in the path indicated by the recording medium path information of the second recording medium.

7. The reproducing apparatus according to claim 1, wherein the first data group is recorded on an optical disk.

8. The reproducing apparatus according to claim 1, wherein the circuitry is further configured to:

acquire the second data group from outside the reproduction apparatus;

control the recording of the second data group acquired by the data acquisition mechanism onto the second recording medium, the second recording medium built in the reproducing apparatus or loaded on the reproducing apparatus in accordance with the recording medium path information contained in the manifest file;

read the first data group from the first recording medium loaded on the reproduction apparatus; and when the first data group is recorded on the second recording medium in an area thereof different from the area having recorded the second recording group, and the first data group is read from the second recording medium.

9. The reproducing apparatus according to claim 1, wherein the circuitry is further configured to:

manage the recording or deletion of the second data group on the second recording medium; and acquire an operation input from a user, wherein at least part of data contained in the second data group recorded on the second recording medium is deleted in response to the acquired operation input by the user, and the virtual file system based on the manifest file is regenerated when the at least part of the data contained in the second data group is deleted.

10. The reproducing apparatus according to claim 9, wherein the circuitry is further configured to:

exchange information with a predetermined information processing apparatus via the network;

control the displaying of information assisting the user in operation;

transmit, to the predetermined information processing apparatus, information indicating the status of the virtual file system when a command to delete the data contained in the second data group recorded on the second recording medium is acquired;

receive, from the predetermined information processing apparatus, a list of deletable data out of the data contained in the second data group recorded on the second recording medium;

control the displaying of the received list of deletable data; and delete at least part of the data contained in the second data group recorded on the second recording medium in response to the operation input of the user that has referenced the acquired and displayed list of deletable data.

11. The reproducing apparatus according to claim 9, wherein the circuitry is further configured to:

exchange information with a predetermined information processing apparatus via the network;

determine whether a malfunction is to be caused in the virtual file system in response to the deletion of the at least part of data contained in the first data group recorded on the second recording medium;

extract data required to fix the malfunction when the malfunction is determined to be caused in response to the deletion, and request the predetermined information processing apparatus transmit data required to fix the malfunction;

receive the data required to fix the malfunction from the predetermined information processing apparatus; and control the recording of the data required to fix the malfunction.

12. A reproducing method of a reproducing apparatus configured to reproduce an audio-visual stream file using a first data group recorded on a first recording medium and a second data group recorded on a second recording medium different from the first recording medium, the reproducing method comprising:

transmitting to an external server via a network an identifier corresponding to a position in the first data group;

receiving from the external server a list of downloadable files corresponding to the identifier and in accordance with a date and time of the transmitted identifier;

transmitting to the external server a signal indicating a requested file from the list of downloadable files;

acquiring from the external server a manifest file containing recording medium path information indicating a path of a file contained in the second data group on the second recording medium, and virtual file system path information indicating a path of the file also contained in the second data group in a virtual file system, said file being an update file that provides updated information not originally included with the first recording medium and included in the audio-visual stream file;

generating the virtual file system with a computer by mapping at least part of the second data group to the first data group in accordance with the virtual file system path information, said mapping including a conversion of file name of the file to be a different file name, the first data group being managed in a directory structure containing an audio-visual stream directory managing the audio-visual stream file and a reproduction control file directory managing a reproduction control file as information for reproducing the audio-visual stream file; and reproducing the audio-visual stream file managed in the audio-visual stream directory of the virtual file system by having access to the file, in accordance with the recording medium path information and by having access to the file of the different file name via the reproduction control file managed in the reproduction control file directory of the virtual file system.

13. A non-transitory computer readable storage medium having computer readable instructions that when executed by a computer cause the computer to perform a method comprising:

transmitting to an external server via a network an identifier corresponding to a position in the first data group;

receiving from the external server a list of downloadable files corresponding to the identifier and in accordance with a date and time of the transmitted identifier;

transmitting to the external server a signal indicating a requested file from the list of downloadable files;

acquiring from the external server a manifest file containing recording medium path information indicating a path of a file contained in the second data group on the second recording medium, and virtual file system path information indicating a path of the file also contained in the second data group in a virtual file system, said file being an update file that provides updated information not originally included with the first recording medium and included in the audio-visual stream file;

generating with the computer the virtual file system by mapping at least part of the second data group to the first data group in accordance with the virtual file system path information, said mapping including a conversion of file name of the file to a different file name, the first data group being managed in a directory structure containing an audio-visual stream directory managing the audio-visual stream file and a reproduction control file directory managing a reproduction control file as information for reproducing the audio-visual stream file; and reproducing the audio-visual stream file managed in the audio-visual stream directory of the virtual file system by having access to the file, in accordance with the recording medium path information and by having access to the file of the different file name via the reproduction control file managed in the reproduction control file directory of the virtual file system.

14. A data delivery system comprising:

a data delivery apparatus configured to deliver to a reproducing apparatus, data required to reproduce an audio-visual stream file using a first data group and a second data group; and the reproducing apparatus configured to reproduce the audio-visual stream file using the first data group and the second data group, the data delivery apparatus including circuitry configured to deliver a manifest file via a network, the manifest file being supplied to the reproducing apparatus in order to reproduce the audio-visual stream file using the first data group and the second data group recorded on a second recording medium different from a first recording medium, the manifest file containing recording medium path information indicating a path in the second recording medium having stored the second data group, and virtual file system path information indicating a path of a file contained in the second data group in a virtual file system, the virtual file system containing an audio-visual stream directory managing the audio-visual stream file and a reproduction control file directory managing a reproduction control file as information for reproducing the audio-visual stream file, and the reproducing apparatus including circuitry configured to:

transmit to the data delivery apparatus via the network an identifier corresponding to a position in the first data group;

receive from the data delivery apparatus a list of downloadable files corresponding to the identifier and in accordance with a date and time of the transmitted identifier;

transmit to the data delivery apparatus a signal indicating a requested file from the list of downloadable files;

acquire the manifest file from the data delivery apparatus, said manifest file being an update file that provides updated information not originally included with the first recording medium and included in the audio-visual stream file;

generate the virtual file system by mapping at least part of the second data group to the first data group in accordance with the virtual file system path information, said mapping including a conversion of file name of the file to a different file name, the first data group being managed in a directory structure containing an audio-visual stream directory managing the audio-visual stream file and a reproduction control file directory managing a reproduction control file as information for reproducing the audio-visual stream file; and reproduce the audio-visual stream file managed in the audio-visual stream directory of the virtual file system by having access to the file, in accordance with the recording medium path information and by having access to the file of the different file name via the reproduction control file managed in the reproduction control file directory of the virtual file system.

15. A reproducing apparatus configured to reproduce an audio-visual stream file using a first data group recorded on a first recording medium and a second data group recorded on a second recording medium different from the first recording medium, the reproducing apparatus comprising:

circuitry configured to transmit to an external server via a network an identifier corresponding to a position in the first data group;

receive from the external server a list of downloadable files corresponding to the identifier and in accordance with a date and time of the transmitted identifier; and transmit to the external server a signal indicating a requested file from the list of downloadable files;

acquire, from the external server, a manifest file containing means for acquiring, from the external server, a manifest file containing recording medium path information indicating a path of a file contained in the second data group on the second recording medium, and virtual file system path information indicating a path of the file also contained in the second data group in a virtual file system, said file being an update file that provides updated information not originally included with the first recording medium and included in the audio-visual stream file;

means for generating the virtual file system by mapping at least part of the second data group to the first data group in accordance with the virtual file system path information, said mapping including a conversion of file name of the file to a different file name, the first data group being managed in a directory structure containing an audio-visual stream directory managing the audio-visual stream file and a reproduction control file directory managing a reproduction control file as information for reproducing the audio-visual stream file; and means for reproducing the audio-visual stream file managed in the audio-visual stream directory of the virtual file system by having access to the file, in accordance with the recording medium path information and by having access to the file of the different file name via the reproduction control file managed in the reproduction control file directory of the virtual file system.

* * * * *